(12) United States Patent
Chaudhuri

(10) Patent No.: US 11,769,159 B2
(45) Date of Patent: Sep. 26, 2023

(54) SYSTEM AND METHOD FOR HUMAN EMOTION AND IDENTITY DETECTION

(71) Applicant: Aloke Chaudhuri, Victor, NY (US)

(72) Inventor: Aloke Chaudhuri, Victor, NY (US)

(*) Notice: Subject to any disclaimer, the term of this patent is extended or adjusted under 35 U.S.C. 154(b) by 479 days.

(21) Appl. No.: 16/877,189

(22) Filed: May 18, 2020

(65) Prior Publication Data
US 2020/0279279 A1 Sep. 3, 2020

Related U.S. Application Data

(63) Continuation-in-part of application No. 15/811,511, filed on Nov. 13, 2017, now abandoned.

(51) Int. Cl.
*G06N 20/00* (2019.01)
*G06Q 30/0201* (2023.01)
(Continued)

(52) U.S. Cl.
CPC ....... *G06Q 30/0201* (2013.01); *G06F 40/295* (2020.01); *G06N 5/04* (2013.01); *G06N 20/00* (2019.01); *G06Q 20/202* (2013.01); *G06V 10/811* (2022.01); *G06V 20/40* (2022.01); *G06V 40/174* (2022.01); *G06V 40/18* (2022.01); *G06V 40/20* (2022.01); *G10L 25/63* (2013.01); *G06V 40/178* (2022.01)

(58) Field of Classification Search
CPC .......................... G06Q 30/0201; A61B 5/165
USPC ................ 705/7, 27.1, 27.2; 726/26
See application file for complete search history.

(56) References Cited

U.S. PATENT DOCUMENTS 9,129,277 B2 * 9/2015 Macintosh ............... G07G 1/06
2013/0268357 A1 * 10/2013 Heath ...................... G06Q 10/10
726/26
(Continued)

FOREIGN PATENT DOCUMENTS

WO WO-2008134625 A1 * 11/2008 ............. A61B 5/165

OTHER PUBLICATIONS

Otter, A Survey of the Usages of Deep Learning for Natural Language Processing, IEEE Transactions on Neural Networks and Learning Systems, vol. XX, No. X, Jul. 2019.
(Continued)

*Primary Examiner* — Ruay Ho
(74) *Attorney, Agent, or Firm* — McCarter & English, LLP; James M. Smedley

(57) ABSTRACT

Disclosed is a distributed profile building system, gathering video data, audio data, electronic device identification data, and spatial position data from multiple input devices, performing human emotion and identity detection, and gaze tracking, and forming user profiles. Also disclosed is a method for building user profiles using a distributed profile building system by gathering video data, audio data, electronic device identification data, and spatial position data from multiple input devices, performing human emotion and identity detection, and gaze tracking, and forming user profiles. Also included is a targeted promotion system, which includes software for making real-time promotions for select products based on retail customers' individual
(Continued)

characteristics. Additionally, a targeted digital coupon management system creates, delivers and facilitates redemption of various types of digital coupons according to the business rules set by the retailers.

19 Claims, 33 Drawing Sheets

(51) Int. Cl.
    *G06Q 20/20*     (2012.01)
    *G06N 5/04*     (2023.01)
    *G06F 40/295*     (2020.01)
    *G10L 25/63*     (2013.01)
    *G06V 20/40*     (2022.01)
    *G06V 40/18*     (2022.01)
    *G06V 40/20*     (2022.01)
    *G06V 40/16*     (2022.01)
    *G06V 10/80*     (2022.01)

(56) References Cited

U.S. PATENT DOCUMENTS

2014/0100994 A1* 4/2014 Tatzel ............... G06Q 30/0276 705/27.1
2014/0100997 A1* 4/2014 Mayerle ............... G06T 19/006 705/27.2
2017/0301001 A1* 10/2017 Wilkinson ......... G06Q 30/0269
2018/0078843 A1* 3/2018 Tran ................... G09B 19/0038
2018/0277093 A1* 9/2018 Carr ........................ G06F 3/011

OTHER PUBLICATIONS

Revina, A Survey on Human Face Expression Recognition Techniques, Journal of King Saud University—Computer and Information Sciences 2018.
Devi, A Systematic Survey of Natural Language Processing (NLP) Approaches in Different Systems, International Journal of Computer Sciences and Engineering vol. 4, Issue 7, 2016.
Koolagudi, Emotion recognition from speech—a review, Int J Speech Technol (2012) 15:99-117.
Rani et al., Emotion Recognition From Speech A Survey, International Journal of Scientific & Engineering Research, vol. 6, Issue 4, Apr. 2015.
Brena et al., Evolution of Indoor Positioning Technologies—A Survey, Hindawi Journal of Sensors, vol. 2017, Article ID 2630413, 21 pages.
Amer Al-Rahayfeh and Miad Faezipour, Eye Tracking and Head Movement Detection—A State of Art Survey, May 21, 2013; revised Jul. 27, 2013 and Aug. 30, 2013; accepted Oct. 15, 2013.
Patil et al., Face Recognition A Survey, Informatics Engineering, an International Journal (IEIJ), vol. 1, No. 1, Dec. 2013.
Murphy-Chutorian, Head Pose Estimation in Computer Vision A Survey, IEEE Transactions on Pattern Analysis and Machine Intelligence, vol. 31, No. 4, Apr. 2009.

* cited by examiner

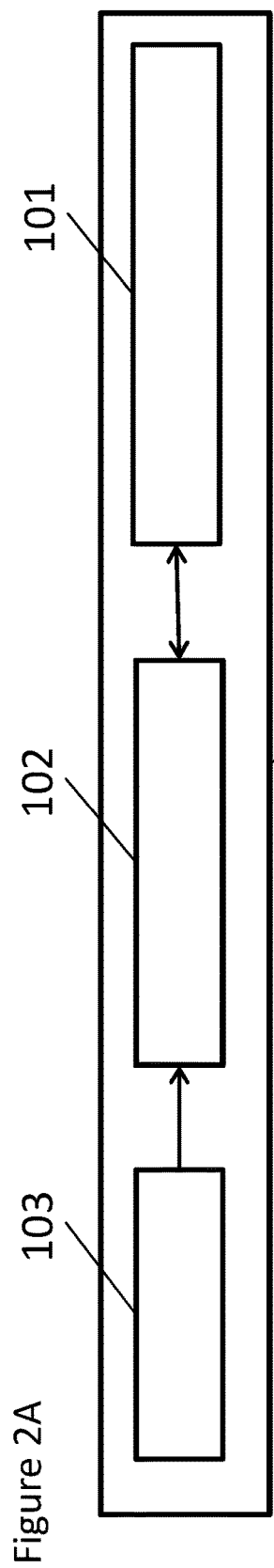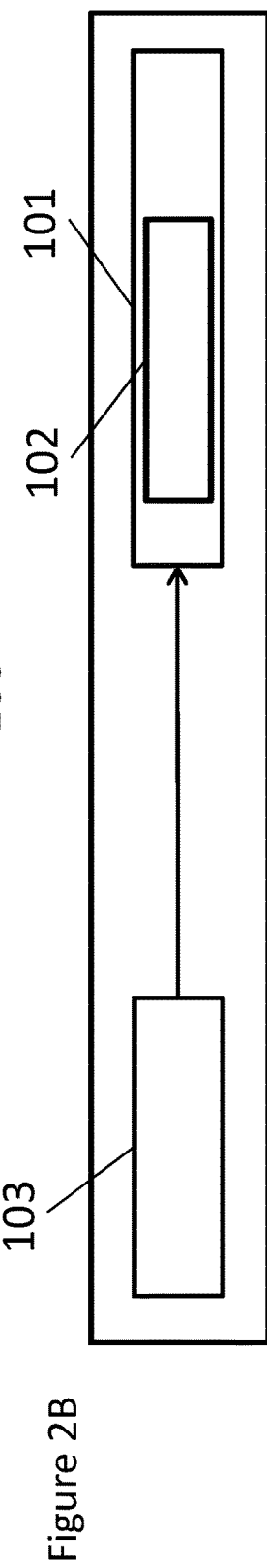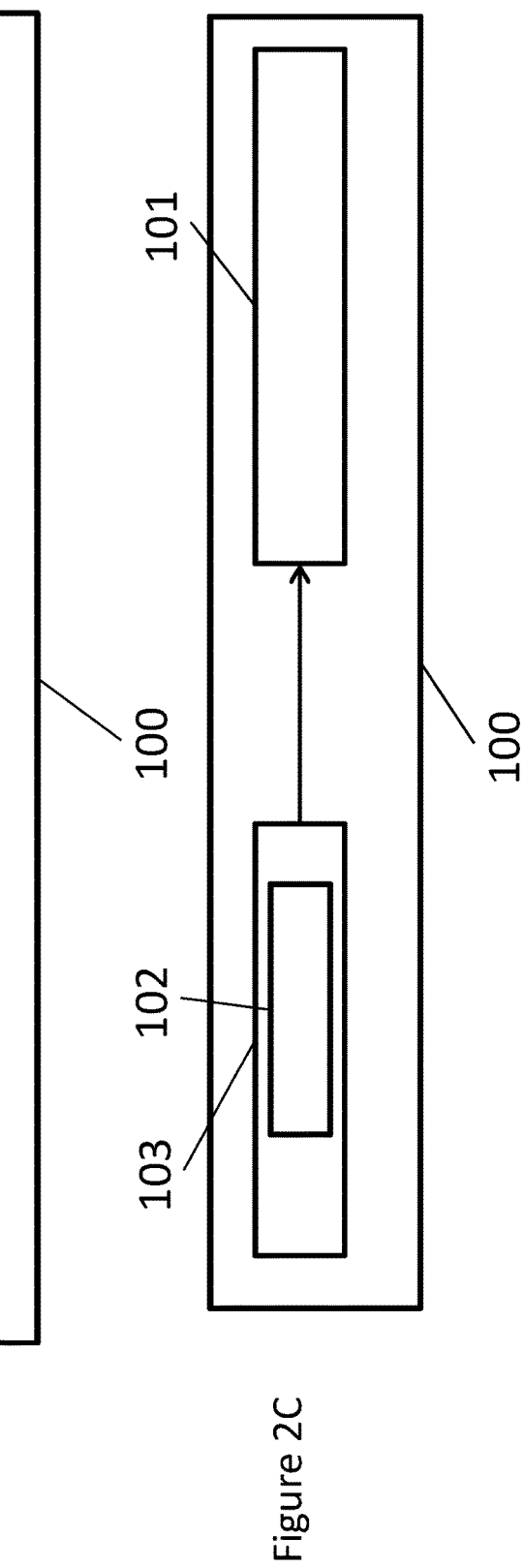

SYSTEM AND METHOD FOR HUMAN EMOTION AND IDENTITY DETECTION

CROSS-REFERENCE TO RELATED APPLICATIONS

This application is a continuation-in-part of and claims the benefit of priority from co-pending U.S. patent application Ser. No. 15/811,511, filed Nov. 13, 2017, the full disclosure of which is incorporated herein by reference.

BACKGROUND

There is an increased pressure for brick and mortar stores to adapt data analytics as part of their marketing and market research strategy in order to compete with online retail sources and to provide better customer service. Online retailers and website owners, through cookies or other tracking tools, can glean a significant amount of information about visitors and their customers. In many cases online retailers and content providers can gather a significant amount of market data about groups and individuals.

Many retailers have adopted an online shopping presence. They can take advantage of customers who want to shop online, and they can use online tools to gather market research data. However, online tools provide little market research data about customers and visitors to physical stores.

Brick and mortar retailers have a tougher time gathering data about their visitors. Many retailers have some form of loyalty program. These programs often require the customer to present a loyalty card or identifying information to obtain discounts or to obtain program benefits. Many retailers have adopted mobile device applications ("apps") to gather information about their customers. However, both loyalty programs and apps require that a customer actively participates by presenting a card or activating an app to enable data collection. Furthermore, neither solution is effective in gathering information about visitors or one-off shoppers.

Physical retailers often need to resort to third party market data gathering services such as credit card providers, focus groups, or Wi-Fi hotspot analytics. These solutions might provide group trends but rarely individual information. Furthermore, the information is gathered by a third party and customized information and correlations may be limited.

Current camera or video installations in retail locations are generally for security and crime-prevention purposes. More sophisticated retailers may use video installations to gather information about checkout line waiting times or even certain aisle foot traffic patterns. Such use may limit checkout congestion or provide input of aisle popularity. However, neither provides a customizable solution tailored to individual shoppers and the data gathered provides limited to no individual marketing insight. Current solutions do not provide information regarding a person's emotional response relative to merchandise on store shelves, nor do they provide a way to identify visitor demographics or provide easy solutions to correlate emotional responses to identity information to purchasing information. Such information, commonly available to online retailers, is becoming critical for brick and mortar retailers for merchandising optimization, segmentation, and retargeting strategies.

Further applications that have a need for combining emotional responses and identity information include but are not limited to audience measurement solutions for television programs; advertisement response tracking on mobile devices and other personal electronic or computing device; security screening at border checkpoints, airports, or other sensitive facility access points; police body cameras; or various fraud prevention systems at places like legal gambling establishments.

SUMMARY

Disclosed herein is a distributed system for building a plurality of user profiles comprising: a distributed system for building a plurality of user profiles comprising, a user profile from the plurality of user profiles comprising user profile data; at least one profile building system comprising at least one behavioral response analysis system and the plurality of user profiles; at least one behavior learning system comprising at least one behavior learning processor, at least one video data processor, and at least one audio data processor; at least one data input device comprising a data input device processor and an input data module selected from the group consisting of at least one video input module, at least one audio input module, at least one electronic device identification module, at least one spatial position module, and combinations thereof; and a data communication network comprising the at least one profile building system, the at least one behavior learning system, and the at least one data input device.

Further disclosed is a distributed system for building a plurality of user profiles comprising: a distributed system for building a plurality of user profiles comprising, a user profile from the plurality of user profiles comprising user profile data; at least one profile building system building the user profile comprising at least one behavioral response analysis system providing behavioral response analysis data, and the plurality of user profiles; at least one behavior learning system comprising at least one behavior learning processor, at least one video data processor providing video processor data, and at least one audio data processor providing audio processor data; at least one data input device comprising a data input device processor and data input modules providing data selected from the group consisting of at least one video input module providing video data, at least one audio input module providing audio data, at least one electronic device identification module providing electronic device identification data, at least one spatial position module providing spatial position data, and combinations thereof, and a data communication network providing data communication comprising the profile building system, the behavior learning system, and the at least one data input device.

Further disclosed is a method for building a user profile, the method steps comprising: providing at least one data input device of a plurality of data input devices in at least one fixed space collecting and transmitting video data, audio data, mobile electronic device identification data, and spatial position data of a person from a plurality of persons as the person moves throughout the at least one fixed space; at least one behavior learning system receiving video data, audio data, mobile electronic device identification data, and spatial position data, having at least one video data processor processing video data and at least one audio data processor processing audio data; the at least one behavior learning system transmitting mobile electronic device identification data, spatial position data, video processor data and audio processor data; at least one profile building system receiving mobile electronic device identification data, spatial position data, video processor data, and audio processor data, and building the user profile of the plurality of user profiles; wherein the plurality of user profiles are stored in at least one primary data repository; and wherein the user profile is updated for each person from the plurality of persons moving throughout the at least one fixed space.

BRIEF DESCRIPTION OF THE DRAWINGS

The present disclosure and the manner in which it may be practiced is further illustrated with reference to the accompanying drawings wherein:

FIG. 2A is a block diagram of a second embodiment of a distributed system for building a plurality of user profiles.

FIG. 2B is a block diagram of a third embodiment of a distributed system for building a plurality of user profiles.

FIG. 2C is a block diagram of a fourth embodiment of a distributed system for building a plurality of user profiles.

DETAILED DESCRIPTION

Figure 1:
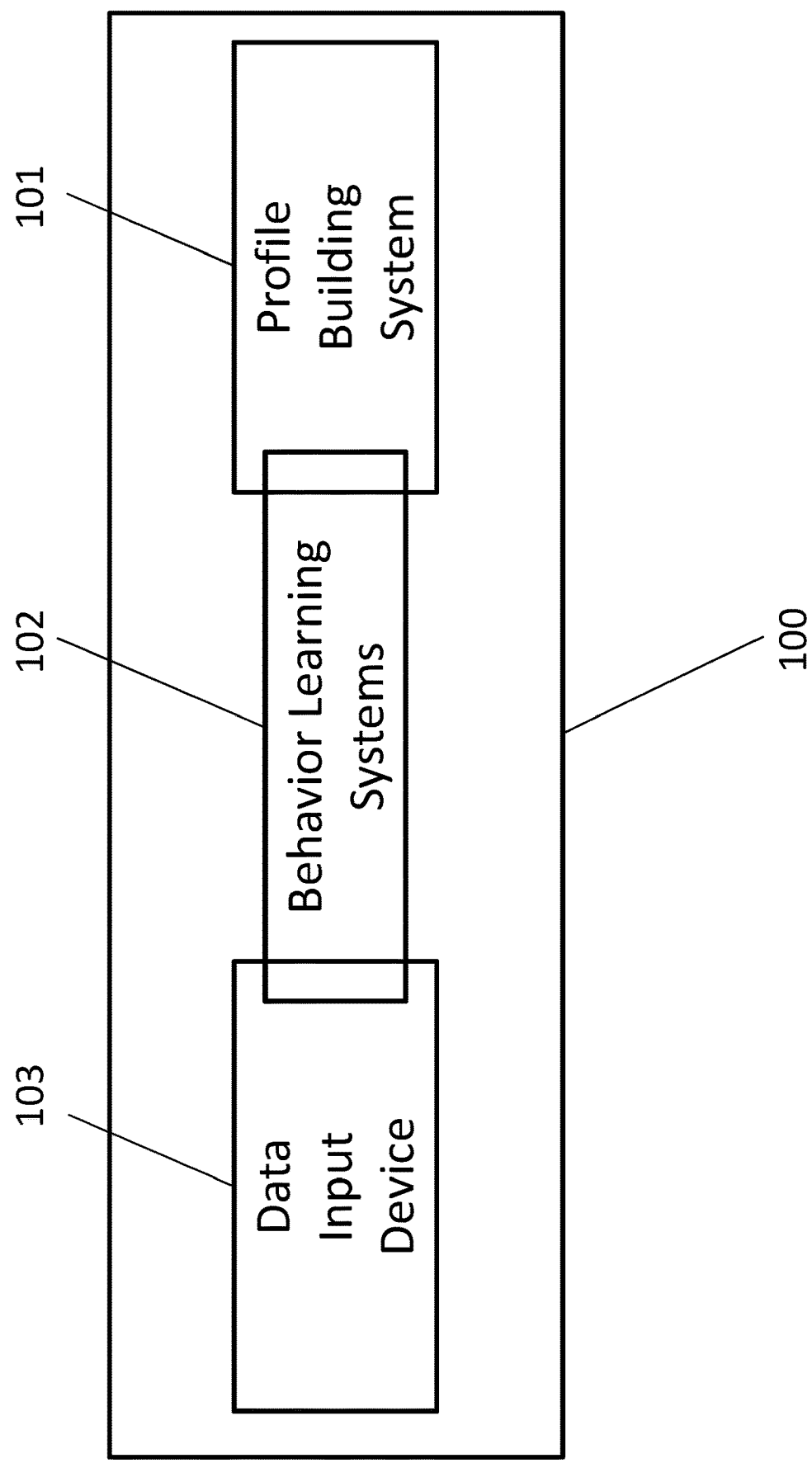
FIG. 1 is a block diagram overview of an embodiment of a distributed system for building a plurality of user profiles.

Before explaining some embodiments of the present disclosure in detail, it is to be understood that the disclosure is not limited in its application to the details of any particular embodiment shown or discussed herein since the disclosure comprises still further embodiments, as described by the granted claims.

The terminology used herein is for the purpose of description and not of limitation. Further, although certain methods are described with reference to certain steps that are presented herein in a certain order, in many instances, these steps may be performed in any order as may be appreciated by one skilled in the art, and the methods are not limited to the particular arrangement of steps disclosed herein.

As utilized herein, the following terms and expressions will be understood as follows:

The terms "a" or "an" are intended to be singular or plural, depending upon the context of use.

The term "building" as used in reference to building a user profile or building the user profile refers to creating, updating, maintaining, storing, and/or deleting, the referenced profile, in whole or in part.

The term "communication" refers to information exchange between at least two devices, systems, modules, or objects, wherein information exchanged is transmitted and/or received by each of the at least two devices.

The expression "machine learning system" refers to computerized systems with the ability to automatically learn and improve from experience without being explicitly programmed. Such systems include but are not limited to artificial neural networks, support vector machines, Bayesian networks, and genetic algorithms. Convolutional neural networks and deep learning neural networks are examples of artificial neural networks.

The expressions "electronic device signal" refers to a mobile phone, tablet, or mobile computing device identification signals or transmissions that include but are not limited to media access control addresses ('MAC ID'), Bluetooth® signals, other electromagnetic identification signals, or combinations thereof.

The expression "fixed space" refers to any defined or bounded three dimensional space including but not limited to a building or structure, a checkpoint, a retail store, a complex of buildings, a stadium, a park, or outdoor space.

The term "network" refers to a group of two or more computer systems linked together for wired and/or wireless electronic signal transmission and/or communication.

The term "planogram" refers to a visual or digital representation of an item's placement within a fixed space, usually in the form of a diagram or mathematical model. Within the context of a retail store, this includes products, and the placement of retail products on shelves.

The expression "primary data repository" refers to a digital mass data storage system which stores, organizes, and analyzes large amounts of structured or unstructured data, where person profiles and other inventive system data are stored. Within the primary data repository, other data may also be stored, including but not limited to, purchasing system data, market research data, electronic kiosk data, or general research data. The primary data repository may further include information from multiple fixed-space locations and is not limited to information from a single fixed-space.

The expression "secondary data repository" refers to a digital mass data storage system. It includes but is not limited to off-site persona data, external observed location and presence data, public social media data, facial image data, or any information available through Wi-Fi hot-spot market data providers, through geocoding, through public social media searches, or through public image searches.

The disclosure herein will be better understood by reference to the figures wherein like reference numbers refer to like components.

Figure 21:
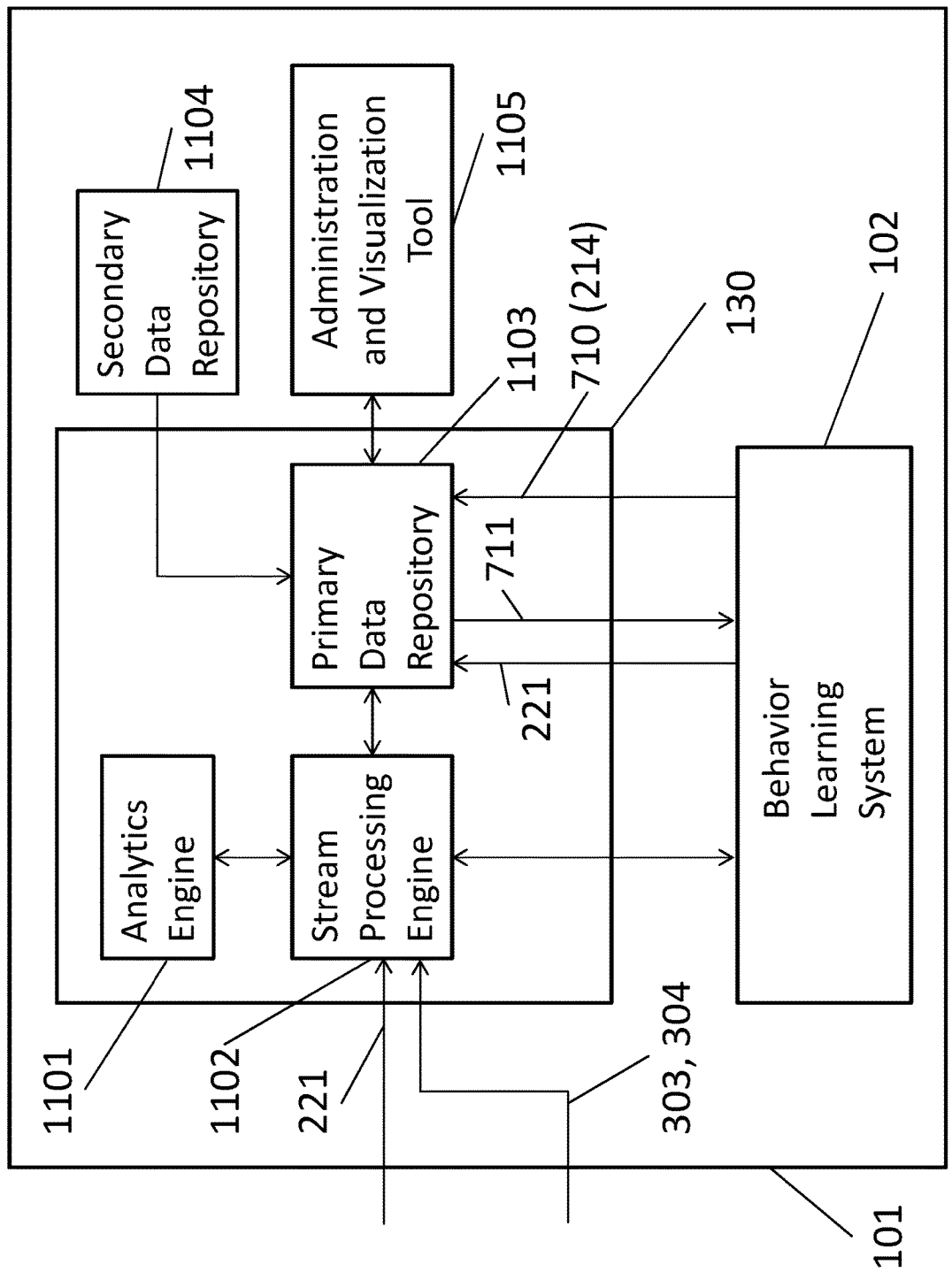
FIG. 21 is a block diagram of profile building system and behavioral response analysis system.
Figure 22:
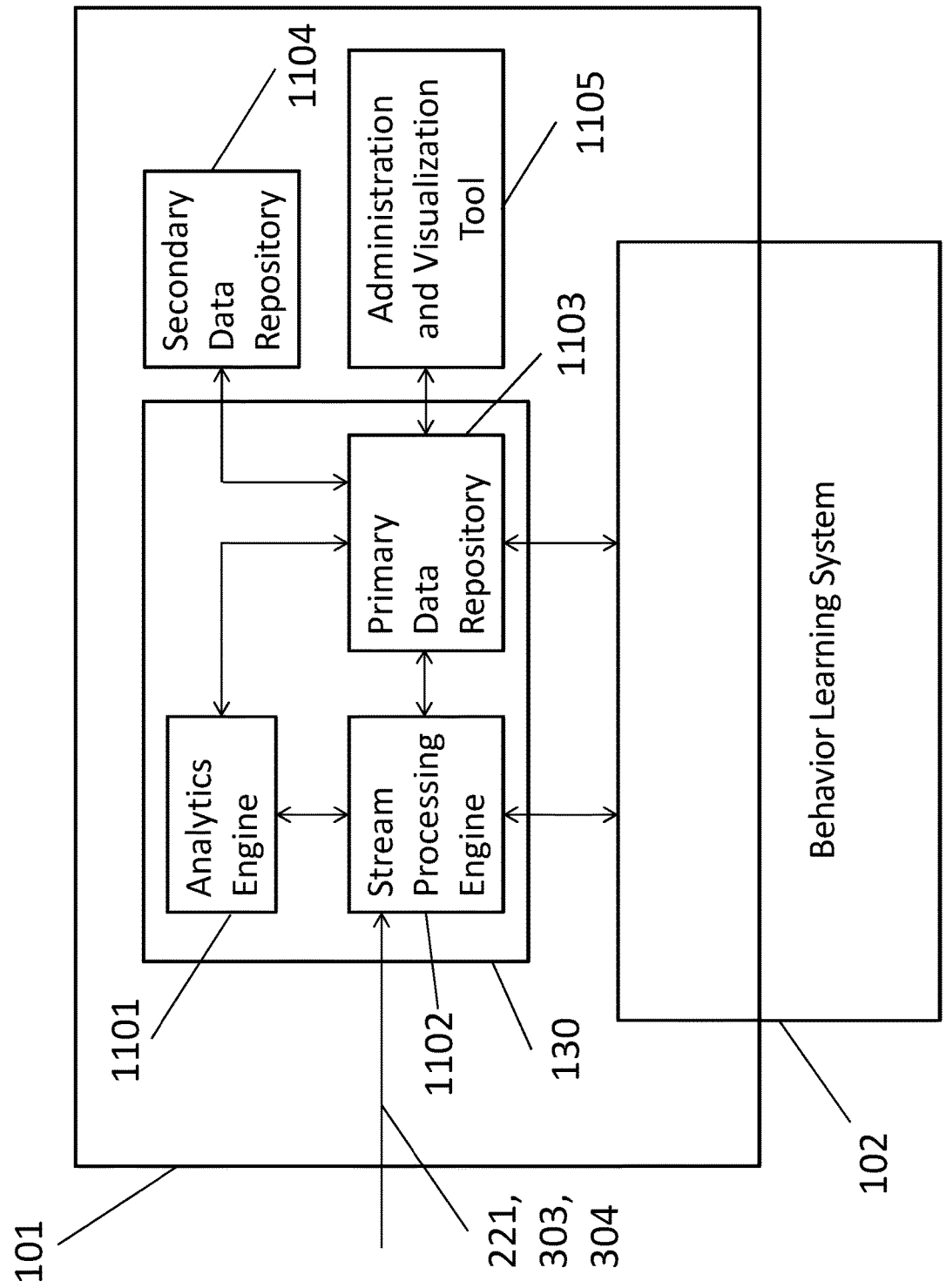
FIG. 22 is a block diagram of profile building system, behavioral response analysis system, and distributed behavior learning system.

FIG. 1 depicts a block diagram providing an overview of an embodiment of a distributed system for building a plurality of user profiles (100), showing blocks depicting at least one profile building system (101), at least one behavior learning system (102), and at least one data input device (103). Profile building system (101) represents a group comprising at least one behavioral response analysis system (130), at least one behavior learning system (102), at least one secondary data repository (1104), and at least one administration and visualization tool (1105). Profile building system is shown in FIGS. 21 and 22. All of these individual modules have been described separately in detail. Behavioral response analysis system (130) represents a group comprising at least one stream processing engine (1102), at least one analytics engine (1101), and at least one primary data repository (1103). The behavioral response analysis system has been shown in FIGS. 21 and 22. All of these individual modules have been described separately in detail. Behavior learning system (102) represents a group consisting of at least at least one audio data processor (111), at least one video data processor (110), and at least one behavior learning processor (109), All of these individual modules have been described separately in detail. The behavioral learning system has been shown in FIGS. 1, 2, 4, 7, 8, 12, 18, 19, 21 and 22. As shown in FIGS. 1 and 2, the behavioral learning system can be a centralized system, or it can be a distributed system. The at least one behavior learning system (102) is shown overlapping the at least one profile building system (101) and the at least one data input device (103) to indicate that the at least one behavior learning system (102) may have components within the at least one data input device (103), the at least one behavior learning system (102) may have components within the at least one profile building system (101), or the at least one behavior learning system (102) may have components that are connected but outside the at least one input device (103) and the at least one profile building system (101).

FIG. 2A depicts a block diagram of a distributed system for building a plurality of user profiles (100), where at least one profile building system (101), at least one behavior learning system (102), and at least one data input device (103) are independent systems on independent devices connected to a network.

FIG. 2B depicts a block diagram of a distributed system for building a plurality of user profiles (100), with at least one behavior learning system (102) within at least one profile building system (101), where both are within the same physical computer device or grouping of devices. The at least one behavior learning system (102) and the at least one profile building system (101) are connected to at least one data input device (103) on a network.

FIG. 2C depicts a block diagram of a distributed system for building a plurality of user profiles (100), where at least one behavior learning system (102) is within at least one data input device (103), where both are within the same device or grouping of devices. The at least one behavior learning system (102) and the at least one data input device (103) are connected to at least one profile building system (101) on a network.

Figure 3:
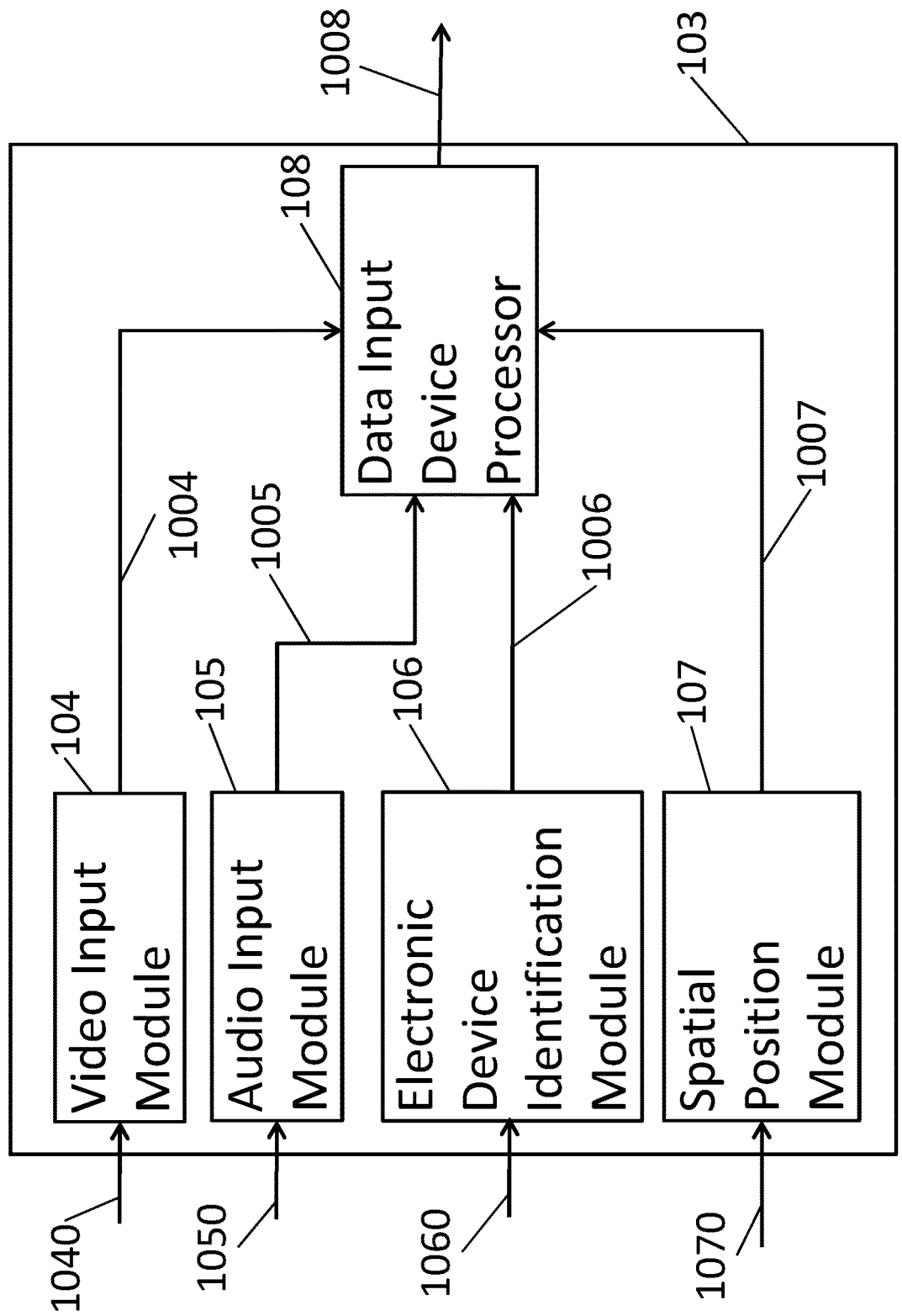
FIG. 3 is a block diagram of an embodiment of a data input device.

FIG. 3 depicts a block diagram of an embodiment of a data input device (103). Shown are at least one video input module (104), at least one audio input module (105), at least one electronic device identification module (106), and at least one spatial position module (107). Audio input module (105) is an electronic circuit and software that takes raw, uncompressed, analog audio as input, and produces a compressed digital audio as output. Although audio input modules can be built in many different ways, a common implementation includes a three stage design, where the audio is first captured though a microphone; then it gets converted to a digital format by an analog to digital converter (which can be implemented in hardware or software); and finally the digital audio is compressed with the help of an audio codec such as MP3, G.711, AAC or OGG Vorbis (which can be implemented in hardware or software). There could be additional components present such as noise cancellation filters and signal quality improvement mechanisms. It's also quite common these days to see digital MEMS microphones that integrate all of the above functions in a single chip. The audio input module has been shown in FIGS. 3, 11, 13. The audio input module is part of the data input device (103) but it may not always be physically enclosed in the same packaging. In some embodiments, it can be located at a different place and packaged within a different physical enclosure. Other than analog microphones, the rest of the components and functions can be implemented with System on Chip (SoC), Application Specific Integrated Circuit (ASIC), Field Programmable Gate Array (FPGA), embedded systems such as Single Board Computer (SBC) or System on Module (SoM) built with Microcontrollers (MCUs) and/or Digital Signal Processors (DSPs), and combinations thereof.

Electronic device identification module (106) is an electronic circuit and software that discovers and stores uniquely identifiable information ("digital fingerprint") of all the neighboring mobile electronic devices with Wi-Fi and/or Bluetooth capability, and re-identifies them when they come in proximity again in the future. The module has two components, Wi-Fi packet analyzer (401), and Bluetooth scanner (402) which uses a mobile device Bluetooth identification module. Both of these components have been described later in detail. The Electronic Device Identification module has been shown in FIG. 14A. The Electronic Device Identification module is part of the data input device (103) but it may not always be physically enclosed in the same packaging. In some embodiments, it can be located at a different place and packaged within a different physical enclosure. The electronic device identification module can be implemented with System on Chip (SoC), Application Specific Integrated Circuit (ASIC), Field Programmable Gate Array (FPGA), embedded systems such as Single Board Computer (SBC) or System on Module (SoM) built with Microcontrollers (MCUs) and/or Digital Signal Processors (DSPs), and combinations thereof.

Mobile device Bluetooth identification module is a software algorithm that discovers and stores the Bluetooth device addresses of all the neighboring mobile electronic devices within its detection range, and re-identifies them when they come in close proximity again in the future. Mobile electronic devices can be mobile phones, tablets, personal digital assistants, e-readers, or any other portable device that has Bluetooth connectivity. This algorithm runs on the hardware platform of Bluetooth Scanner (402) shown in FIGS. 14A, 14B and 15, which implements the Bluetooth protocol stack. Most modern mobile devices support both Bluetooth Low Energy (BLE) and Bluetooth Basic Rate/Enhanced Data Rate (BR/EDR) protocol, which is often called the "classic Bluetooth". Both BLE and classic Bluetooth use the same 2.4 GHz radio frequency spectrum, which allows the Bluetooth scanner to scan for both types of signals by switching modulation methods and the channels in a predefined sequence. The mobile device Bluetooth identification module constantly performs "passive scanning", or as soon as the proximity of a person is detected through other ancillary proximity sensors (such as through infrared or ultrasound sensors) that can detect human presence and send the information to the Bluetooth scanner. The module attempts to acquire advertisement packets sent by BLE devices on one of the 3 discovery channels (37, 38 and 39) by adopting a "central" role at the GAP layer. The advertisement packets from those mobile devices that are configured to act in a "peripheral" role for any service are discovered this way, even though they may not have been intended for the consumption of the mobile device Bluetooth identification module. The advertisement packets contain a plethora of information about the mobile devices, which helps to uniquely identify each one of them. Upon discovering the peripheral devices, the module issues SCAN_REQ packets and collects more information from the SCAN_RSP packets from those peripheral devices that respond further. The module stores all the identifying information collected and uses it to re-identify the devices if they ever come in its proximity again in the future. After the aforementioned BLE device discovery process, the module attempts to discover those mobile devices that are just classic Bluetooth compliant but do not support BLE. The module sends inquiry packets on a previously agreed sequence of 32 of the 79 available frequencies and scans for replies. Mobile devices that allow themselves to be discoverable issue an inquiry response that contain the device address, clock setting, class of device, used page scan mode, and device name. These inquiry responses, much like the BLE advertisement packets, contain uniquely identifiable information for each mobile device, which is stored and used again to re-identify the same devices if they ever come again in proximity. In one embodiment, the BLE device discovery may happen before the classic Bluetooth device discovery, and in another embodiment classic Bluetooth device discovery may be executed before BLE device discovery. Mobile device Bluetooth identification module is part of the data input device (103) but it may not always be physically enclosed in the same packaging. In some embodiments, it can be located at a different place and packaged within a different physical enclosure. Mobile device Bluetooth identification module can be implemented on specifically programmed general-purpose computers and/or virtual machines that provide functionality of physical computers, as well as with System on Chip (SoC), Application Specific Integrated Circuit (ASIC), Field Programmable Gate Array (FPGA), embedded systems such as Single Board Computer (SBC) or System on Module (SoM) built with Microcontrollers (MCUs) and/or Digital Signal Processors (DSPs), and combinations thereof.

Spatial position module (107) is an electronic circuit and software comprising several components that can individually, or in concert with each other, determine the absolute position of the data input device (103) in reference to a 3D coordinate system, and/or data input device position relative to the location in which it is placed, and/or data input device position relative to the surrounding items in a location where it is placed, and/or spatial data related to a person within the detection range of the data input device. Spatial position module has been shown in FIGS. 14B and 15. Different embodiments of the spatial position module may contain different components. One component of the spatial position module is a Bluetooth scanner (402), which runs the "mobile device Bluetooth identification module" algorithm. This algorithm, described previously in detail, can detect the signals emitted by Bluetooth Low Energy (BLE) devices, and can also estimate the distance from the BLE devices by measuring the power level of the RF signal from the Received Signal Strength Indicator (RSSI) value. Bluetooth direction finding feature also allows the algorithm to determine the direction of the signal, thus achieving centimeter-level location accuracy. BLE devices commonly found in retail stores include beacons, whose exact locations inside the store are usually known in advance. By combining the RSSI data and the directional information, the Bluetooth scanner can accurately fix the location of the data input device. In addition, beacons often contain explicit location information (e.g. Eddystone beacons have latitude-longitude data, Google Place ID and even an indoor floor plan; iBeacon has UUID, and Major and Minor parameters) that helps to further pinpoint the location of the data input device. Another component of the spatial position module is an RFID reader (403), which can scan RFID signals and determine the position of the data input device from an RFID tag number that contains the position information of an item or a store shelf to which the tag is attached. Another component of the spatial position module is a Visual Marker reader (404), which takes video or image input containing at least one visual marker, and interprets the encoded information contained therein by using commonly available software tools. Visual markers include, but not limited to, one-dimensional (1D) barcode such as UPC code, two-dimensional (2D) barcode such as QR code, and fiducial markers such as AprilTag, ARTag or ArUco Marker. The visual markers, affixed to designated mounting points whose positions are known in advance, can be read by the data input device to determine its own position from the positional data contained in the markers. Alternately, the employee interface device (1201) may read the visual markers by using the same software found in the visual marker reader, and transmit the data to the data input device for position determination. Another component of the spatial position module is a Range Finder (405), which measures its distance from an object using one or two dimensional laser sensors, and/or ultrasonic sensors, and/or infrared sensors, and/or radar sensor or other types of sensors that use electromagnetic radiation for distance measurement. Range Finder's function is twofold. On one hand, it finds the horizontal distance data (802), which is the distance of one or more human faces within the field of view of a data input device that are detected through well known face detection algorithms such as Haar-Cascade classifier or MTCNN. On the other hand, it finds the height-above-the-floor data (805), which is the height of a data input device above a solid flat horizontal surface such as the floor or other fixed reference planes. The combination of the horizontal distance data and the height-above-the-floor data allows the data input device to determine the position of human faces in reference to a 3D coordinate system whose origin is located on the data input device's own image sensor plane. The Attribution module, described later in detail, uses this information to map gaze vectors defined in reference to a 3D coordinate system centered around the eyes on the human face to a different coordinate system coplanar with the data input device. This is done through 3D coordinate system transformation methods that require the horizontal distance data and the height-above-the-floor data. Another component of the spatial position module is a Wi-Fi positioning module (406), which allows the data input device to fix its location by using the RF signal characteristics of nearby Wi-Fi routers, switches and access points as reference.

Wi-fi positioning module (406) is software that performs the task of Wi-Fi positioning, which is a geolocation technology that uses the RF signal characteristics of nearby Wi-Fi routers, switches and access points to discover where a device is located. It is used where satellite navigation such as GPS is inadequate due to various causes including multipath and signal blockage indoors, or where acquiring a satellite fix would take too long. Wi-Fi positioning systems belong to the more generalized category of indoor positioning systems. Many algorithms exist to accomplish Wi-Fi positioning, including, Received Signal Strength Indication (RSSI), Fingerprinting, Angle of Arrival (AoA) and Time of Flight (ToF) based techniques. A review of different Wi-Fi positioning systems can be found in the following paper (as well as many other sources): Evolution of Indoor Positioning Technologies: A Survey. While the current disclosure is not dependent on the choice of a specific method, an embodiment of the Wi-Fi Positioning module has been shown in FIGS. 14B and 15. Wi-Fi positioning module is part of the data input device (103) but it may not always be physically enclosed in the same packaging. In some embodiments, it can be located at a different place and packaged within a different physical enclosure. Wi-Fi positioning module can be implemented on specifically programmed general-purpose computers and/or virtual machines that provide functionality of physical computers, as well as with System on Chip (SoC), Application Specific Integrated Circuit (ASIC), Field Programmable Gate Array (FPGA), embedded systems such as Single Board Computer (SBC) or System on Module (SoM) built with Microcontrollers (MCUs) and/or Digital Signal Processors (DSPs), and combinations thereof.

The spatial position module is part of the data input device (103) but it may not always be physically enclosed in the same packaging. In some embodiments, it can be located at a different place and packaged within a different physical enclosure. The spatial position module can be implemented with System on Chip (SoC), Application Specific Integrated Circuit (ASIC), Field Programmable Gate Array (FPGA), embedded system such as Single Board Computer (SBC) or System on Module (SoM) built with Microcontrollers (MCUs) and/or Digital Signal Processors (DSPs), and combinations thereof.

Video input module (104) is an electronic circuit and software that takes raw, uncompressed, analog video as input, and produces a compressed digital video as output. Although video input modules can be built in many different ways, a common implementation includes a three stage design, where the video is first captured though an optical lens and an image sensor (which can be a CMOS or CCD sensor); then it gets converted to a digital format by an analog to digital converter (which can be implemented in hardware or software); and finally the digital video is compressed with the help of a video codec such as H.264, MPEG4 or VP8 (which can be implemented in hardware or software). There could be additional components present such as noise cancellation filters and signal quality improvement mechanisms. It's also quite common these days to see IP Camera modules that integrate all of the above functions in a single chip. The video input module has been shown in FIGS. 3, 11, and 13. The video input module is part of the data input device (103) but it may not always be physically enclosed in the same packaging. In some embodiments, it can be located at a different place and packaged within a different physical enclosure. Other than the optical lens, the rest of the components and functions can be implemented with System on Chip (SoC), Application Specific Integrated Circuit (ASIC), Field Programmable Gate Array (FPGA), embedded systems such as Single Board Computer (SBC) or System on Module (SoM) built with Microcontrollers (MCUs) and/or Digital Signal Processors (DSPs), and combinations thereof.

In FIG. 3, the at least one video input module (104) is shown receiving video input (1040) and providing video data (1004) as output. The at least one audio input module (105) is shown receiving audio input (1050) and providing audio data (1005) as output. The at least one electronic device identification module (106) is shown receiving electronic device signal input (1060) and providing electronic device identification data (1006) as output. The at least one spatial position module (107) is shown receiving spatial position input (1070) and providing spatial position data (1007). Also shown is at least one data input device processor (108), receiving video data (1004), audio data (1005), electronic device identification data (1006), and spatial position data (1007). The at least one data input device processor (108) provides data input device output (1008). The at least one data input device processor (108) may include but is not limited to devices that provide data aggregation, data streaming, data separation, data flow management, data processing, and combinations thereof.

Data input device processor (108) is electronic circuitry and software within the data input device that performs basic arithmetic, logic, controlling, and input/output operations specified by the instructions in a program. The majority of the tasks performed by the data input device processor at the application level are common data and media (video and/or image and/or audio) processing operations, such as aggregation, scheduling, streaming, data communication, feed separation, flow management, and combinations thereof. In addition, the data input device processor performs all the necessary Open Systems Interconnection (OSI) model functions from layer 1 through layer 6 to support the operation of the data input device. The physical structure of the data input device processor can take many different forms, which includes, but not limited to, Microprocessor, Microcontroller, System on Chip (SoC), Digital Signal Processors (DSP), Application Specific Integrated Circuit (ASIC), Field Programmable Gate Array (FPGA), or Application Specific Standard Part (ASSP). It doesn't even have to be a monolithic chip. The physical structure can also include Single Board Computer (SBC) or a System on Module (SoM) built with multiple Microcontrollers (MCUs) and/or Digital Signal Processors (DSPs), where each component handles a separate application level task. In one embodiment shown in FIGS. 11 and 12, where the data input device processor is part of the core data input device, the data input device processor may have components for media feed separator (219) and core data aggregator (220) that can be on a single data input device processor or spread across multiple processors. Core data aggregator (220) aggregates all the data generated in core data input device (200) and sends them in a combined stream of emotion and identity output data (221) In another embodiment, shown in FIG. 13, where the data input device processor is part of the edge data input device, it may have components for edge data aggregator (302) and media streamer (301) that can be on a single data input device processor or spread across multiple processors. A more generic representation of the data input device processor is shown in FIG. 3 and described in paragraph 63.

A data input device (103) may also be a distributed device, where components are distributed and may be located in separate physical enclosures in a space or as affixed to an object. A most basic construction may be a simple digital camera with one video input, one audio input, a range finder, and a MAC ID reader. An alternate construction may include a video input, audio input, and MAC ID reader embedded in a consumer electronic device, such as a mobile phone, tablet, or television. A distributed construction example may include: multiple video input modules affixed to shelves surrounding a retail space aisle, audio input modules affixed to shelves at regular intervals, spatial position modules affixed at varying shelf heights and at regular distance intervals along the aisle, a MAC ID reader at the aisle entrance and exit, and all modules connected to a networked multi-processor.

Figure 4:
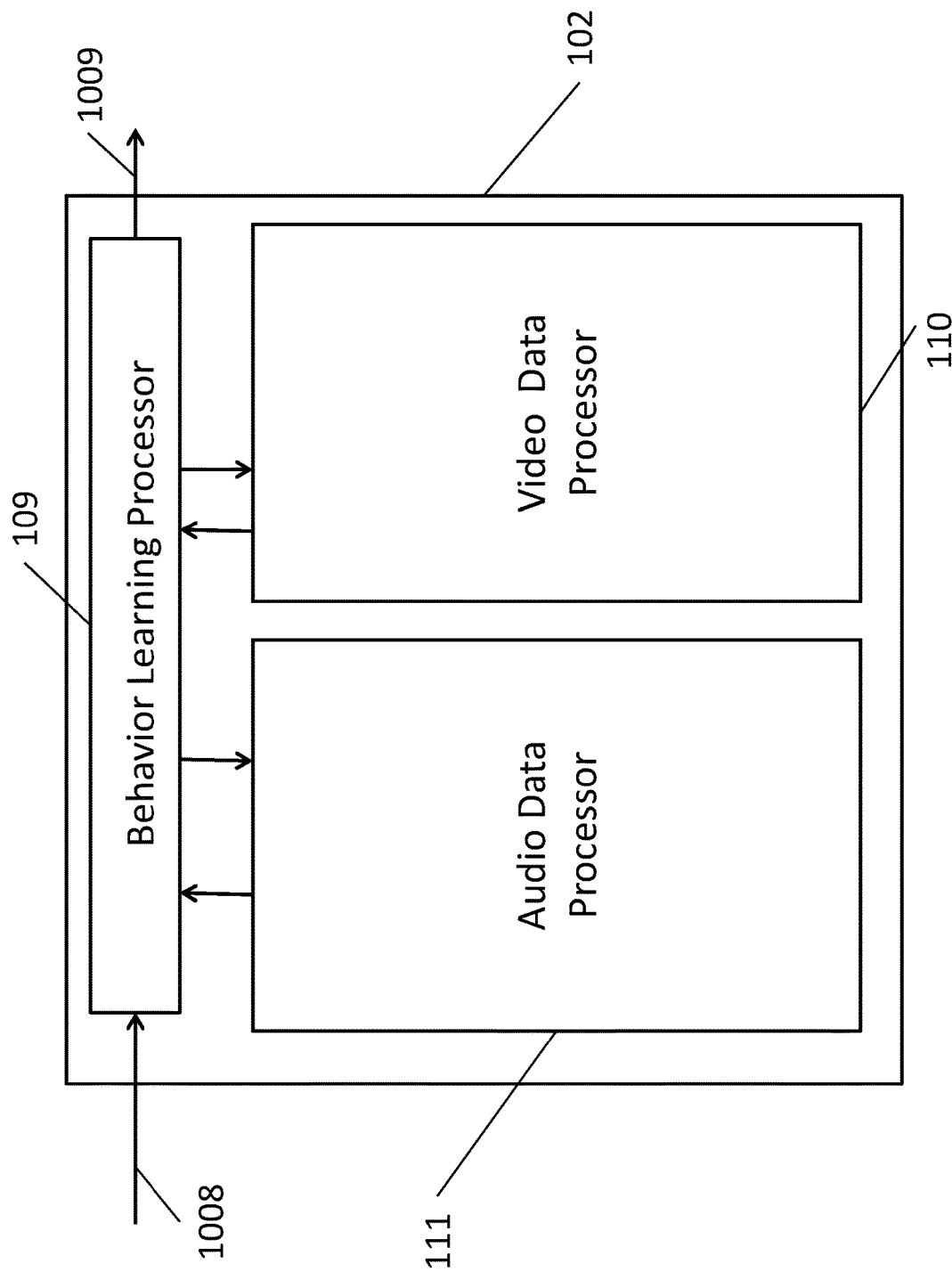
FIG. 4 is a block diagram overview of a behavior learning system.

FIG. 4 is a block diagram depicting a broad overview of a behavior learning system (102). Shown are at least one audio data processor (111), at least one video data processor (110) and at least one behavior learning processor (109). Audio data processor (111) represents a group consisting of at least one phonetic emotional analysis module (205), at least one audio preprocessor module (207), and at least one natural language processing module (204). Video data processor (110) represents a group consisting of at least one gaze tracking module (201), at least one facial recognition module (244), at least one facial expression recognition module (202), at least one demographic analysis module (203). Both the video data processor and audio data processor have been shown in FIGS. 4, 6, 7, and 8. All of the individual modules in the video data processor and audio data processor have been described separately in detail. Behavior learning processor (109) is the electronic circuitry and software within the data input device that performs basic arithmetic, logic, controlling, and input/output operations specified by the instructions in a program. The majority of the tasks performed by the behavior learning processor at the application level are common data and media (video, image, audio) processing operations, such as aggregation, scheduling, streaming, data communication, feed separation, flow management, and combinations thereof. In addition, the data input device processor performs all the necessary Open Systems Interconnection (OSI) model functions from layer 1 through layer 6 to support the operation of the data input device. In an embodiment where the behavior learning system (102) is within a data input device (103), the behavior learning processor (109) and the data input processor (108) may be the same hardware or software entity. But when the behavior learning system is partially or completely outside of the data input device, as shown in the various embodiments in FIG. 2, they will be two separate entities. The behavior learning processor has been shown in FIGS. 4 and 19. The physical structure of behavior learning processor can take many different forms, which includes, but not limited to, Microprocessor, Microcontroller, System on Chip (SoC), Digital Signal Processors (DSP), Application Specific Integrated Circuit (ASIC), Field Programmable Gate Array (FPGA), or Application Specific Standard Part (ASSP). It doesn't even have to be a monolithic chip. The physical structure can also include Single Board Computer (SBC) or a System on Module (SoM) built with multiple Microcontrollers (MCUs) and/or Digital Signal Processors (DSPs), where each component handles a separate application level task.

Data input device output (1008) is received by the at least one behavior learning processor (109), communicating with at least one video processor (110) and at least one audio processor (111). The at least one behavior learning processor (109) is shown transmitting behavior learning output data (1009). The behavior learning system may receive data from or transmit data to other system and modules (not shown) and/or the behavior learning system may communicate with other devices or modules (not shown). Data input device output (1008) may be multiple streams of data or a single aggregated stream of data. Behavior learning output data (1009) may be multiple streams of data or a single aggregated stream of data.

Figure 5:
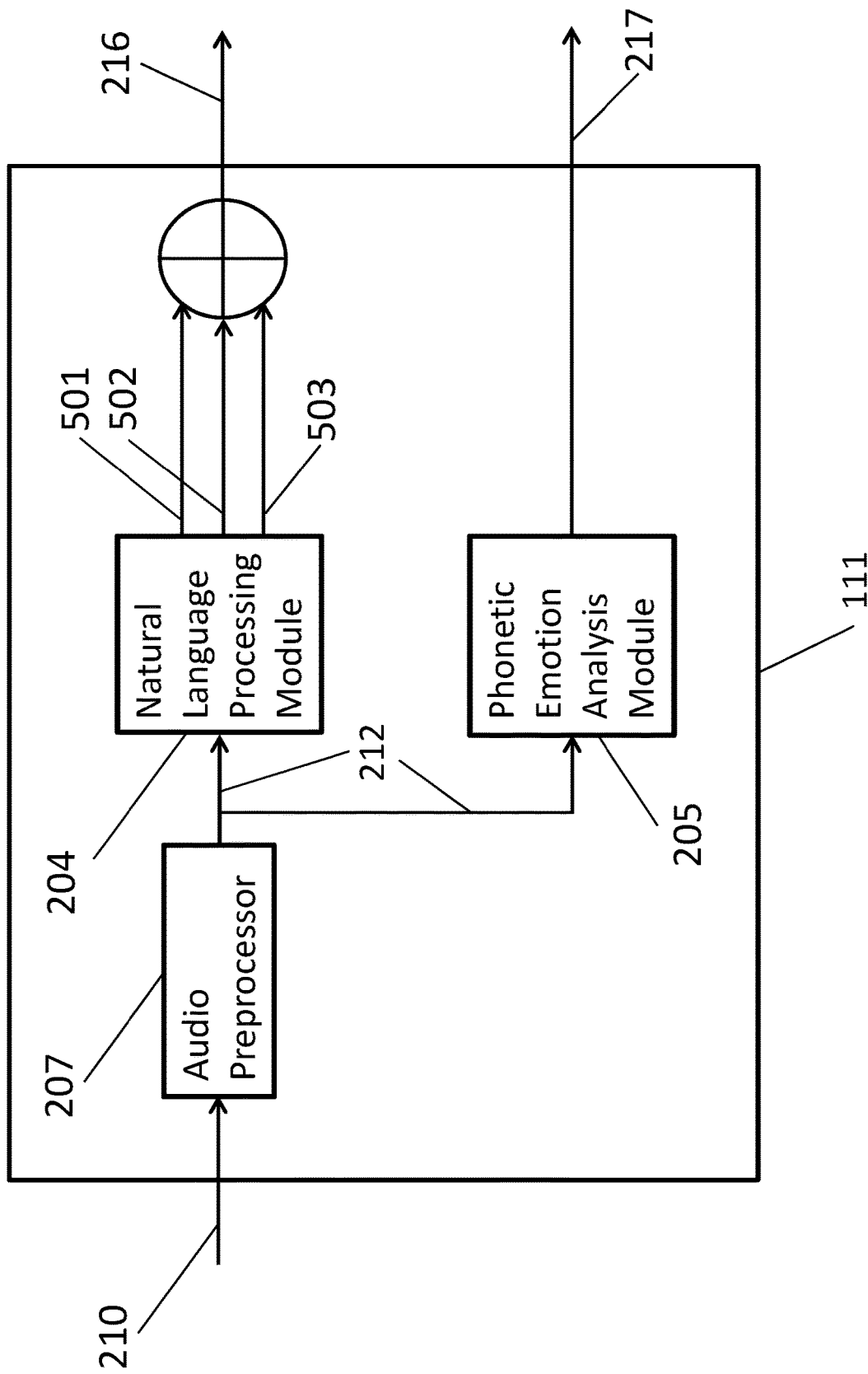
FIG. 5 is a block diagram of an audio processor.

FIG. 5 depicts an audio processor (111) having an audio preprocessor (207), at least one natural language processing module (204), and at least one phonetic emotional analysis module (205). Audio output (210) is received by the audio preprocessor (207), where it is processed. Audio preprocessor output (212) is transmitted to the natural language processing module (204) for further processing and to the phonetic emotional analysis module (205) for further processing. The natural language processing module (204) most commonly provides sentiment data (501), intent data (502), and entity recognition data (503), which is depicted as separate streams but is often combined into a single data stream, natural language output data (216) for transmission. The phonetic emotional analysis module (205) provides phonetic emotional analysis data (217). At least one behavior learning processor (109) may transmit, or aggregate and transmit, the phonetic emotional analysis data (217) and the natural language output (216).

Figure 6:
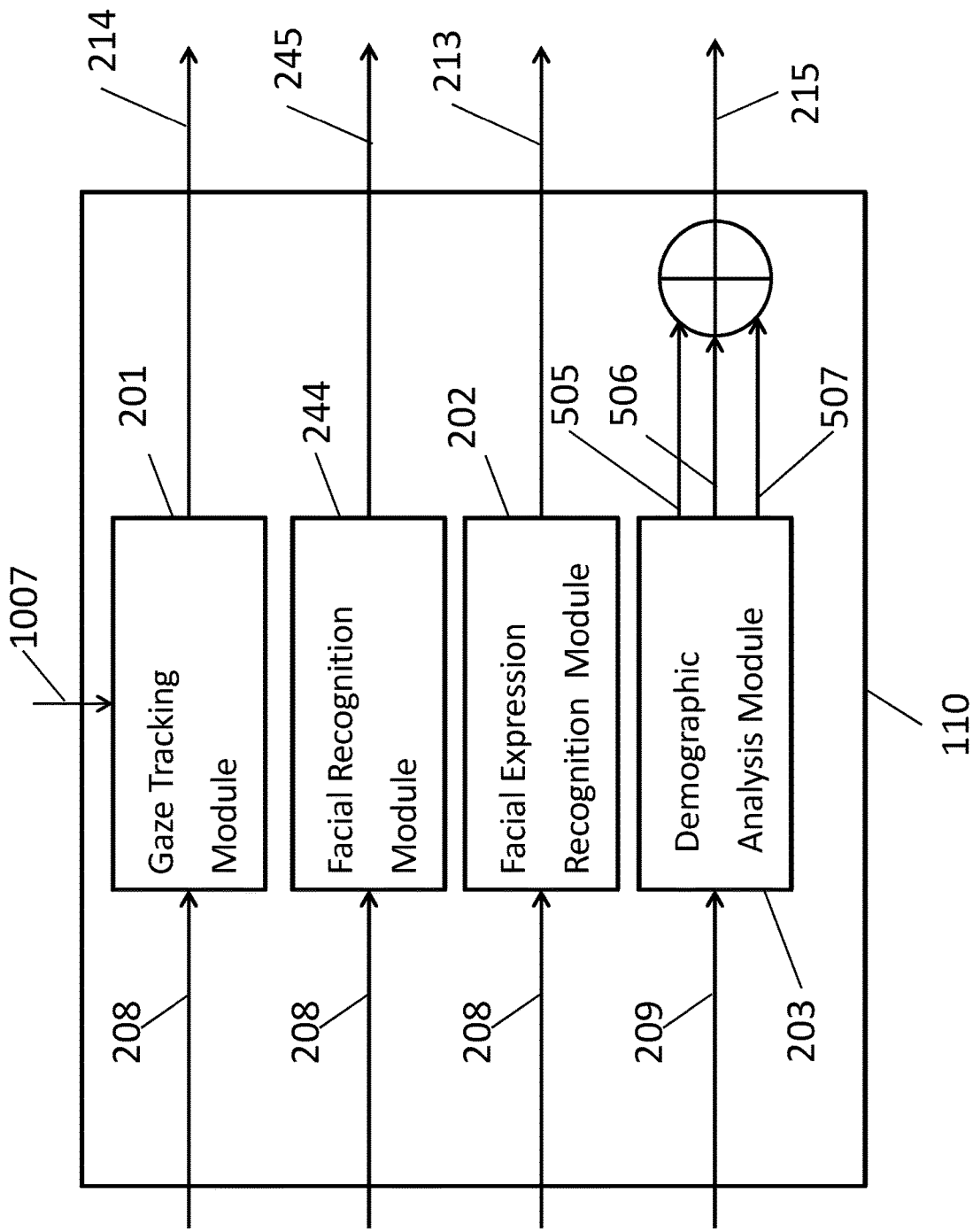
FIG. 6 is a block diagram of a video processor.

FIG. 6 depicts a video processor (110) having at least one facial expression recognition module (202), at least one gaze tracking module (201), and least one facial recognition module (244), and at least one demographic analysis module (203). Facial expression recognition module is software that performs the function of facial expression recognition, which is a technology that uses facial landmarks to detect emotions expressed in human faces through computer algorithms. The algorithms can detect the six basic or universal human expressions: happiness, sadness, anger, surprise, fear, and disgust. Some algorithms use a slight variant with seven different categories: happiness, sadness, anger, surprise, contempt, fear, and disgust. A facial expression recognition algorithm takes its input from a video or image containing human face, and executes three separate algorithms in sequence: facial landmark detection (also called, feature extraction), facial expression encoding, and facial emotion classification. At the landmark detection stage, well known face detection algorithms, such as Haar-Cascade classifier, Histogram of Oriented Gradients feature descriptor or MTCNN can be used to extract facial landmarks indicative of a given facial expression. At the facial expression encoding stage, well known algorithms, such as Facial Action Coding System (FACS) can be used for continuous encoding models, which deconstruct facial landmarks into specific action units and their temporal segments that produce the expression. Alternately, categorical models can be used that describe emotions in terms of discrete basic emotions encoded with only spatial information from the current single image or temporal relation among contiguous frames in the input facial expression sequence. At the classification stage, well known classification algorithms, such as Support Vector Machine, Naive Bayes classifier, Logistic Regression, k-Nearest Neighbor or Convolutional Neural Networks can be used to identify the category in which an encoded expression belongs based on a large training dataset containing instances of known category membership. While the current disclosure is not dependent on the choice of a specific method in any of the aforementioned three stages, an embodiment of the facial expression recognition module has already been shown in FIG. 24 using the three stage execution architecture described above that should be known to a person skilled in the art. A survey of different facial expression recognition technologies can be found in the following paper (as well as many other sources): "A Survey on Human Face Expression Recognition Techniques". Facial expression recognition module can be implemented on specifically programmed general-purpose computers and/or virtual machines that provide functionality of physical computers, with preferred embodiment being one where the physical computers and/or virtual machines are equipped with Graphics Processing Unit. With the recent technological advances in AI-enabled semiconductor chips, it is also possible to implement the facial expression recognition module with System on Chip (SoC), Application Specific Integrated Circuit (ASIC), Field Programmable Gate Array (FPGA), embedded system such as Single Board Computer (SBC) or System on Module (SoM) built with Microcontrollers (MCUs) and/or Digital Signal Processors (DSPs), and combinations thereof.

Gaze Tracking Module (201) is software that performs the function of Gaze tracking, which is a technology that can locate the point of a person's gaze through computer algorithms. Some physical structures to implement gaze tracking algorithms involve wearable devices attached to the eye, while others rely on images of the eye taken without any physical contact. There are many available algorithms for gaze tracking, which should be known to a person skilled in the art as the methods existed since 1879 and greatly advanced in the 1980s through computer assisted techniques (ref: https://en.wikipedia.org/wiki/Eye_tracking#History). Gaze tracking methods can be broadly classified into two categories: model-based (also called, feature-based) and appearance-based. Model-based methods use a geometric eye model and can be further divided into pupil center corneal reflection (PCCR) and shape-based methods, depending on whether they require external light sources to detect eye features, or directly infer gaze directions from observed eye shapes, such as pupil centre or iris edges. Recent research works focus more on appearance-based methods as they can predict gaze direction with low-resolution images if a large volume of data is available to train a neural network based model. Appearance-based methods learn a mapping function, which directly maps an eye image to a gaze estimation vector in 3D space. Different mapping functions have been explored, including Neural Networks, Local Interpolation, Gaussian process regression, and Random Forests. A review of various algorithms and examples of applications employing these technologies can be found in the paper Eye Tracking and Head Movement Detection: A State-of-Art Survey. For example, section II of the paper (p. 2-5), described various methods such as sensor based gaze tracking, computer vision based gaze tracking through pattern recognition (see Raudonis et al., Tang and Zhang, Kuo et al. page 2; Hotrakool et al. page 3), computer vision based gaze tracking through corneal reflection (see Yang et al. page 3), computer vision based gaze tracking through pupil illumination (see Yoo et al. page 5), computer vision based gaze tracking through eye models (see Zhu and Ji, page 5), and computer vision based gaze tracking through hybrid eye tracking (see Huang et al., Coetzer and Hancke; page 5). While the current disclosure is not dependent on the choice of a specific method, an embodiment of the Gaze tracking module has already been shown in FIG. 16 using algorithms that should be known to a person skilled in the art. In this embodiment, the Computer Vision System (206) can use any of the well known algorithms for facial landmark detection that can determine eye position from video or static images containing human face. These algorithms include, but not limited to, Haar-Cascade classifier, Histogram of Oriented Gradients feature descriptor, Multi-task Cascaded Convolutional Neural Networks (MTCNN), Maximum-Margin Object Detector with Convolutional Neural Network, Fisherfaces algorithm using Linear Discriminant Analysis, Eigenfaces algorithm through Principal Component Analysis and Local Binary Patterns Histograms. Similarly, the Computer Vision System (206) can use any of the well known algorithms to determine head orientation, also known as head pose estimation, from video or static image images containing human face. These algorithms may include, but not limited to, appearance template methods, detector array methods, and nonlinear regression methods. A review of various head pose estimation algorithms can be found in the paper "Head Pose Estimation in Computer Vision: A Survey"—see page 609-616. The spatial position data (1007) has been described earlier in reference to the spatial position module (107). The Transfer Function module (707) represents any mathematical function that can model the system's output for each possible input. In this embodiment, the input of the Transfer Function module comprises eye position (804), head orientation (806) and spatial position data (1007). The output of the Transfer Function module (707) is the field of view data (708), which is the human visual field represented by line of sight vectors (also called, gaze vectors) in a three dimensional space surrounding the eyes. This is essentially the output from a gaze tracking system using any of the aforementioned algorithms, which has a mathematical relationship with the input data through a transfer function specific to the algorithm chosen for implementation. The Attribution module (709) represents another mathematical function that calculates the point of intersection of the gaze vector with a plane surface in a three dimensional space where the gaze is directed, and associating that point with a known reference object. For a retail application, this can be the vertical plane on a store shelf displaying the front-face of merchandise where a customer is looking at. For an augmented reality or virtual reality application, this can be the virtual objects in a 3D space. The Attribution module calculates this point of intersection by first performing a 3D coordinate transformation of the gaze vector from a coordinate system centered around the eyes to a second coordinate system located on the plane containing the objects of interest (which is store merchandise for retail application, commonly found in Planogram stored in Primary Data Repository) by combining axes rotations, scale change and origin shifts. The 3D transformation between two coordinate systems requires a translation vector and a rotational matrix. The translational vector is calculated from the data provided by the range finder (405). The rotational matrix is calculated by estimating the pose (orientation) of the human face with respect to the data input device by solving the Perspective-n-Point problem using well known algorithms such as Random Sample Consensus (RANSAC) or Levenberg-Marquardt optimization method that estimate pose by mapping a set of facial landmark points with known 3D coordinates to their corresponding 2D projections in the image plane of the data input device whose intrinsic parameters (focal length of the lens, optical center location on the image sensor plane and the radial distortion parameters) are known in advance through calibration. Once the 3D coordinate transformation is completed, the attribution module associates the point of intersection of the gaze vector on this second plane with a specific known object with the help of a reference map for that surface. For retail application, this reference map is the planogram data that specifies the size and location of each product on a store shelf. Gaze tracking module can be implemented on specifically programmed general-purpose computers and/or virtual machines that provide functionality of physical computers, with preferred embodiment being one where the physical computers and/or virtual machines are equipped with Graphics Processing Unit. With the recent technological advances in AI-enabled semiconductor chips, it is also possible to implement the gaze tracking module with System on Chip (SoC), Application Specific Integrated Circuit (ASIC), Field Programmable Gate Array (FPGA), embedded system such as Single Board Computer (SBC) or System on Module (SoM) built with Microcontrollers (MCUs) and/or Digital Signal Processors (DSPs), and combinations thereof.

Facial recognition module (244) is software that performs the task of facial recognition, which is a technology that identifies or verifies a person from a digital image, or an image frame sampled from a video source. Facial recognition systems work by comparing selected facial features from a given image with features from many different faces stored in a database. Facial recognition includes both face identification (also called, one-to-one comparison) and face verification (also called, face authentication or one-to-one matching). Face identification identifies a person by comparing a face image with all the registered persons in a database. Face verification validates claimed identity of a person based on comparing the current image of a face with its reference image stored in a database, and either accepts or rejects the identity claim. A facial recognition algorithm takes its input from a video or image containing human face, and executes three separate algorithms in sequence: facial landmark detection (also called, feature extraction), cluster analysis, and confidence score evaluation. At the landmark detection stage, well known face detection algorithms, such as Haar-Cascade classifier, Histogram of Oriented Gradients feature descriptor or MTCNN can be used to extract facial landmarks. At the cluster analysis stage, extracted features are used to search for other images in a database with matching features so that the probe image is more similar to one (or more) images than the others. At the confidence score evaluation stage, the matched images are assigned confidence scores based on the probability of the probe image belonging to one matched image vs. another. Quite often, face recognition methods combine the second and the third stage into one algorithm. Popular face recognition algorithms include Principal Component Analysis using Eigenfaces, Linear Discriminant Analysis, Elastic Bunch Graph Matching using the Fisherface algorithm, Hidden Markov Model, Triplet Loss Function using Neural Network, Multilinear Subspace Learning using Tensor representation, and Dynamic Link Matching using Neural Network. While the current disclosure is not dependent on the choice of a specific method in any of the aforementioned three stages, an embodiment of the facial recognition module has already been shown in FIG. 29 using the three stage framework described above that should be known to a person skilled in the art. A review of different facial recognition systems can be found in the following paper (as well as many other sources): "Face Recognition: A Survey". Facial recognition module can be implemented on specifically programmed general-purpose computers and/or virtual machines that provide functionality of physical computers, with preferred embodiment being one where the physical computers and/or virtual machines are equipped with Graphics Processing Unit. With the recent technological advances in AI-enabled semiconductor chips, it is also possible to implement the facial recognition module with System on Chip (SoC), Application Specific Integrated Circuit (ASIC), Field Programmable Gate Array (FPGA), embedded system such as Single Board Computer (SBC) or System on Module (SoM) built with Microcontrollers (MCUs) and/or Digital Signal Processors (DSPs), and combinations thereof In FIG. 6, video output (208) is received by the facial expression recognition module (202); it is processed, and facial expression output data (213) is transmitted. The facial expression output data (213) most commonly comprises facial emotion data. Video output (208) and spatial position data (1007) are shown being received by the gaze tracking module (201), it is processed, and gaze tracking data (214) is transmitted. Video output (208) is shown being received by the facial recognition module (244), it is processed, and facial recognition data (245) is transmitted. Image output data (209) is received and processed by the demographic analysis module (203). The demographic analysis module (203) most commonly transmits age (505), race (506), and gender (507), which is depicted as separate streams but is often combined into a single data stream, demographic analysis data (215).

Demographic analysis module (203) is software that performs the task of demographic analysis, which in the context of the current disclosure, pertains to technology that identifies the race, age and gender of a person by analyzing their facial image through computer algorithms. A demographic analysis system takes its input from a video or image containing human face, and executes separate algorithms in sequence: facial landmark detection (also called, feature extraction), race classification, age classification and gender classification. At the landmark detection stage, well known face detection algorithms, such as Haar-Cascade classifier, Histogram of Oriented Gradients feature descriptor or MTCNN can be used to extract facial landmarks indicative of a specific race, age or gender through class-differentiating features. At the classification stage, well known classification algorithms, such as Support Vector Machine, Naive Bayes classifier, Logistic Regression, k-Nearest Neighbor or Convolutional Neural Networks can be used to identify the category in which the detected face belongs based on a large training dataset with instances of known category membership containing extracted features. While the current disclosure is not dependent on the choice of a specific method in any of the aforementioned stages, an embodiment of the demographic analysis module has been shown in FIG. 25 using the multi-stage framework described above that should be known to a person skilled in the art. Demographic analysis module can be implemented on specifically programmed general-purpose computers and/or virtual machines that provide functionality of physical computers, with preferred embodiment being one where the physical computers and/or virtual machines are equipped with Graphics Processing Unit. With the recent technological advances in AI-enabled semiconductor chips, it is also possible to implement the demographic analysis module with System on Chip (SoC), Application Specific Integrated Circuit (ASIC), Field Programmable Gate Array (FPGA), embedded system such as Single Board Computer (SBC) or System on Module (SoM) built with Microcontrollers (MCUs) and/or Digital Signal Processors (DSPs), and combinations thereof.

Figure 7:
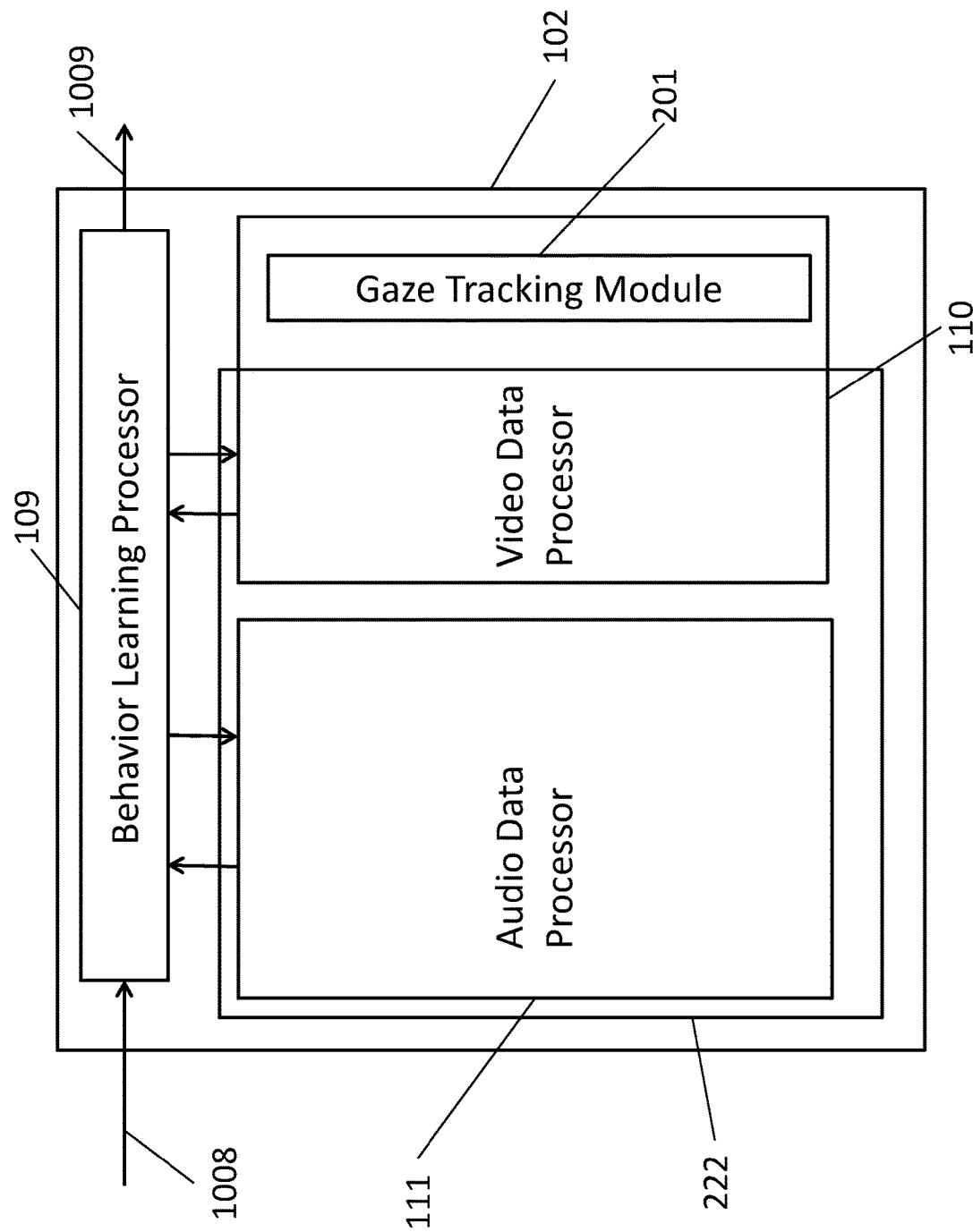
FIG. 7 is a block diagram of a behavior learning system showing an emotion and identity detection system and a gaze tracking module.

FIG. 7 depicts a behavior learning system (102) showing an emotion and identity detection system (222). An audio processor (111), which may also be referred to as an audio data processor, and a portion of a video processor (110), which may also be referred to as a video data processor, are shown encapsulated by the emotion and identity detection system (222), with a gaze tracking module (201) being part of the video processor (110) but outside the emotion and identity detection system (222). The emotion and identity detection system (222) refers to a grouping of modules that provide emotion and/or identity data, where the modules may also require at least one machine learning system to provide the emotion and/or identity data. A single machine learning system for all the emotion and identity modules within the audio processor (111) and the video processor (110) may be possible; but it is more likely that there is at least one machine learning system per module within the audio processor (111) and at least one per module within the video processor (110). The gaze tracking module (201) is depicted outside the emotion and identity detection system (222) because its functions are normally performed by an electronic computing device and it normally does not require a machine learning system to perform its functions. While not depicted as part of the emotion and identity detection system, the gaze tracking module (201) may use a machine learning system in certain embodiments to determine a subject's field of view and to identify items viewed by the subject.

Figure 8:
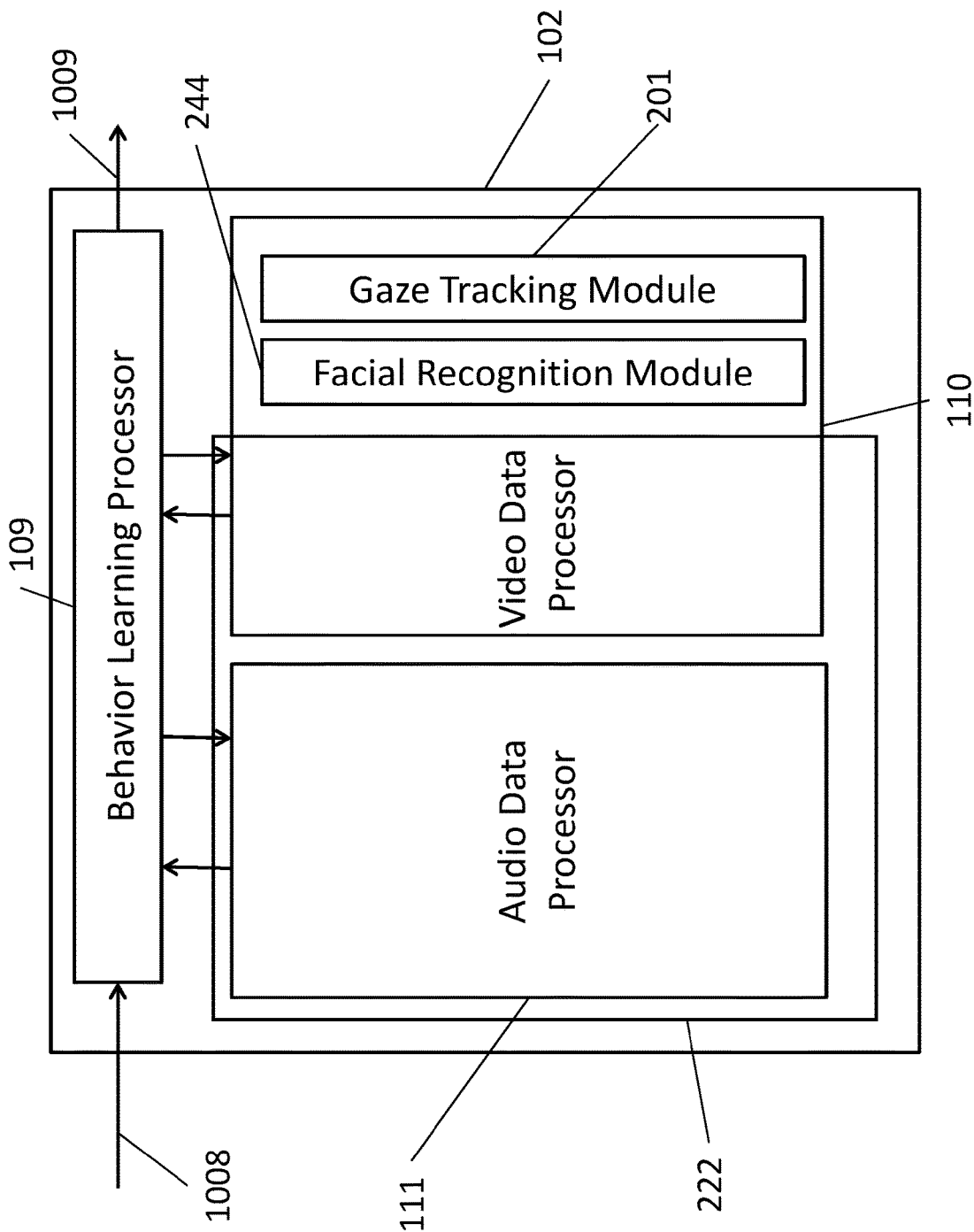
FIG. 8 is a block diagram of a behavior learning system showing an emotion and identity detection system, a gaze tracking module, and a facial recognition module.

FIG. 8 is similar to FIG. 7 with the difference being that a facial recognition module (244) is depicted outside the emotion and identity detection system (222). The facial recognition module (244) may not always need a machine learning system to perform its functions. In certain embodiments, a gaze tracking module (201) and the facial recognition module (244) may both perform their functions without being a part of the emotion and identity detection system (222).

Figure 9:
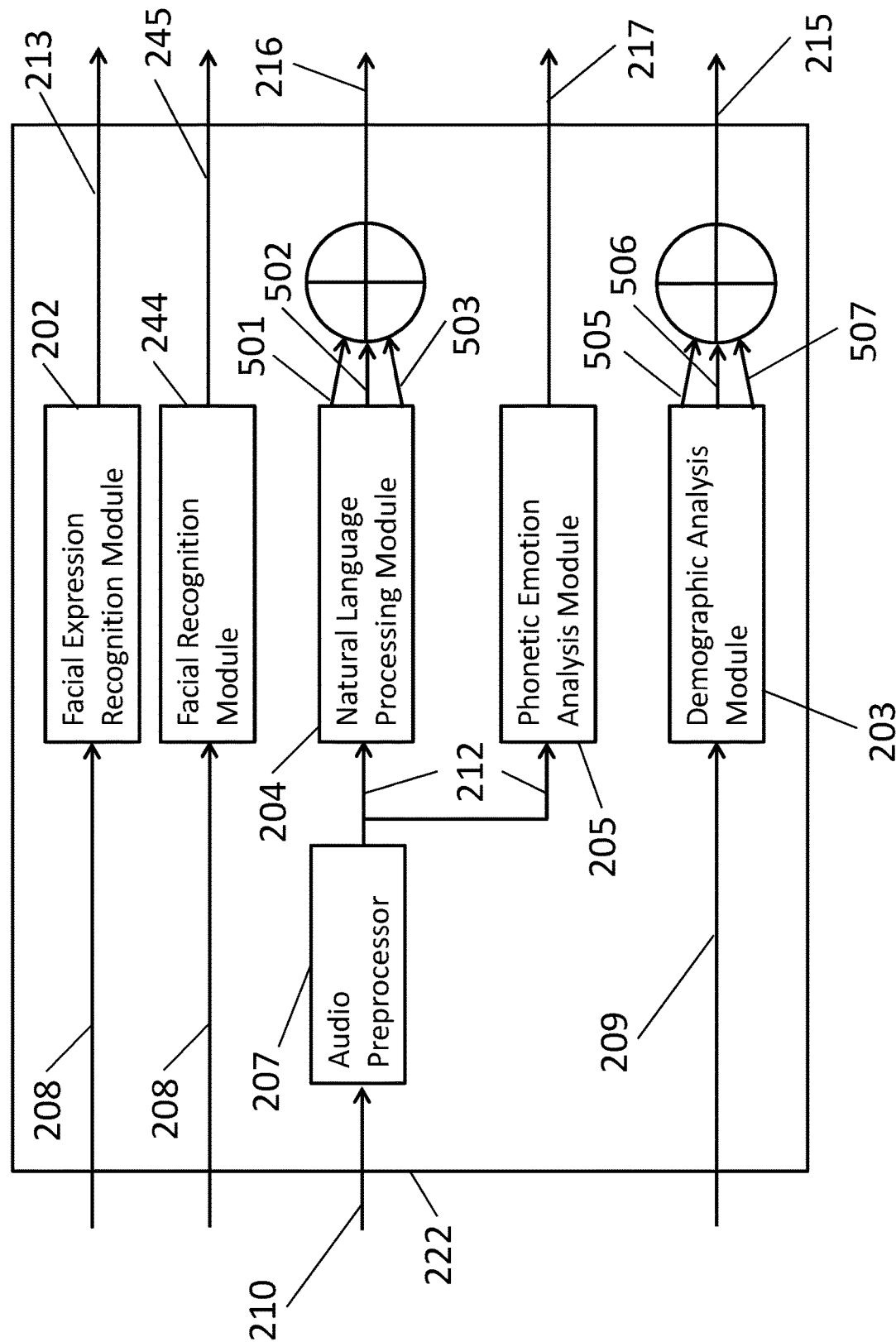
FIG. 9 is a block diagram depicting an emotion and identity detection system.

FIG. 9 depicts modules that may be part of the emotion and identity detection system (222). At least one machine learning system, referred to here as an emotion and identity detection system, is needed to perform some of the functions within the behavior learning system. The emotion and identity detection system may encompass multiple machine learning systems. Common embodiments include at least one machine learning system and/or at least one deep learning system. Deep learning systems are a type of machine learning system that generally uses a model based convolutional neural networks with a high level of dimensionality.

FIG. 9 shows an audio preprocessor (207), a facial expression recognition module (202), a facial recognition module (244), a natural language processing module (204), a phonetic emotion analysis module (205), and a demographic analysis module (203). Phonetic emotional analysis module (205) is software that performs the task of phonetic emotion analysis, which identifies emotional content of speech based only on acoustic properties without using any word information. Different methods classify emotions into different number of classes. Most common classification schemes are either seven classes (Anger, Fear, Happiness, Disgust, Boredom, Sadness, and Neutral) or six classes (Anger, Disgust, Fear, Happiness, Sadness, and Surprise) of phonetic emotions. A phonetic emotional analysis algorithm takes its input from a live audio stream or stored audio file containing human speech, and executes three separate algorithms in sequence: signal processing, feature extraction, and classification of audio signals into pre-defined emotion categories. At the signal processing stage, several tasks are executed to prepare the audio signal for feature extraction using well known digital signal processing algorithms. These tasks may include, but not limited to, data compression, sound equalization (process of adjusting the balance between frequency components), acoustic localization (process to determine the distance and direction of sound source), noise cancellation, speaker diarization (process of partitioning an audio signal into homogeneous segments according to the speaker identity in a multi-speaker environment), voice activity detection (process of eliminating intervals containing no human speech), echo cancellation, dereverberation (process of reducing or removing reverberation of sound), beamforming (process of extracting an audio signal from a specific direction and reducing the effect of signals from other directions), dynamic range compression (process of reducing the volume of loud sounds and/or amplifying quiet sounds) and audio filtering (process of amplifying signals in the audible frequency range from 0 Hz to 20 KHz and attenuating other signals outside of this range). At the feature extraction stage, processed speech segments are transformed into an annotated compact representation with labels for phonetic features and linguistic attributes that can be used for emotion classification through class-differentiating features. Phonetic features may include, but not limited to, loudness, tone, tempo, duration, harmonics to noise ratio, jitter, shimmer, voice breaks, spectral energy, spectral spread, spectral centroid, Mel-frequency Cepstral Coefficients (MFCCs), pitch, intensity, formant, prosody, crosstalk between people, inflection, and various statistical functionals and transformations to these features such as means, extremes, peaks, percentiles and deviations. Linguistic attributes may include, but not limited to, length, syllable weight, speech disfluencies, phonemes, non-lexical vocables, pauses, incomplete utterances, and inflections. At the classification stage, well known classification algorithms, such as Support Vector Machine, Naive Bayes classifier, Logistic Regression, k-Nearest Neighbor or Convolutional Neural Networks can be used to identify the category in which an annotated audio segment belongs based on a large training dataset containing instances of known category membership. The output from the audio emotion classifier (2102) identifies speech emotions and transmits phonetic emotional analysis data (217) which comprises a single data stream with at least one phonetic emotion. While the current disclosure is not dependent on the choice of a specific method in any of the aforementioned three stages, an embodiment of the facial expression recognition module has already been shown in FIG. 26 using the three stage execution architecture described above that should be known to a person skilled in the art. A review of different phonetic emotional analysis systems can be found in the following paper (as well as many other sources): Emotion recognition from speech: a review and Emotion Recognition From Speech: A Survey. This technology has been around for at least 18 years (Ref: Emotional speech synthesis: A review; Seventh European conference on speech communication and technology, Eurospeech, Aalborg, Denmark, September 2001 by Marc Schröder) and the terminology should be known to people skilled in the art. Phonetic emotional analysis module can be implemented on specifically programmed general-purpose computers and/or virtual machines that provide functionality of physical computers, with preferred embodiment being one where the physical computers and/or virtual machines are equipped with Graphics Processing Unit. With the recent technological advances in AI-enabled semiconductor chips, it is also possible to implement the phonetic emotional analysis module with System on Chip (SoC), Application Specific Integrated Circuit (ASIC), Field Programmable Gate Array (FPGA), embedded system such as Single Board Computer (SBC) or System on Module (SoM) built with Microcontrollers (MCUs) and/or Digital Signal Processors (DSPs), and combinations thereof.

In FIG. 9, video data (208) is received by the facial expression recognition module (202) and the facial recognition module (244). Facial expression recognition data (213) is transmitted by the facial expression recognition module (202) and facial recognition data (245) is transmitted by the facial recognition module (244). Image data (209) is received by the demographic analysis module (203), which most commonly transmits age (505), race (506), and gender (507) that is depicted as separate streams but is often combined into a single data stream, demographic analysis data (215). Audio data (210) is received by an audio preprocessor (207). The audio preprocessor (207), shown being within the emotion and identity detection system (222), may not require a machine learning system to perform its functions, and will not be part of the emotion and identity detection system (222) in all embodiments. The audio preprocessor output (212) is directed to the natural language processing module (204) and the phonetic emotional analysis module (205). The natural language processing module (204) sends natural language output data (216) comprising but not limited to sentiment data (501), intent data (502), and entity recognition data (503). The phonetic emotional analysis module (205) transmits phonetic emotional analysis data (217).

In one embodiment, the facial expression recognition module (202), the demographic analysis module (203), and the facial recognition module (245) may each use a deep learning system to perform their functions, while the natural language processing module (204) and the phonetic emotional analysis module (205) may operate on a machine learning system.

Other embodiments may have all modules using a deep learning system or each using a machine learning system or combinations thereof. The facial recognition module (245) may have an embodiment that operates on a model based pattern recognition system rather than a machine learning or deep learning system. The gaze tracking module (201) may run on a machine learning system but its some embodiments do not require a machine learning system in order to perform its functions.

Figure 10:
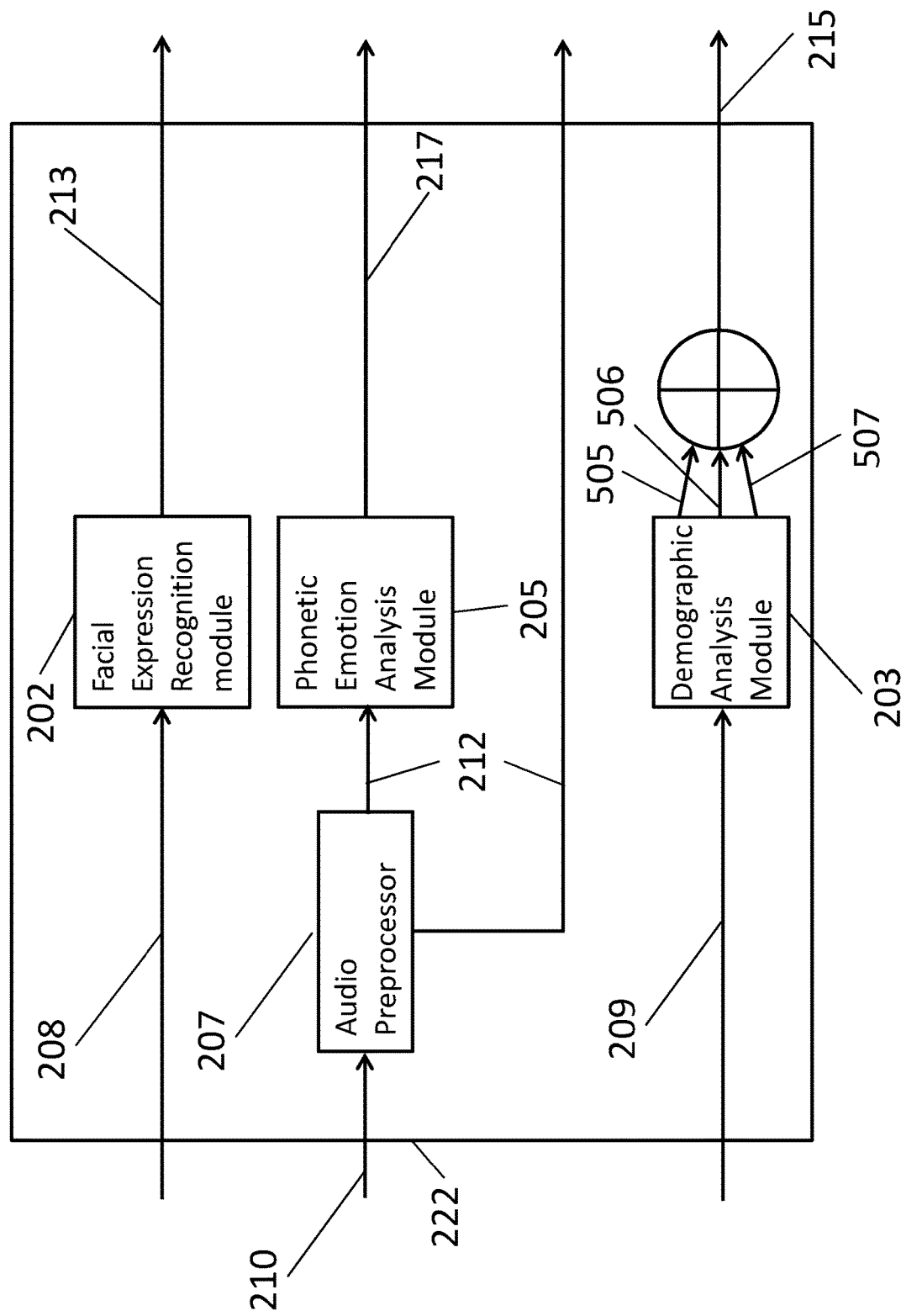
FIG. 10 is an alternate embodiment of an emotion and identity detection system.

The embodiments in FIG. 9 and FIG. 10 may both be located on the data input device.

FIG. 10 depicts an emotion and identity detection system (222) embodiment that includes an audio preprocessor (207), a facial expression recognition module (202), a phonetic emotion analysis module (205), and a demographic analysis module (203). This embodiment may be located on the data input device (not shown), with natural language processing and facial recognition being done on a separate system. Natural language processing tends to be a more resource intensive process, and audio preprocessor data (212) can be transmitted to a natural language processing module located on a computing device that can devote more computing resources to performing the function. The facial recognition module is also not part of this embodiment because a machine learning system may not be necessary to perform facial recognition or it may be desirable to have an emotion and identity detection system (222) that uses less computing resources.

Figure 11:
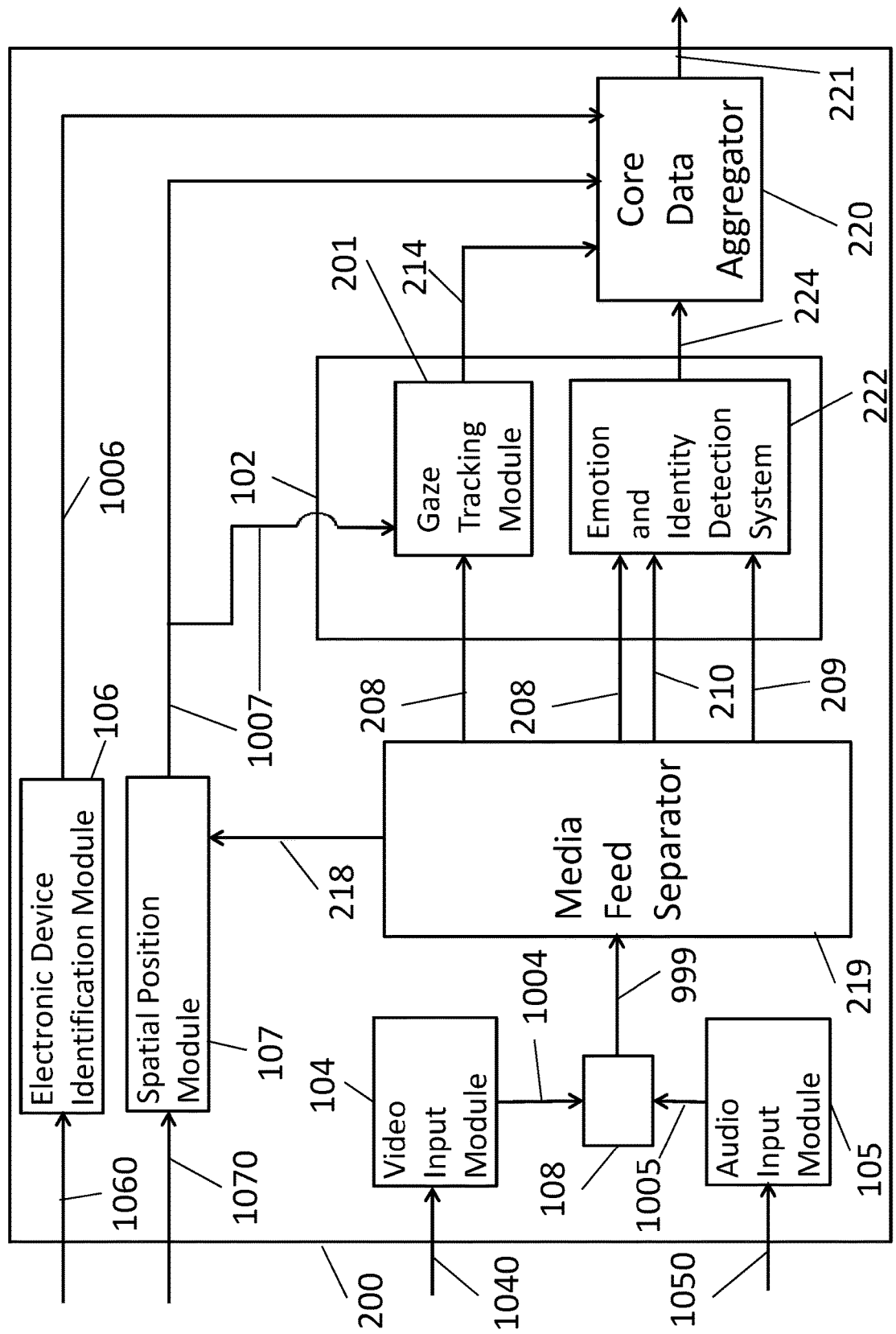
FIG. 11 is a block diagram of an embodiment of a data input device, known as a core data input device, with components of the behavior learning system are within the data input device.

FIG. 11 shows an embodiment of data input device having components of a behavior learning system (102). This is also known as the core data input device (200). The embodiment has at least one gaze tracking module (201) and at least one emotion and identity detection system (222). At least some of the behavior learning analysis is performed within the data input device itself before sending the emotion and identity output data (221) to the network for further processing in the profile building system (not shown). The emotion and identity detection system (222) is commonly a computerized machine learning system that may have at least one facial expression recognition module, at least one facial recognition module, at least one demographic analysis module, at least phonetic emotional analysis module, at least one audio preprocessor module, at least one natural language processing module, and/or combinations. Further shown in this embodiment are a media feed separator (219) and a core data aggregator (220), which may be components of at least one data input device processor (not shown). Also shown are at least one video input module (104), at least one audio input module (105), at least one electronic device identification module (106) and at least one spatial position module (107), and at least one data input device processor (108).

Figure 23:
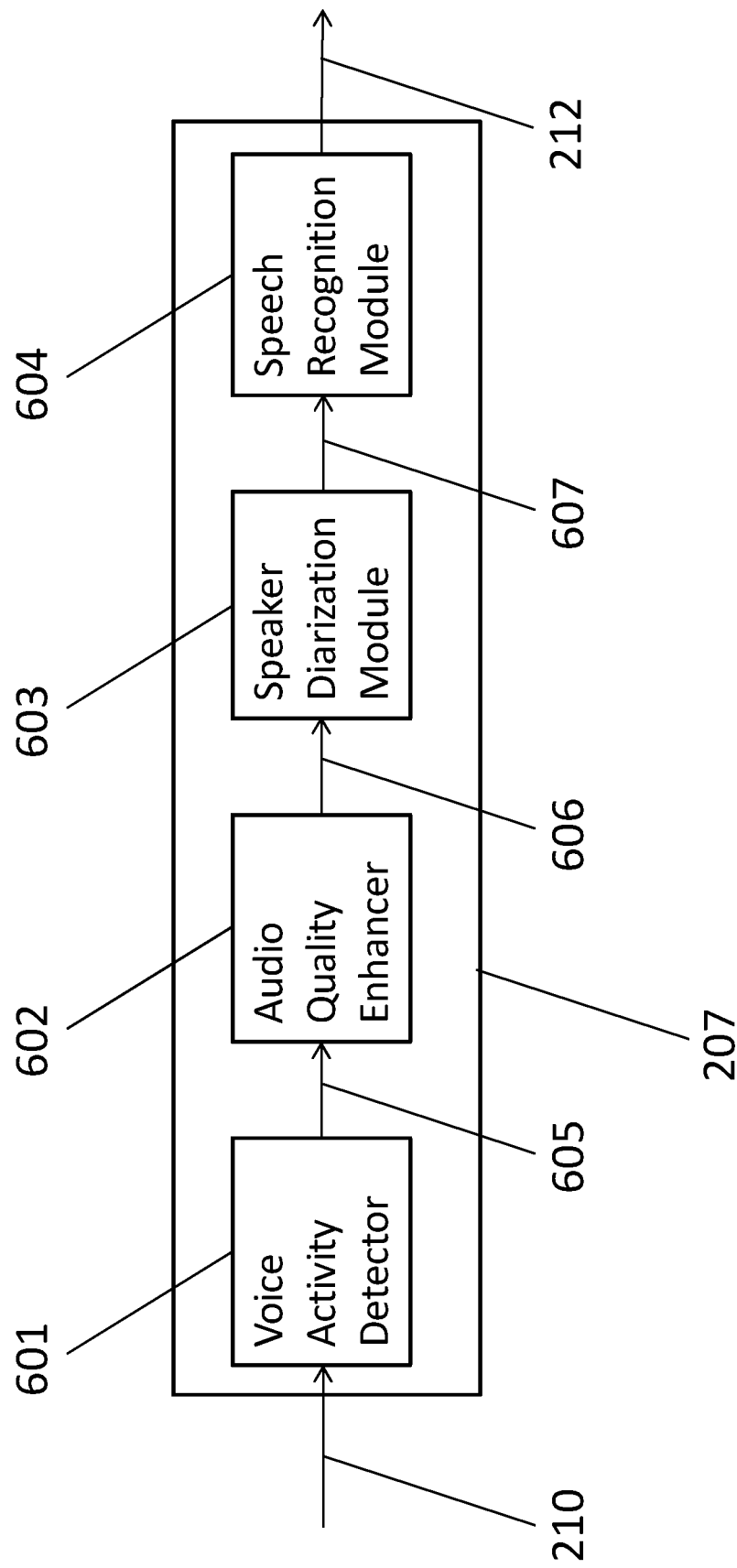
FIG. 23 is a block diagram of an embodiment of an audio preprocessor.
Figure 27:
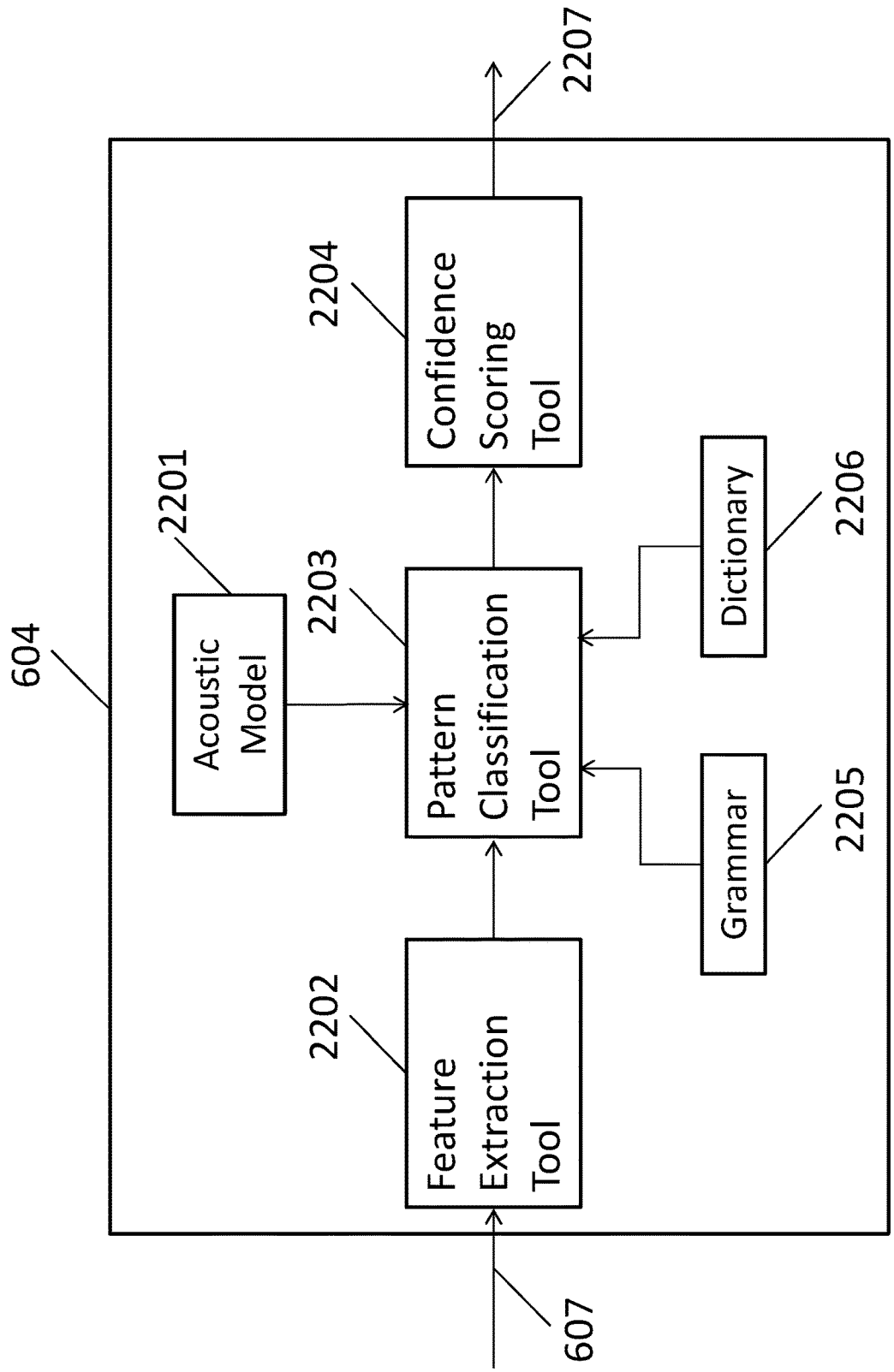
FIG. 27 is a block diagram of an embodiment of a speech recognition module.

Audio preprocessor module (207) is software that performs various prerequisite tasks before audio signals can be processed in phonetic emotion analysis module and natural language processing module. In one embodiment of a audio preprocessor module as shown in FIG. 23, the module takes its input from a live audio stream or stored audio file containing human speech, and executes four separate processes in sequence: voice activity detection (VAD), audio quality enhancement, speaker diarization and speech recognition. During the voice activity detection phase, the presence or absence of human speech is detected to avoid unnecessary processing of silence zones in audio. A typical VAD algorithm first reduces noise through spectral subtraction, then calculates some features from a section of the audio signal, and classifies the section as speech or non-speech using a classification rule that finds when a value exceeds a threshold. During the audio quality enhancement phase, common digital signal processing techniques are used to improve the quality of the audio for speech processing. These tasks may include, but not limited to, data compression, sound equalization, acoustic localization, noise cancellation, echo cancellation, dereverberation, beamforming, dynamic range compression and audio filtering. During the speaker diarization phase, audio signals are partitioned into homogeneous segments according to the speaker identity in a multi-speaker environment. In one embodiment, a speaker diarization system may use a Gaussian mixture model to model each of the speakers, and assign the corresponding frames for each speaker with the help of a Hidden Markov Model. During the speech recognition phase, several speech processing tasks are executed in different stages. In one embodiment of a speech recognition module as shown in FIG. 27, a feature extraction tool (2202) changes the speech signal to a parametric representation at a relatively minimized data rate suitable for subsequent processing and analysis by using common feature extraction techniques, such as, Mel Frequency Cepstral Coefficients (MFCC), Linear Prediction Coefficients (LPC), Linear Prediction Cepstral Coefficients (LPCC), Line Spectral Frequencies (LSF), Discrete Wavelet Transform (DWT), RASTA filtering and Perceptual Linear Prediction (PLP). In the next stage, a pattern classification tool (2203) aligns extracted speech features to an acoustic model (2201) containing large samples of language sounds and matches phoneme sequences to words in grammar (2205) and their corresponding phonemes in phonetic dictionary (2206). Grammar (also called, language model) provides all the words and phrases that a user might say at any point in speech. Phonetic dictionary provides a mapping of words to sequences of phonemes. In the final stage, a confidence scoring tool (2204) evaluates probability of each match and produces transcribed text (2207) with the highest score. Audio preprocessor module can be implemented on specifically programmed general-purpose computers and/or virtual machines that provide functionality of physical computers, with preferred embodiment being one where the physical computers and/or virtual machines are equipped with Graphics Processing Unit. With the recent technological advances in AI-enabled semiconductor chips, it is also possible to implement the audio preprocessor module with System on Chip (SoC), Application Specific Integrated Circuit (ASIC), Field Programmable Gate Array (FPGA), embedded system such as Single Board Computer (SBC) or System on Module (SoM) built with Microcontrollers (MCUs) and/or Digital Signal Processors (DSPs), and combinations thereof In this embodiment of a core data input device (200) shown in FIG. 11, an electronic device signal input (1060) is received by the at least one electronic device identification module (106) and electronic device identification data (1006) is transmitted by the electronic device identification module (106) to the core data aggregator (220). Spatial position input (1070) is received by the at least one spatial position module (107) and spatial position data (1007) is transmitted by the spatial position module (107) to the gaze tracking module (102) and/or the core data aggregator (220). The at least one video input module (104) is shown receiving video input (1040) and providing video data (1004) as output to an input data processor (108). The at least one audio input module (105) is shown receiving audio input (1050) and providing audio data (1005) as output to the input data processor (108). The input data processor aggregates the audio and video streams, providing media (999). Media (999), comprising audio, video, and/or image data, is received by the media feed separator (219), where the data is separated and it is directed to the appropriate processor and/or module. In this case, video data (208), image data (209), and audio data (210) are directed to the emotion and identity detection system (222). Spatial video data (218) may be provided to the spatial position module (107). Video data (208) is also directed to the at least one gaze tracking module (201). Within the at least one gaze tracking module, video data (208) and spatial data (1007) are received and processed. Gaze tracking data (214) is directed by the at least one gaze tracking module (201) to the core data aggregator (220). The emotion and identity detection system (222) is a form of machine learning system. The combined output (224) of the modules (not shown) that comprise the emotion and identity detection system (222) is sent to the core data aggregator (220). The combined output (224) of the emotion and identity detection system (222) may comprise facial expression recognition data, facial recognition data, demographic analysis data, natural language output data, and/or phonetic emotional analysis data. The combined output (224) may be an individual or combined stream or both. The electronic device identification data (1006), the spatial position data (1007), the gaze tracking data (214), and the combined output (224), are processed by the core data aggregator (220) and emotion and identity output data (221) is sent to the profile building system (not shown). The emotion and identity output data (221) may comprise individual data streams, with each stream representing the electronic device identification data (1006), the spatial position data (1007), the facial expression recognition data (213), facial recognition data (245) the gaze tracking data (214), the demographic analysis data (215), the natural language output data (216), and/or the phonetic emotional analysis data (217). It may also be a combined stream or combinations of individual and combined streams.

Figure 12:
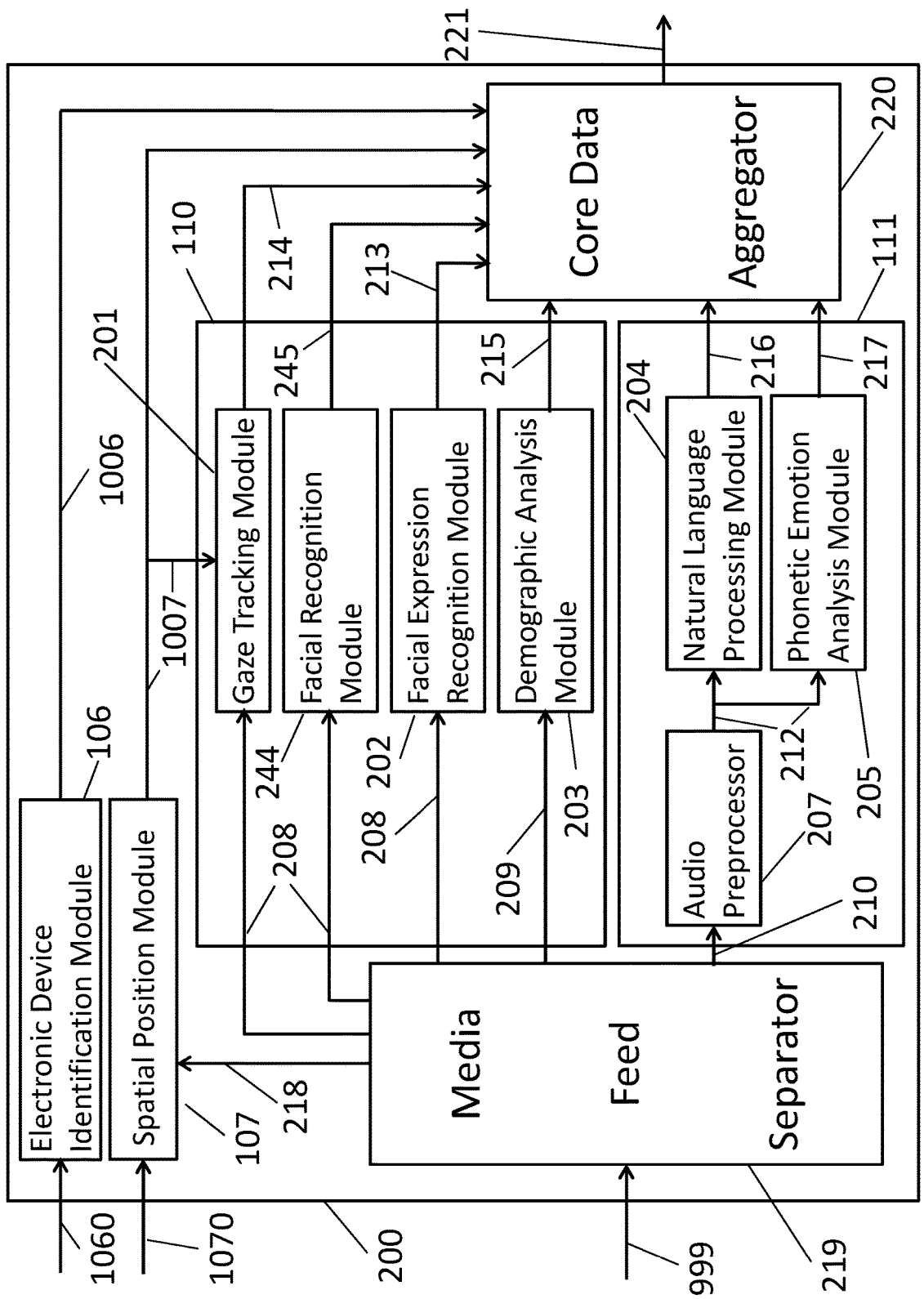
FIG. 12 is a block diagram of a second embodiment of a data input device, known as a core data input device showing behavior learning system modules.

FIG. 12 depicts an embodiment of a data input device comprising components of a behavior learning system, or core data input device (200). This embodiment shows all components of the behavior learning system (102) within the data input device itself. This behavior learning system comprises at least one video data processor (110) and at least one audio data processor (111). The at least one video data processor (110) has at least one gaze tracking module (201), at least one facial recognition module (244), at least one facial expression recognition module (202), at least one demographic analysis module (203). The at least one audio data processor (111) has at least phonetic emotional analysis module (205), at least one audio preprocessor module (207), and at least one natural language processing module (204). Further shown in this embodiment are a media feed separator (219) and a core data aggregator (220), which may be components of at least one data input device processor. Also shown are at least one electronic device identification module (106) and at least one spatial position module (107).

In this embodiment of a core data input device (200), an electronic device signal input (1060) is received by the at least one electronic device identification module (106) and electronic device identification data (1006) is transmitted by the electronic device identification module (106) to the core data aggregator (220). Spatial position input (1070) is received by the at least one spatial position module (107) and spatial position data (1007) is transmitted by the spatial position module (107) to the gaze tracking module (201) and/or the core data aggregator (220). Media (999) comprising audio, video, and/or image data is received by the media feed separator (219), where the data is separated and it is directed to the appropriate processor and/or module. In this case, video data (208) and image data (209) are directed to components of the at least one video data processor (110). Spatial video data (218) may be provided to the spatial position module (107). Spatial video data (218) may include visual marker information taken from an image or video of surrounding items or products, or from visual markers that are affixed near the products for the purpose of location determination. Such visual marker information may be used to identify the absolute location of the data input device. Audio data (210) is directed to components of the at least one audio data processor (111). Within the video data processor (110), video data (208) is directed to the at least one gaze tracking module (201), at least one facial recognition module (244), and the at least one facial expression recognition module (202). Image data (209) is directed to the demographic analysis module (203). In this embodiment, image data (209) is derived from the video stream of the media (999). The image data (209) may be obtained from the media feed separator (219) or it may be obtained from a data input device processor (not shown), combined with the media (999), and separated and directed by the media feed separator (219). The at least one facial expression recognition module (202) sends facial expression recognition output data (213) to the core data aggregator (220). The at least one facial recognition module (244) sends facial recognition output data (245) to the core data aggregator (220). Within the at least one gaze tracking module, video data (208) and spatial position data (1007) is received and processed by the gaze tracking module (201). Gaze tracking data (214) is directed by the at least one gaze tracking module (201) to the core data aggregator (220). The demographic analysis module (203) processes image data (209) and provides demographic analysis data (215) to the core data aggregator (220). Within the audio data processor (111), audio data (210) is directed to the at least one audio preprocessor (207) where initial audio data (210) processing occurs. The audio preprocessor output (212) is directed to the natural language processing module (204) and the phonetic emotional analysis module (205). The natural language processing module (204) sends natural language output data (216) comprising but not limited to natural language understanding data, sentiment analysis data, and named entity recognition data, to the core data aggregator (220). The phonetic emotional analysis module (205) sends phonetic emotional analysis data (217) to the core data aggregator (220). The electronic device identification data (1006), the spatial position data (1007), the facial expression recognition data (213), the facial recognition data (245), the gaze tracking data (214), the demographic analysis data (215), the natural language output data (216), and the phonetic emotional analysis data (217), are processed by the core data aggregator (220) and emotion and identity output data (221) is sent to the profile building system (not shown). The emotion and identity output data (221) may have individual data streams, with each stream representing the electronic device identification data (1006), the spatial position data (1007), the facial expression recognition data (213), the facial recognition data (245), the gaze tracking data (214), the demographic analysis data (215), the natural language output data (216), and the phonetic emotional analysis data (217) or it may be a combined stream or combinations of individual an combined streams.

A more general embodiment of the core data input device (200) depicted may have at least one, some, or all of the modules that make up the video data processor (110) and the audio data processor (110) and thus the behavior learning system. This is an embodiment where the behavior learning system is within the data input device.

Figure 13:
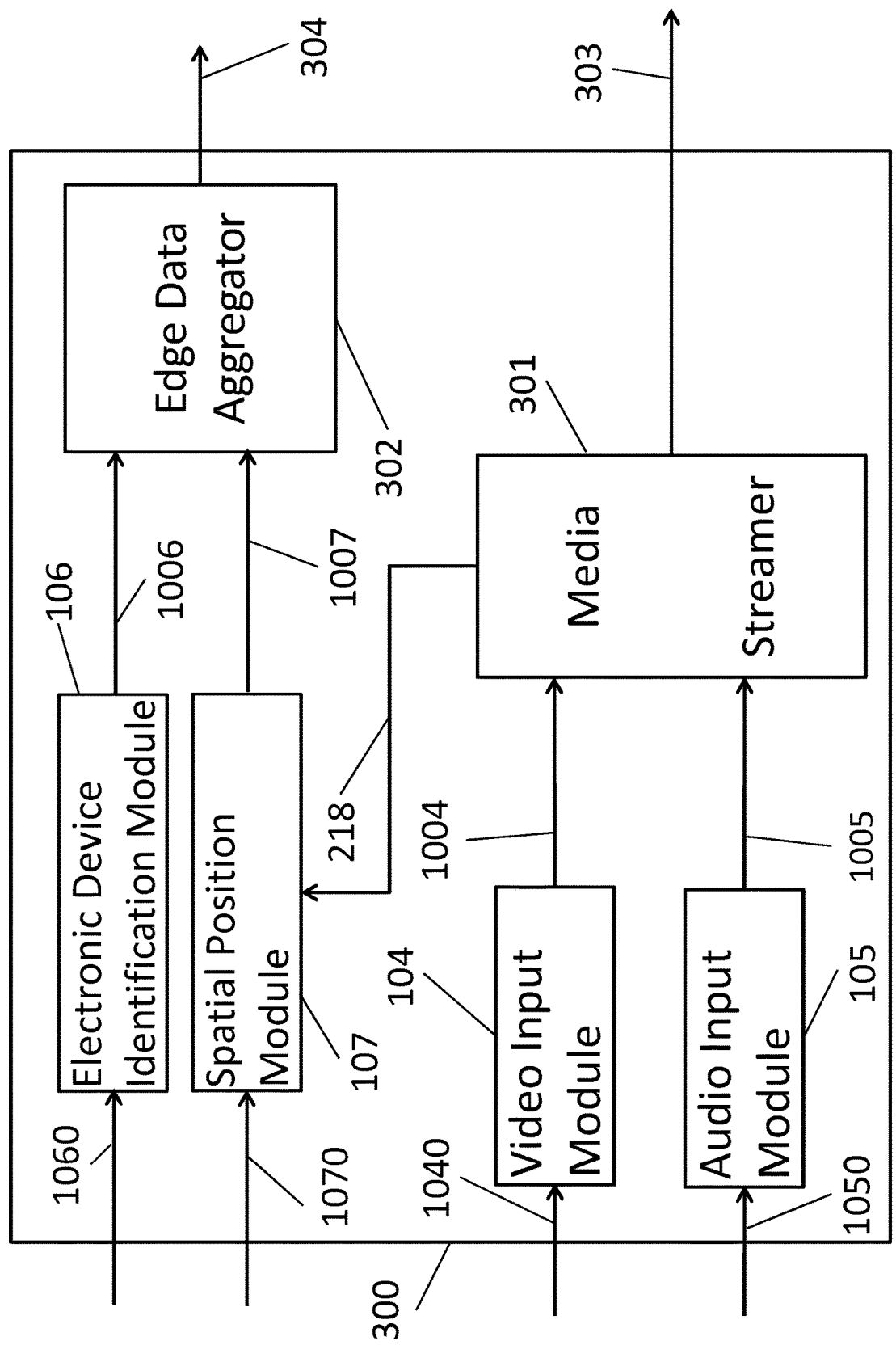
FIG. 13 is a block diagram of an embodiment of a basic data input device, known as an edge data input device.

FIG. 13 depicts an embodiment of a data input device known as the edge data input device (300). Shown are at least one video input module (104), at least one audio input module (105), at least one electronic device identification module (106), and at least one spatial position module (107). The at least one video input module (104) is shown receiving video input (1040) and providing video data (1004) as output. The at least one audio input module (105) is shown receiving audio input (1050) and providing audio data (1005) as output. The at least one electronic device identification module (106) is shown receiving electronic device signal input (1060) and providing electronic device identification data (1006) as output. The at least one spatial position module (107) is shown receiving spatial position input (1070) and providing spatial position data (1007). Also shown are an edge data aggregator (302) and a media streamer (301). The edge data aggregator (302) processes electronic device identification data (1006) and spatial position data (1007) and combines the data into a single stream, aggregated spatial and electronic device identification data (304). The media streamer (301) receives video data (1004) and audio data (1005) and will stream the streamed media data (303). The streamed media data (303) is depicted by a single output arrow but the streamed media data (303) may be aggregated or be separate data streams. The edge data aggregator (302) and the media streamer (301) may be a single data input device processor or multiple processors.

Figure 14A:
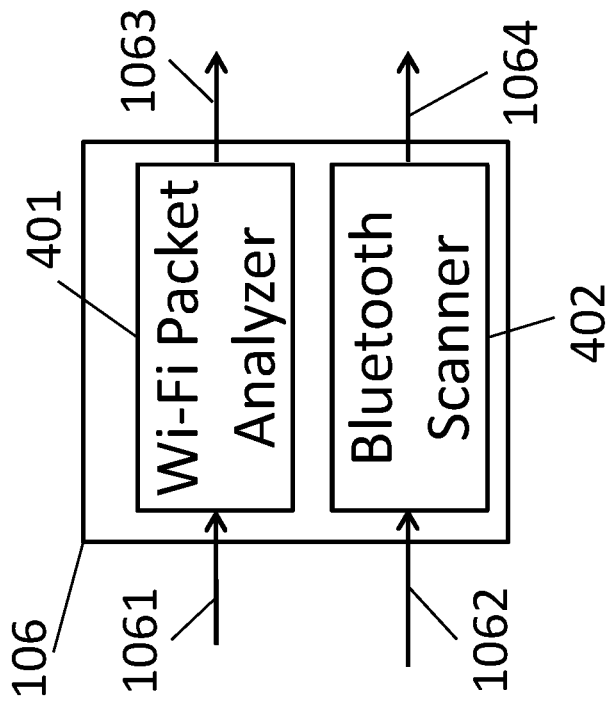
FIG. 14A is a block diagram of an embodiment of an electronic device identification module.

FIG. 14A depicts an embodiment of an electronic device identification module (106). The electronic device identification module (106) may comprise a Wi-Fi packet analyzer (401) and/or a Bluetooth® scanner (402). Wi-Fi input (1061) is received by the Wi-Fi packet analyzer (401) and Wi-Fi identification data (1063), most commonly in the form of a MAC ID, is transmitted. Bluetooth® input (1062) is received by the Bluetooth® scanner (402) and Bluetooth® mobile electronic device address data (1064) is transmitted. Bluetooth® input (1062) includes Bluetooth® mobile electronic device address data (1064), and is used to uniquely identify a mobile electronic device.

Figure 14B:
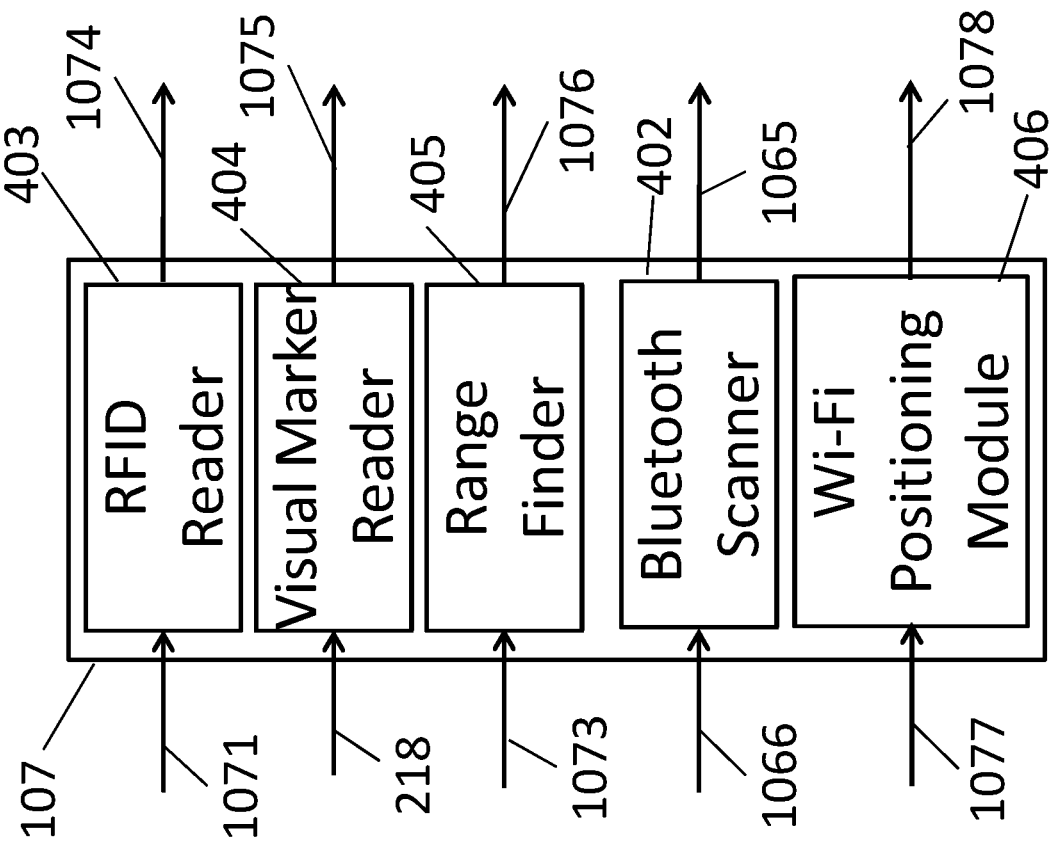
FIG. 14B is a block diagram of an embodiment of a spatial position module.

FIG. 14B depicts an embodiment of a spatial position module (107). The spatial position module (107) may comprise an RFID reader (403) and/or a visual marker reader (404) and/or a range finder (405) and/or a Bluetooth® scanner (402), and/or a Wi-Fi positioning module (406). The RFID reader (403) receives RFID signal data (1071) and transmits RFID output (1074), most commonly in the form of an RFID tag number that encodes product location information, which is used to determine data input device location. The visual marker reader (404) may receive video or image data input (218) and will transmit visual marker data (1075), most commonly in the form of barcode encoded product location information, which is used to determine data input device location. The Bluetooth® scanner (402) receives Bluetooth® Low Energy (BLE) beacon input (1066) and BLE data (1065) is transmitted. Bluetooth® Low Energy (BLE) beacon input (1066) may come from a plurality of surrounding beacons, in the form of beacon identification and/or encoded location information. The closest beacon is determined by the Bluetooth® scanner (402) and BLE data (1065) is transmitted, with the BLE data (1065) having beacon identification information and/or encoded location information. The range finder (405) receives range input (1073) from a passing person and transmits range data (1076), in the form of height, horizontal distance, and other range data as needed, determining absolute position data, relative position data, height data, and horizontal distance data. Most commonly, the range finder gathers range input (1073) using laser sensors, and/or ultrasonic sensors, and/or infrared sensors; however other electromagnetic radiation gathering sensors may be used. The spatial position module (107) may serve to gather the absolute location of the data input device, and/or data input device location relative to the location in which the data input devices are placed, and/or data input device location relative to the surrounding items, and/or spatial measurements related to the person within range of the range finder (405).

Wi-Fi positioning is another option for determining the location of the data input device. Common methods for Wi-Fi positioning include: received signal strength indication, fingerprinting, angle of arrival, and time of flight based techniques for location determination. The data input device is linked to a network and based on that network link, the device position may be determined. If Wi-Fi positioning is being used, then the Wi-Fi positioning module (406) may receive network Wi-Fi signal data (1077) and may transmit Wi-Fi positioning data (1078), most commonly in the form of data input device location.

Figure 15:
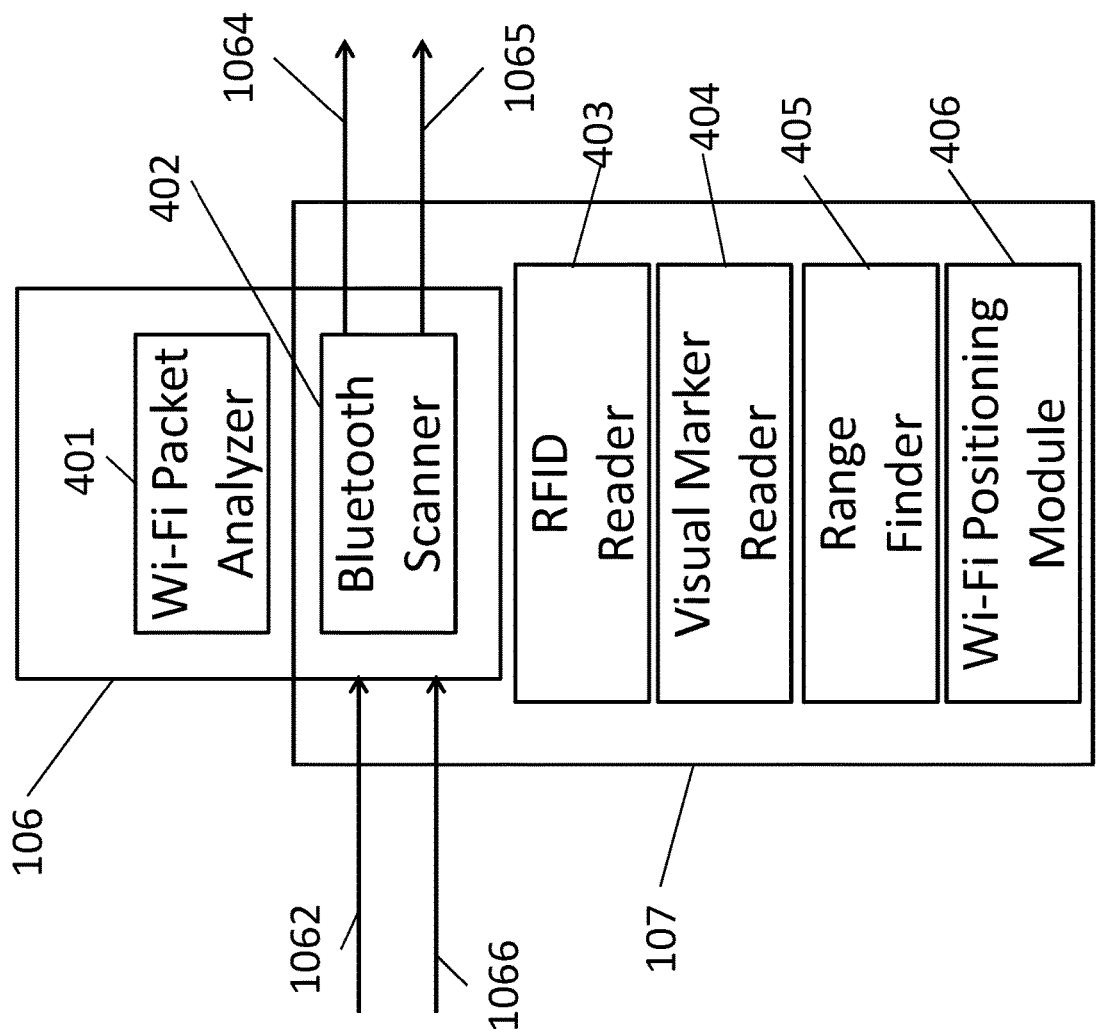
FIG. 15 is a block diagram of an electronic device identification module and spatial position module with a shared component.

FIG. 15 depicts a single Bluetooth® scanner (402) shared by the electronic device identification module (106) and the spatial position module (107). In a data input device where Bluetooth® data is collected by both the electronic device identification module (106) and the spatial position module (107) the Bluetooth® scanner (402) may be a single scanner that performs a dual function, meeting the requirements for both the electronic device identification module (106) and the spatial position module (107). Bluetooth® devices may gather and transmit both standard Bluetooth® and BLE signals. In this embodiment, the Bluetooth® scanner (402) receives Bluetooth® input (1062) and Bluetooth® mobile electronic device address data (1064) is transmitted. The Bluetooth® scanner (402) also receives BLE beacon input (1066) and BLE data (1065). BLE data is transmitted and used to identify the location of the data input device.

Figure 16:
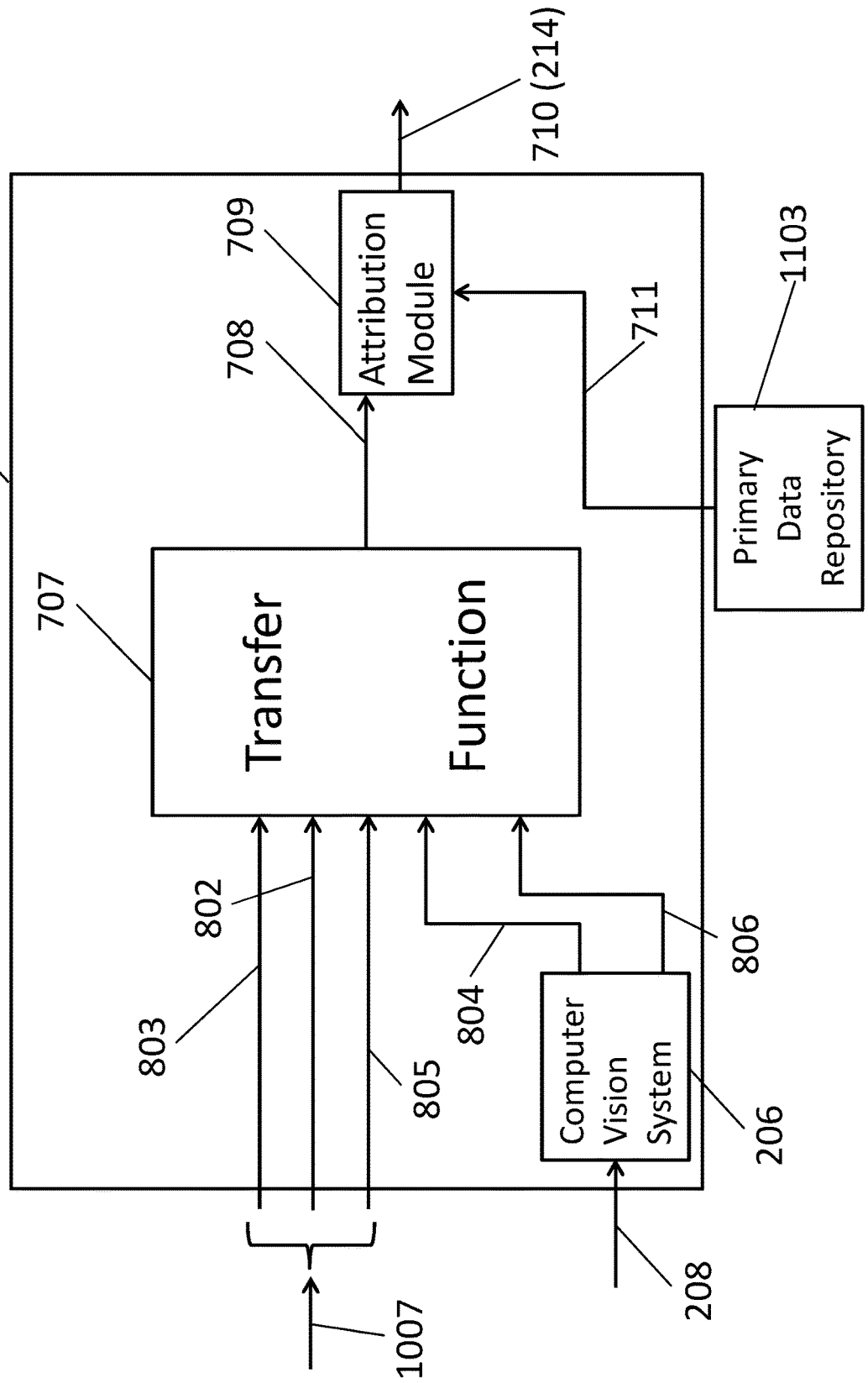
FIG. 16 is a block diagram of a gaze tracking module.

FIG. 16 depicts a gaze tracking module (201). In this embodiment the gaze tracking module comprises a computer vision system (206), a transfer function module (707), and an attribution module (709). Computer vision system (206) is software that performs the task of computer vision, which is a technology that allows computer algorithms to gain high-level understanding from digital images or videos by executing tasks that the human visual system can perform. This include methods for acquiring, processing, analyzing and understanding digital images, and extraction of high-dimensional data from the real world in order to produce numerical or symbolic information. In one embodiment of this disclosure, the computer vision system is shown as a component of the gaze tracking module, where its structure and algorithm has been described in detail.

Transfer function module (707) is software that processes a transfer function, which is a mathematical function that can model a system's output for each possible input. A transfer function can be a linear or non-linear function. In one embodiment of this disclosure, the transfer function module is shown as a component of the gaze tracking module, where its structure and algorithm has been described in detail.

Attribution module (709) is software that represents a mathematical function which can attribute a value in one population of data to a different value in another population of data by performing necessary mapping functions between the two populations. In one embodiment of this disclosure, the attribution module is shown as a component of the gaze tracking module, where its structure and algorithm has been described in detail.

As shown in FIG. 16, the computer vision system (206) receives and processes video data (208), and transmits eye position (804) and head orientation (806) to the transfer function module (707). The eye position (804) refers to data that includes the Cartesian coordinates (x, y) of the subject's eyes on a vertical plane. The head orientation (806) refers to the yaw, pitch and roll angles of a subject's head in a three-dimensional space along the normal, lateral and longitudinal axes. In this embodiment, spatial position data (1007) includes horizontal distance data (802), video input device field-of-view data (803), and height above the floor data (805). Field-of-view data (803) is the field of view of a data input device (not shown). The horizontal distance data (802) includes the distance to a subject within the field of view of the data input device. The height above the floor data (805) is the height of a data input device above a solid flat horizontal surface. The horizontal distance data (802), video input device field-of-view data (803), height above the floor data (805), eye position (804) and head orientation (806) is received by the transfer function module (707). The transfer function module (707) processes input data, performing mathematical calculations on the input data to determine a user's field of view, and transmits user field of view data (708) to the attribution module (709). The attribution module (709) retrieves planogram data (711) and receives the user field of view data (708). Human field of view data, while similar to the data input device's field-of-view, is calculated to determine the gaze direction of the subject, rather than the field of view of the data input device directed towards the subject. The attribution module (709) processes data, to determine the items the user is looking at, and transmits gaze tracking data (214), which in a retail location may be in the form of target merchandise data (710). The tracking data (214) is a gaze tracking vector which indicates where a subject is looking and can be used to determine what a subject is looking at. In a retail environment, the gaze tracking vector is used to identify merchandise viewed by a subject. Planogram data (711), containing product location information, may be retrieved from at least one primary data repository (1103). Gaze tracking is commonly performed through a computer calculation based on video input and spatial position input. There are embodiments that may use a machine learning system to determine a subject's field-of-view and to identify items viewed by the subject, in the role of the computer vision system (206).

Figure 17:
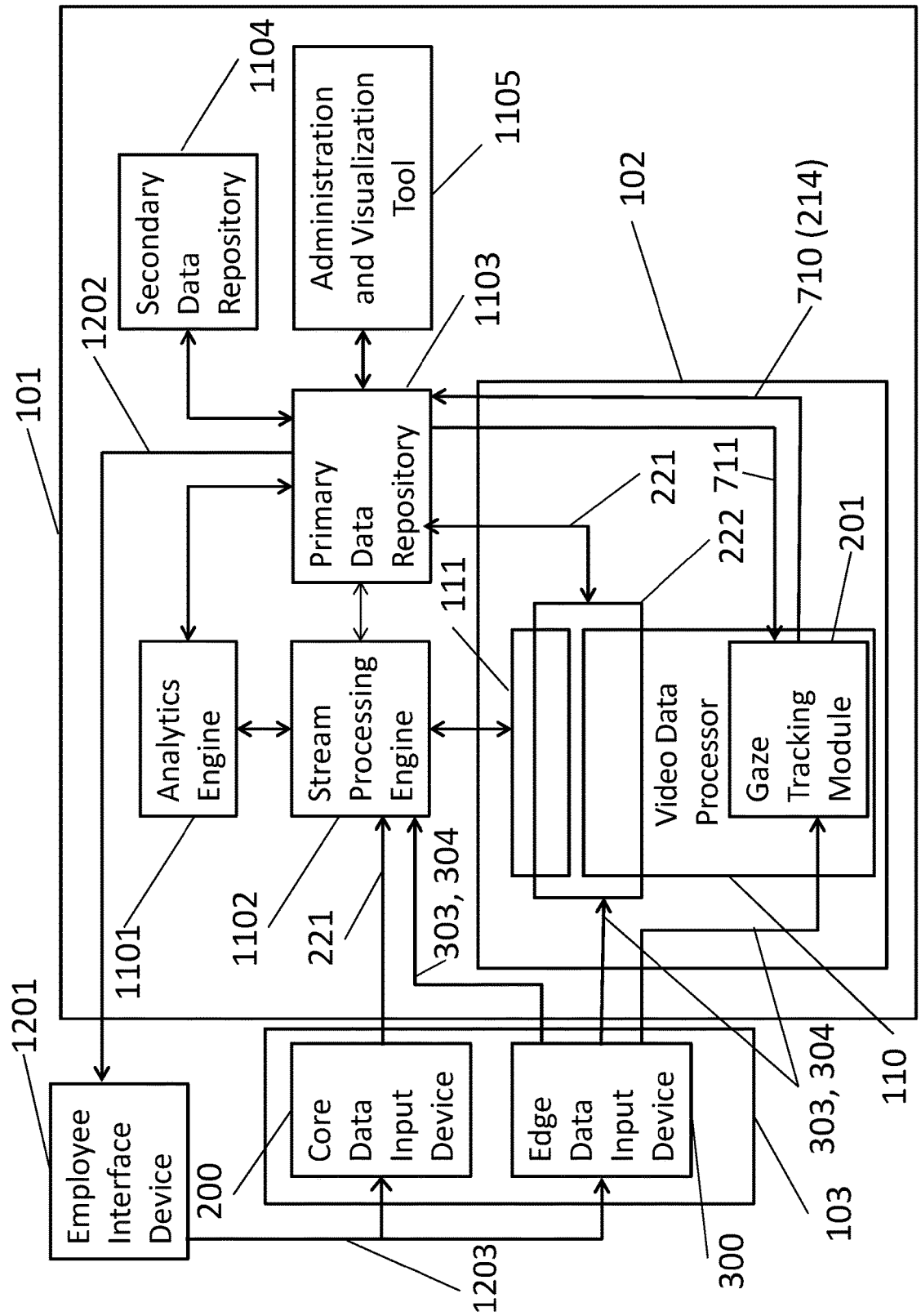
FIG. 17 is a block diagram of an embodiment of a distributed system for building a plurality of user profiles with all profile building components on a core data input device.

FIG. 17 depicts an embodiment of a distributed system for building a plurality of user profiles and network. The distributed system has at least one data input devices which may be at least one edge data input device (300) and/or at least one core data input device (200). Both an edge data input device (300) and a core data input device (200) are shown. A distributed system for building a plurality of user profiles may have multiple core data input devices (200), with embodiments of the core data input device (200) having at least one, some, or all of the modules that make up the behavior learning system (102). A distributed system for building a plurality of user profiles may have multiple edge data input devices (300). In this embodiment, at least one data input device (103) is represented by the core data input device (200), comprising all behavior learning system modules, and the edge data input device (300). The at least one data input device (103) transmits data to a profile building system (101). The profile building system (101) comprises a behavior learning system, with at least one machine learning modules depicted by the emotion and identity detection system (222). A video data processor (110) and an audio data processor (111) are shown intersecting with the emotion and identity detection system (222). The emotion and identity detection system (222) comprises at least one machine learning system, which is commonly required by some of the behavior learning system modules. The video data processor (110) also may have a gaze tracking module (201). The profile building system (101) further has at least one stream processing engine (1102), at least one analytics engine (1101), at least one primary data repository (1103), at least one secondary data repository (1104), and at least one administration and visualization tool (1105).

Stream Processing Engine (1102) is a parallel software computation platform that performs near real-time application processing, queries and analytics logic on continual, and often never-ending, streams of data without having to store the data in a database, file system or other forms of mass storage prior to the execution of the aforementioned tasks. In contrast to batch processing platforms that perform queries and analytics on static/resting data, the stream processing engine ingests, processes and stores huge volumes of streaming data in a First-In-First-Out (FIFO) computational paradigm with low latency and high throughput. While batch processing lets the data build up and try to process them at once, stream processing handles data as they come and spreads the processing over time, thus allowing a lot less hardware resources to process the same amount of data compared to batch processing. Stream Processing Engine executes the well known "actor model" of computer science, where an "actor", which is the universal primitive of concurrent computation, can respond to an incoming message, in no assumed sequence, by sending a finite number of messages to other actors, creating a finite number of new actors and designating the behavior to be used for the next message it receives. Stream Processing Engine can be implemented in many different ways, which include, but not limited to, purpose-built stream programming languages, language extension libraries and application development environment (e.g., CUDA, Intel Ct, CAL Actor Language, Auto-Pipe, ACOTES, DUP, Ateji PX, RapidMind, HSTREAM, Spar, Brook etc.), continuous operator stream processing framework (e.g., Apache Flink, Mupd8), and stream processing emulators through batch processing (e.g. Apache Spark, Apache Storm). The stream processing engine (1102) has been shown in FIGS. 17, 18, 21 and 22. It ingests emotion and identity output data (221) in a continual stream from at least one data input device. In addition to continual ingestion, the data is also processed in a continual stream with the computing entities selected from the group consisting of at least one behavior learning system (102), and optionally at least one analytics engine (1101) and/or at least one primary data repository (1103), depending on the nature of the task. For example, in one embodiment, where the computation involves predicting the race, age or gender of a person thorough the demographic analysis module (203), the stream processing engine can execute the process entirely within the behavior learning system as it requires no historical data. In another embodiment, where the computation involves recognizing the identity of a person through the facial recognition module (244), the stream processing engine will need to query the stored face images in the primary data repository while running the facial recognition module in the behavior learning system. In another embodiment, where the computation involves predicting which items the current customer may buy in the future, the stream processing engine will use the behavior learning system and the primary data repository to determine the identity of the person through face recognition, and then send the data to a prediction model in the analytics engine to get the final result. In addition to continual ingestion and processing, the data is also stored on the primary data repository in a continual stream. Stream processing engine can be implemented on specifically programmed general-purpose computers and/or virtual machines that provide functionality of physical computers, with preferred embodiment being one where the physical computers and/or virtual machines are equipped with Graphics Processing Unit.

Analytics engine (1101) is a software processing framework that coexists with, and augments the functionalities of, the stream processing engine by way of providing models and algorithms that can identify qualitative or quantitative patterns in structured or unstructured data ingested and processed by the stream processing engine. The analytics engine provides the following three types of frameworks: a) Descriptive Analytics, "describes", or summarizes, raw historical data and presents it in a human interpretable format that provides meaningful insight into the past. It uses common data aggregation and data mining algorithms to accomplish the task. The algorithms include, but not limited to, statistical methods (e.g., mean, median, mode, standard deviation etc.), basic arithmetic operations (e.g. sum, percentage change, quarterly or year-over-year change etc.), and clustering algorithms (e.g. K-means, Expectation-Maximization, Apriori etc.); b) Predictive Analytics, "predicts" the future value of data based on the analysis of historical data. Most supervised learning and unsupervised learning algorithms in machine learning and deep learning fall into this category. These algorithms include, but not limited to, Decision Trees, Support Vector Machines, Logistics Regression, Genetic Algorithm, Convolutional Neural Networks etc.; c) Prescriptive Analytics, "prescribes" the best possible future value of data, among a set of possible predicted values, by a using combination of techniques such as business rules, multivariate optimization methods (e.g. Powell's method, Modified Hooke-Jeeves method, Simplex Nelder-Meed method, Gradient Descent method etc.), machine learning algorithms (Support Vector Machines, Logistics Regression etc.), deep learning algorithms (Convolutional Neural Networks, Recurrent Neural Networks etc.), simulation algorithms (e.g. Control Dependence Analysis, Speculative Execution) and various other computational modeling procedures. The Analytics Engine has been shown in FIGS. 17, 18, 21 and 22. The Analytics Engine can be implemented using any of the aforementioned algorithms on specifically programmed general-purpose computers and/or virtual machines that provide functionality of physical computers, with preferred embodiment being one where the physical computers and/or virtual machines are equipped with Graphics Processing Unit.

Administration and Visualization Tool (1105) in FIG. 17, which may also be referred to as "Admin and Visualization Tool", is a collection of common tools and computer programs that enable system administrators to manage the operation of the distributed system described in the current disclosure, and allows both general users and system administrators to visualize the data stored in the Primary Data Repository, and/or predicted for the future, through charts, graphs, text reports and similar data presentation mechanisms. Common functions in administration module includes, but not limited to, user enrollment, password management, billing, business rules configuration, interfacing with external systems, payment processing, user identity and access control management, inventory management, database management, dashboard for charts and graphs, text report generation tools, ad hoc query handling tools etc. The Administration Module (1105) has been shown in FIGS. 17, 18, 21 and 22. Administration module can be implemented on specifically programmed general-purpose computers and/ or virtual machines that provide functionality of physical computers, with a preferred embodiment being one where the physical computers and/or virtual machines are equipped with Graphics Processing Unit.

Secondary Data Repository (1104) is a digital mass storage system, such as a centralized database, distributed database, local file system or distributed file system, which stores, organizes and delivers various types of data required to build user profile, when the data is obtained from external sources. Examples of data repository include, but not limited to, relational databases (e.g. Sybase, Informix, MySQL), NoSQL and object-oriented databases (e.g. MongoDB, BigTable), distributed database (e.g. Cassandra) and distributed file system (e.g. HDFS). This has been illustrated in FIGS. 17, 18, 20, 21 and 22. Secondary data repository can be implemented on specifically programmed general-purpose computers and/or virtual machines that provide functionality of physical computers As shown in FIG. 17, video and audio data is sent from the core data input device (200) transmitting emotion and identity output data (221) to at least one stream processing engine (1102). The emotion and identity output data (221) comprises output from all behavior learning system (102) modules. No further direct processing is required by the behavior learning system (102) in the profile building system (101). Further shown, the at least one edge data input device (300) transmits streamed media data (303) and aggregated spatial and electronic device identification data (304) to the emotion and identity detection system (222), the gaze tracking module (201), and the at least one stream processing engine (1102). Streamed media data (303) and aggregated spatial and electronic device identification data (304) are shown as a single stream.

The at least one stream processing engine (1102) analyzes and processes data in real-time, continuously calculating mathematical or statistical analytics, using input from the analytics engine (1101), and transmitting stream processing output data to an appropriate engine and/or system for further processing and/or analysis and/or storage. The at least one stream processing engine (1102) is shown communicating with an emotion and identity detection system, at least one primary data repository (1103), and at least one analytics engine (1101). The at least one analytics engine (1101) provides descriptive, predictive, and prescriptive analytics and identifies qualitative or quantitative data patterns, communicating this information to the stream processing engine (1102). The at least one analytics engine (1101) communicates with the at least one stream processing engine (1102) and the at least one primary data repository (1103). The at least one primary data repository (1103) communicates with the emotion and identity detection system (222), the gaze tracking module (201), the stream processing engine (1102), the analytics engine (1101), the at least one secondary data repository (1104), and the at least one administration and visualization tool (1105). The at least one primary data repository may receive emotion and identity output data (221) directly from the emotion and identity detection system (222) and gaze tracking data or target merchandise (710, 214) from the at least one gaze tracking module (201). The gaze tracking module (201) may receive planogram data. The administration and visualization tool (1105) provides reporting and system management tools.

Since a subject moves through or about a fixed space, the subject may move from one device to another, or from an area with core data input devices (200) to an area of the fixed space with edge data input devices (300). The stream processing engine (1102) will help to coordinate updates to the primary data repository (1103) of a moving subject passing from one data input device to the next and passing between data input devices that may gather different types of input data.

Figure 18:
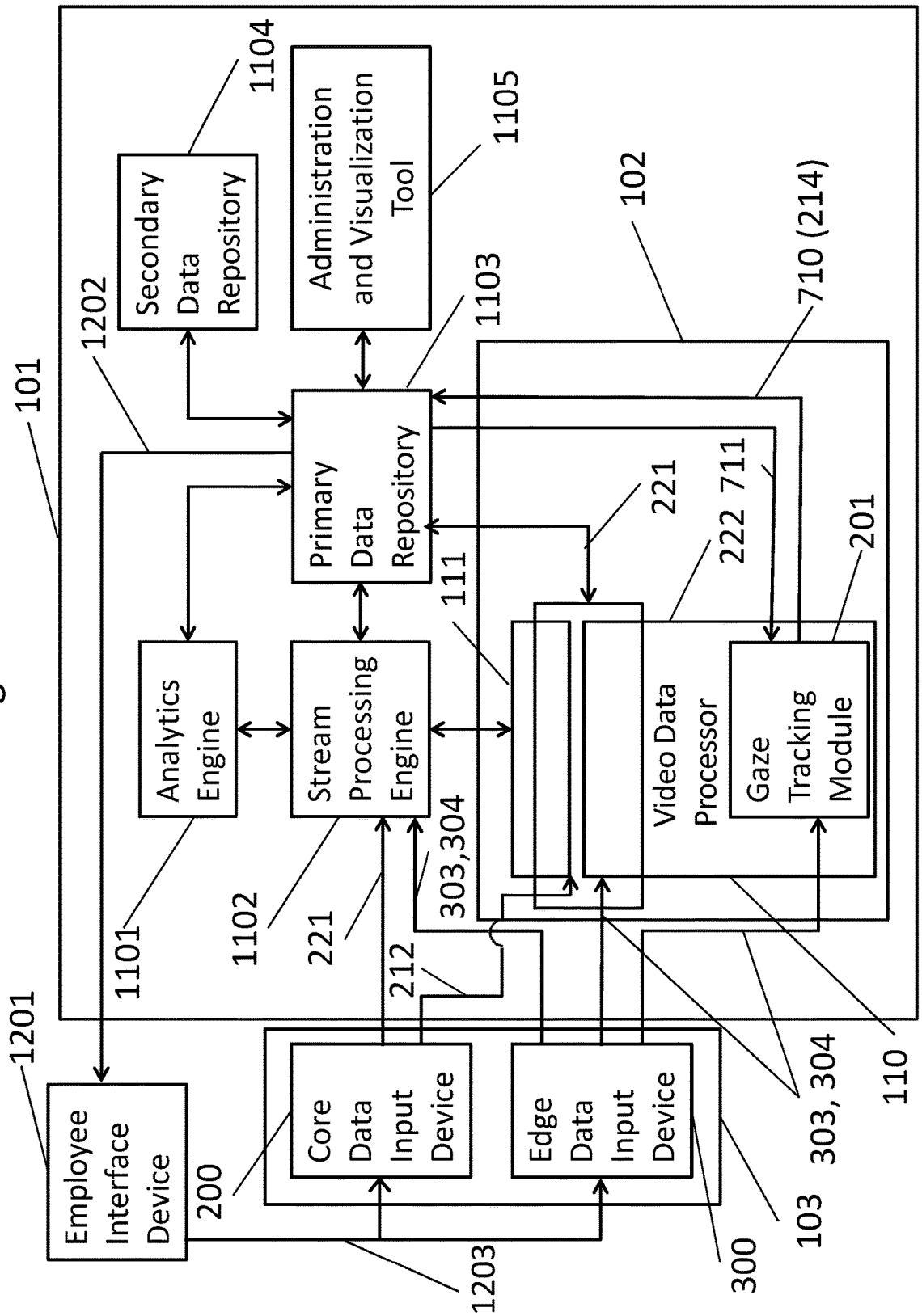
FIG. 18 is a block diagram of an embodiment of a distributed system for building a plurality of user profiles with some profile building components on a core data input device but with natural language processing on the behavior learning system.

FIG. 18 depicts the distributed system for building a plurality of user profiles and network of FIG. 17, with the core data input device (200) having a behavior learning system (102) without a natural language processing module (204). The core data input device (200) directs audio preprocessor output (212) to a natural language processing module (204) located in the audio processor (111) within the behavior learning system (102) within the profile building system (101).

The emotion and identity output data (221) comprises output from behavior learning system (102) modules. The stream processing engine (1102) communicates with the behavior learning system (102) on the profile building system (101) and may coordinate updates and transmissions to the primary data repository (1103).

Figure 19:
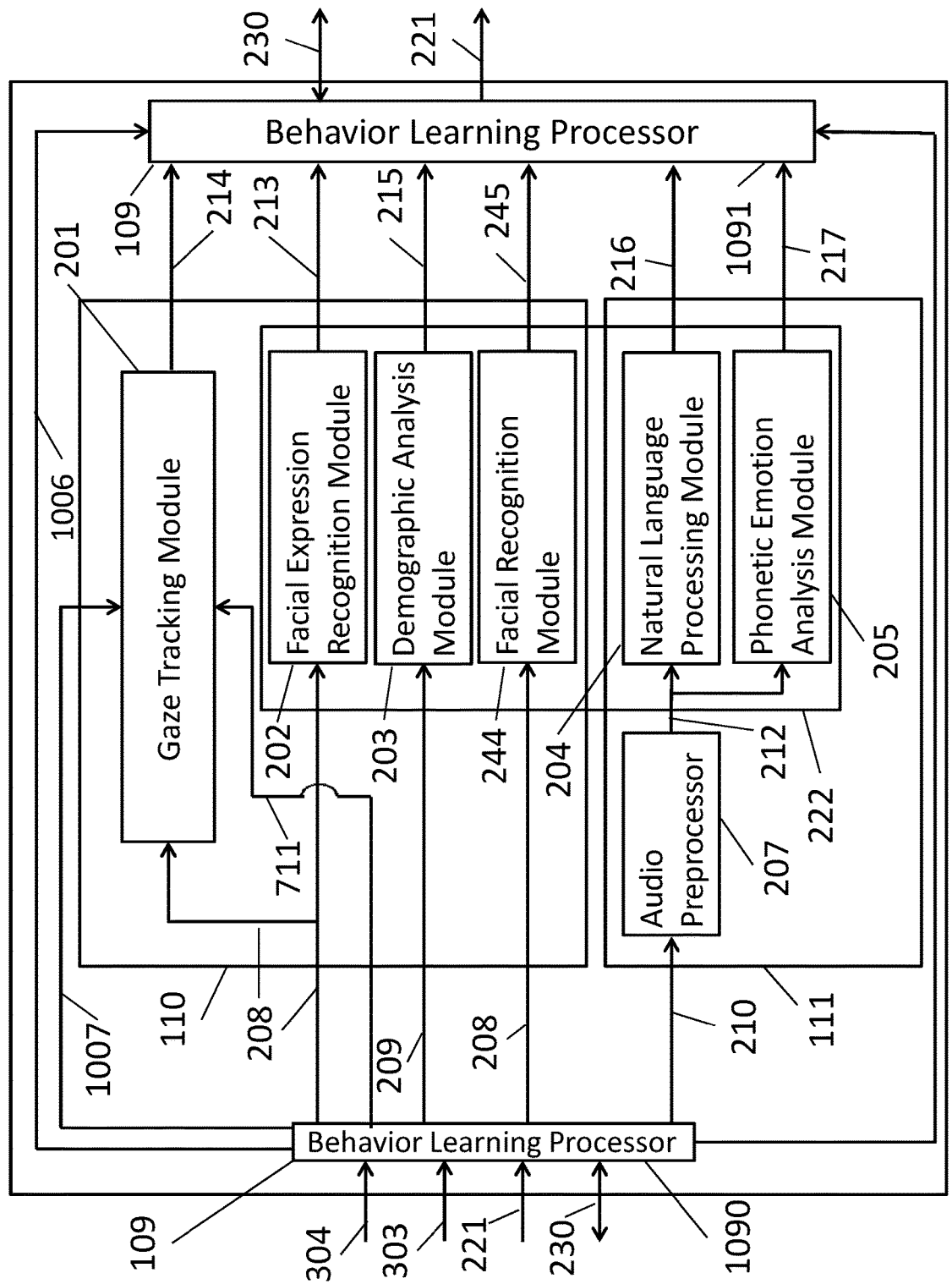
FIG. 19 is a block diagram of a behavior learning system.

FIG. 19 depicts an embodiment of a behavior learning system (102). This behavior learning system (102) comprises at least one behavior learning processor (109), at least one video data processor (110) and at least one audio data processor (111). The at least one video data processor (110) has at least one gaze tracking module (201), at least one facial expression recognition module (202), at least one demographic analysis module (203). The at least one behavior learning processor (109) may include but is not limited to devices that provide data aggregation, data streaming, data separation, and combinations thereof. Shown are a first behavior learning processor (1090) and a second behavior learning processor (1091). The at least one audio data processor (111) has at least phonetic emotional analysis module (205), at least one audio preprocessor module (207), and at least one natural language processing module (204). Further shown is at least one emotion and identity detection system (222). The at least one facial expression recognition module (202), the at least one demographic analysis module (203), the at least one phonetic emotional analysis module (205), and the at least one natural language processing module (204) are all components of the at least one emotion and identity detection system (222). The audio preprocessor (207) may be within or outside the emotion and identity detection system (222) but it is shown outside in this figure.

In this embodiment streamed media data (303), aggregated spatial and electronic device identification data (304), emotion and identity output data (221), and stream processing engine data (230), comprising audio, video, spatial, electronic device identification data, and/or image data are received by the first behavior learning processor (1090), where the data processed and it is directed to the appropriate processor and/or module. Stream processing engine data (230) is data exchanged between the behavior learning system (102) and the stream processing engine (not shown). Electronic device identification data (1006) is directed by the first behavior learning processor (1090) for further processing. Video data (208), spatial position data (1007), planogram data (711), and image data (209) are directed to components of the at least one video data processor (110), and the audio data (210) is directed to components of the at least one audio data processor (111). Within the video data processor (110), video data (208), planogram (711), and spatial position data (1007) is directed to the at least one gaze tracking module (201) and video data (208) the at least one facial expression recognition module (202), and image data (209) is directed to the demographic analysis module (203). The at least one facial expression recognition module (202) sends facial expression recognition output data (213)

to the second behavior learning processor (1091) for further processing and directing. The at least one gaze tracking module receives video data (208), spatial position data (1007), and/or planogram data (711). Gaze tracking data (214) is directed by the at least one gaze tracking module (201) to the second behavior learning processor (1091) for further processing and directing. Within the audio data processor (111), audio data (210) is directed to the at least one audio preprocessor (207) where initial audio data (210) processing occurs. The demographic analysis module (203) processes image data (209) and provides demographic analysis data (215) to the second behavior learning processor (1091) for further processing and directing. The audio preprocessor output (212) is directed to the natural language processing module (204) and the phonetic emotional analysis module (205). The natural language processing module (204) sends natural language output data (216) comprising but not limited to natural language understanding data, sentiment analysis data, and named entity recognition data, to the second behavior learning processor (1091) for further processing, and directing. The phonetic emotional analysis module (205) sends phonetic emotional analysis data (217) to the second behavior learning processor (1091) for further processing, and directing. The electronic device identification data (1006), the spatial position data (1007), the facial expression recognition data (213), the gaze tracking data (214), the demographic analysis data (215), the natural language output data (216), and the phonetic emotional analysis data (217), are processed by the second behavior learning processor (1091) and emotion and identity output data (221) is sent to the at least one primary data repository (not shown) and/or stream processing engine data (230) is communicated to the stream processing engine (not shown). The emotion and identity output data (221) may have individual data streams, with each stream representing the electronic device identification data (1006), the spatial position data (1007), the facial expression recognition data (213), the gaze tracking data (214), the demographic analysis data (215), the natural language output data (216), and the phonetic emotional analysis data (217), or it may be a combined stream, or combinations of individual an combined streams.

Figure 20:
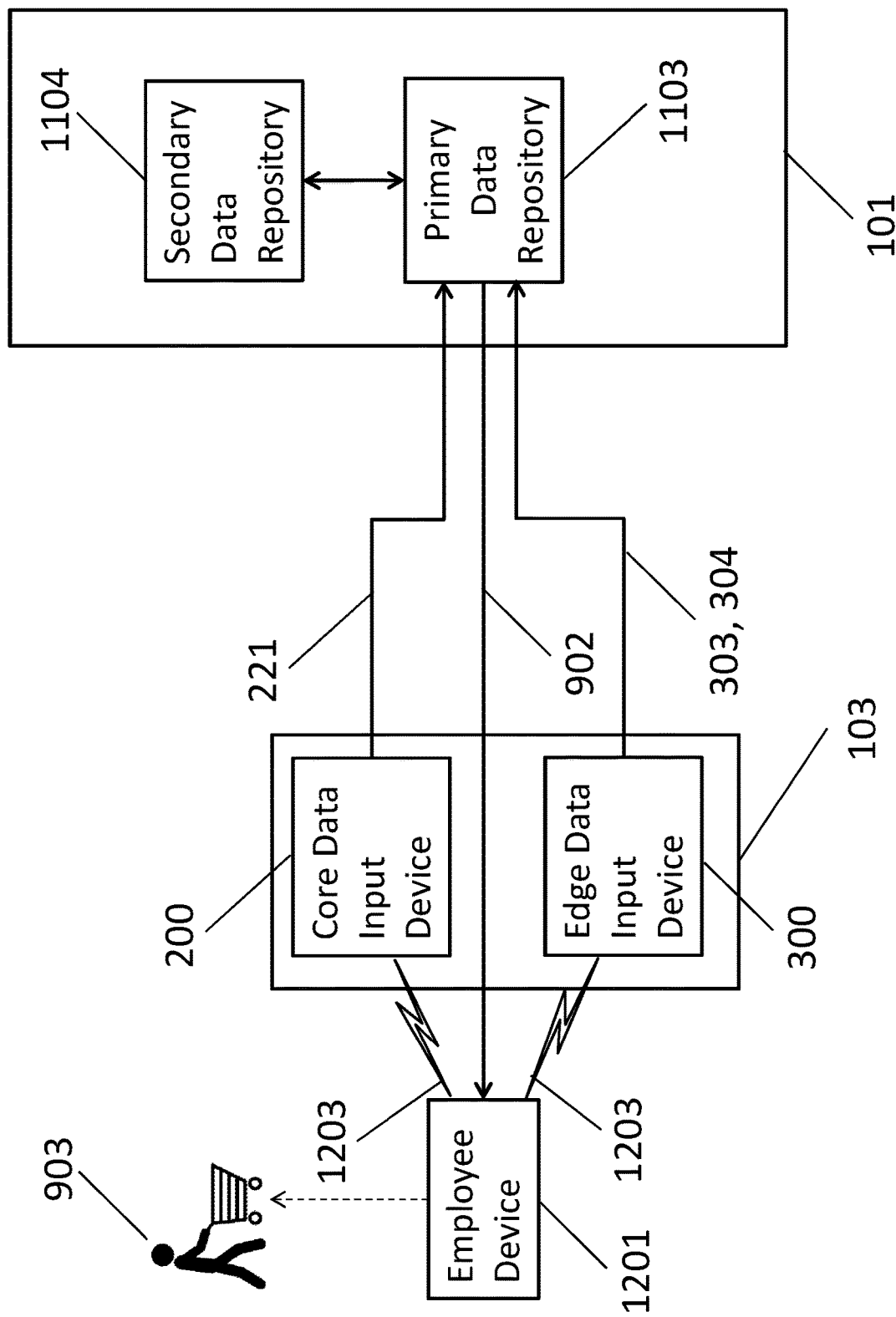
FIG. 20 is a block diagram of an embodiment of data communication between an employee interface device, data input modules, and a profile building system.

FIG. 20 depicts an embodiment of the communication stream for at least one employee interface device (1201) for a retail setting. Employee interface device (1201) can be any electronic device that has wide area network connectivity through wireless technologies such as 2G/3G/4G/5G mobile data network, LoRaWAN, Sigfox, or through Wi-Fi using an Internet connected apparatus such as router, switch or access point. The employee interface device also communicates with proximal data input devices using a personal area network technology such as Bluetooth, ZigBee, Infrared or Ultrawideband. The employee interface device can be a mobile phone, tablet, personal digital assistant, e-reader, or a similar portable device. It has been shown in FIG. 20. The employee interface device runs a software application that performs several important functions as follows: a) it configures proximal data input devices by providing them necessary network and operational information, which includes, but not limited to, the IP address where it can send its data, the location id of the retail store, or SSID and password for the in-store Wi-Fi network; b) it receives, processes and displays various real-time alerts sent by the profile building system, which includes, but not limited to, the presence of high-value customers in the store who can be engaged for further assistance, or shoplifters stealing items who must be stopped; c) it receives, processes and displays various operational alarms sent by the data input devices, which includes, but not limited to, device tampering attempt, low battery, no sound, no image or video, lens obstruction, or unexpected displacement; d) it temporarily redirects or replicates the data input device's image or video stream from its intended destination to the employee interface device, so that the data input device can be positioned properly by the store employees with optimum height, tilt angle or pan position; e) it controls the operation of proximal data input devices, which includes, but not limited to, power shut down/restart, play/pause/stop video recording, and reset or temporary disablement of anti-theft buzzer; f) it scans, interprets and transmits the encoded information in visual markers to proximal data input devices; g) it sets up and configures peer-to-peer networks between the data input devices by adding/deleting them to/from Wi-Fi and/or BLE mesh networks; h) it creates and updates Planogram by capturing store shelf images, detecting the pixels showing visual markers and groups of similar merchandise ("item cluster") within the captured images by using convolutional neural network based object detection algorithms such as R-CNN or YOLO, determining the distance between item clusters and their distances with visual markers by using common computer vision tools used for measuring pixel distances, and sending the image and its aforementioned associated metadata to the primary data repository.

Figure 30A:
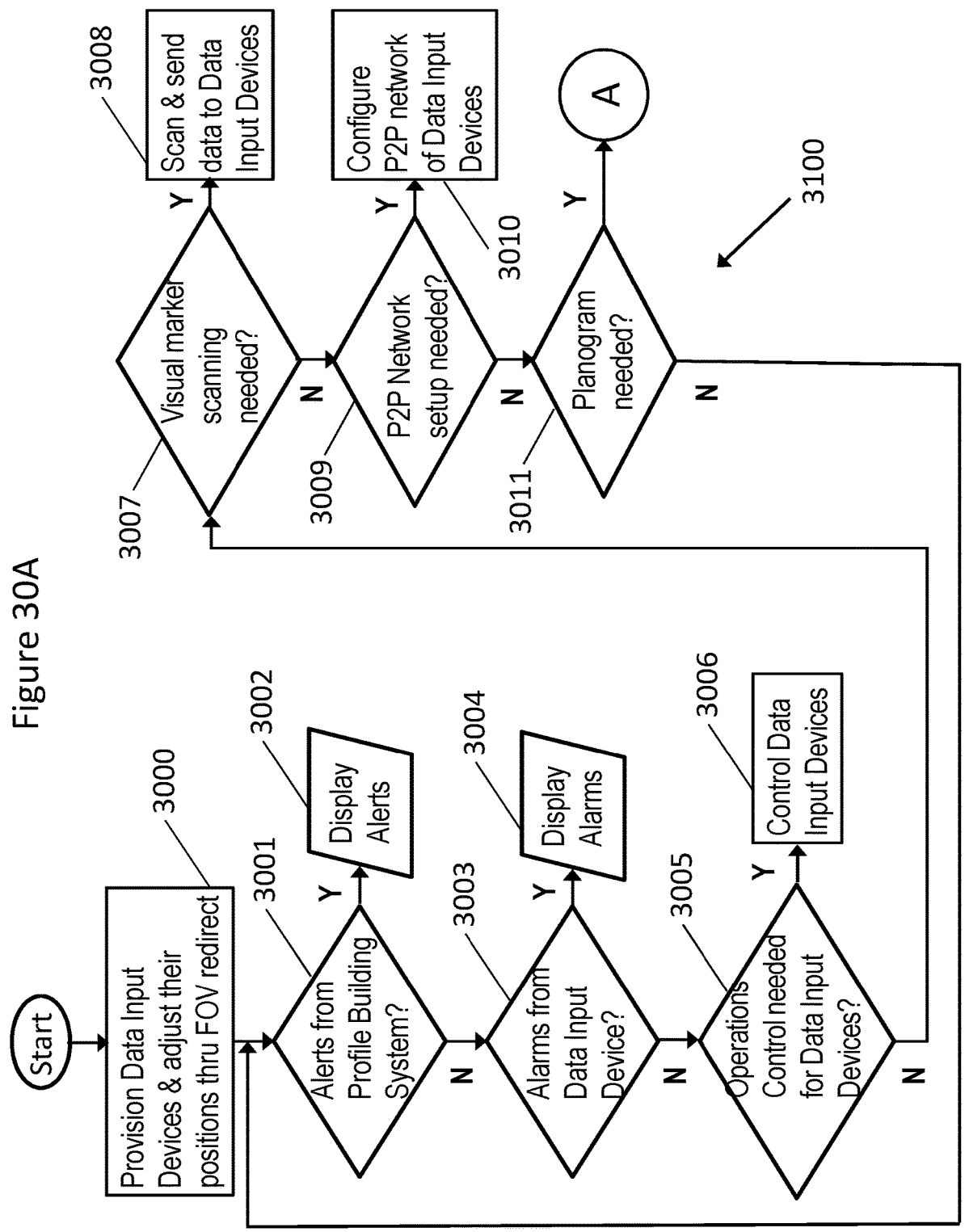
FIG. 30A is flowchart of an embodiment of the software processes that run on an employee interface device.
Figure 30B:
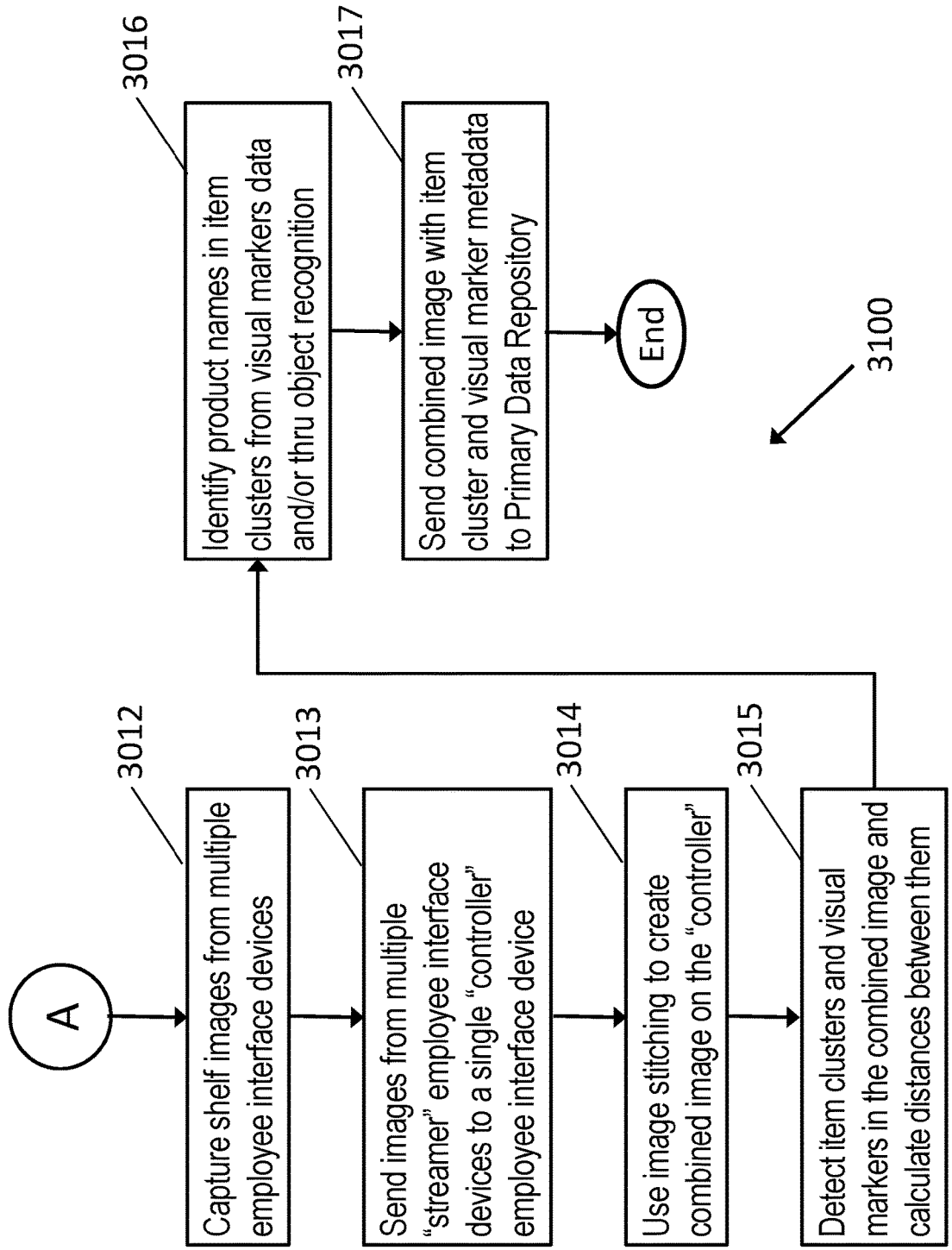
FIG. 30B is flowchart of an embodiment of software processes that run on an employee interface device.

FIGS. 30A and 30B together show a flowchart illustrating the main functional components of one or more software applications (3100) running on the employee interface device (1201) in one of the embodiments. It should be understood that in order not to obscure the inventive features of the disclosure, the flowchart does not provide an exhaustive account of all the functions associated with the operation of the processes. Thus, a number of common data processing operations that are not essential for understanding the essence of the disclosure are not depicted in the flowchart of FIGS. 30A and 30B as they are well known to those of ordinary skill in the art. The employee interface device (1201) starts its operation through a process (3000) that provisions unconfigured data input devices (103) by connecting with them thorough personal area network, local area network or wide area network, and providing necessary network and operational information required for the data input devices to communicate with the behavior learning system (102) and/or profile building system (101). The network and operational information includes, but not limited to, the IP address or URL where data input device (103) can send its data, the location id or postal code of the retail store where data input devices are located, or Service Set Identifier (SSID) and password for the in-store Wi-Fi network. Once connected with the data input device, the said process (3000) then redirects the data input device's image or video stream from its intended destination to the employee interface device temporarily, so that the data input device can be positioned properly by store employees with desired height, tilt angle or pan position by visual inspection of its field of view as seen on the employee interface device. Common data transfer techniques, such as HTTP streaming, RTMP, Miracast or WebSocket can be used for this purpose. The next process (3001) after this stage receives and processes alerts sent by at least one profile building system (101), and displays the alerts, if present, through another process (3002) that sends the alert information with audible beep on the screen of at least one employee interface device (1201), or on other types of devices that can be connected with the employee interface device. Common data transfer techniques, such as MQTT messages or Push notification alerts sent through mobile networks can be used for delivering the alerts. The alerts include, but not limited to, the presence of high-value customers in the store who can be engaged for further assistance, shoplifters stealing items who must be stopped, or trespassers going into restricted areas of the store. When no further alerts are pending to be processed, the employee interface device executes another process (3003) that receives and processes operational alarms sent by at least one data input device (103), and displays the alarms, if present, through another process (3004) that sends the alarm information with audible beep on the screen of at least one employee interface device (1201), or on other types of devices that can be connected with the employee interface device. Common data transfer techniques, such as MQTT messages or Push notification alerts sent through mobile networks can be used for delivering the operational alarms The alarms include, but not limited to, data input device tampering attempt, low battery, no sound captured, no image or video captured, lens obstruction detected, or unexpected shaking, vibration or displacement detected. When no further operational alarms are pending to be processed, the employee interface device executes another process (3005) that responds to requests sent by at least one data input device to control its operation by connecting with the device through personal area network, local area network or wide area network. Such control operations (3006), if requested, are executed through firmware interfaces on the data input device, which include, but not limited to, power shut down or restart, play/pause/stop of video recording, and reset or temporary disablement of anti-theft buzzer after it has gone off. When no further operational control request are pending to be processed, the employee interface device executes another process (3007) initiated by at least one user who specifies the location of at least one visual marker whose content needs to be read by the visual marker reader (404) software in the employee interface device, and the intended destination where the information read form the visual marker must be sent. In most embodiments, the intended destination will be one or more data input devices that are proximal to the visual markers. Upon reading the requested visual markers, the employee interface device sends the data to their intended destination through another process (3008) using common data transfer techniques. When no further visual marker reading request are pending to be processed, the employee interface device executes another process (3009) initiated by at least one user who specifies multiple data input devices that need to be setup in a peer-to-peer (P2P) network for operational or other reasons. The employee interface device responds to such requests, if present, by configuring one or more mesh networks, such as Wi-Fi or BLE mesh network, by adding new data input devices to existing networks or by creating new networks, deleting specific new data input devices from existing networks, updating the configuration parameters of existing or newly created networks, and similar operational tasks executed through network setup and provisioning process (3010). The employee interface device performs the network setup and provisioning process (3010) by connecting with data input devices thorough personal area network, local area network or wide area network, and then granting them permission to dynamically self-organize and self-configure the mesh network using a mesh networking protocol. When no further P2P network setup and provisioning process request are pending to be processed, the employee interface device executes another process (3011) initiated by at least one user who specifies at least one location in the store where a Planogram image, and associated metadata thereof, needs to be constructed by using at least one employee interface device. The employee interface device responds to such requests, if present, by configuring one employee interface device to act as "controller" that can receive images through network connection from one or more employee interface devices that are configured as "streamer". The "controller" and "streamer" both have the same physical structure of the employee interface device, but the software assigns the roles differently depending on the task they are required to perform. The "streamer" software running on employee interface devices capture store shelf images displaying merchandise through cameras embedded within the devices using an image capture process (3012), and then sends the images to the designated "controller" employee interface device using an image transmission process (3013) that connects through proximal network connection, such as a Wi-Fi Direct network, Mobile Ad Hoc (MANET) network or Bluetooth, or though the cloud using a wide area network. The image capture process (3012) is done with careful planning and precision such that overlapping fields of view exist between individual images sent by each successive "streamer" employee interface device. The overlapping fields of view allow the "controller" to create panoramic strips and other types of composite images using image stitching algorithms in a separate process (3014), which enables the creation of large areas of Planogram in a fast collaborative manner using multiple "streamer" employee interface devices. For example, in a retail store, store employees standing a few feet apart along the length of an aisle can create a panoramic composite image of the entire aisle within a few seconds when their individual images are stitched together by the "controller". In another embodiment, multiple "streamer" employee interface devices mounted on an automated guided vehicle may pass through a store aisle taking intermittent pictures, which can then be stitched together to create the composite image. Common image stitching algorithms in computer vision can be used in the image stitching process (3014). They work by first performing a pixel based alignment (e.g. gradient descent method) or feature based alignment (e.g. SURF, SIFT or other feature descriptors) that discovers the correspondence relationship among individual images with varying degrees of overlap. This stage is followed by another set of algorithms that take the alignment estimates and blend the images in a seamless manner, taking care of potential problems such as blurring or ghosting caused by parallax and scene movement, as well as varying image exposures. After performing image stitching, the "controller" employee interface device executes another process (3015) where it identifies the pixels containing visual markers and groups of similar merchandise ("item cluster") within the captured images by using convolutional neural network based object detection algorithms such as R-CNN or YOLO. The same process (3015) then calculates the distances between the item clusters and the visual markers in the image by using common computer vision tools used for measuring pixel distances. After this stage, the "controller" employee interface device executes another process (3016) where it identifies the names of the items contained in the image. In one embodiment, this can be done using convolutional neural networks trained with a large dataset containing sample images of the items from where unknown images of items can be correctly classified through supervised learning methods. In another embodiment, this can be done by scanning the visual markers proximal to the item cluster that contains the product information (e.g. price tag with UPC code), and querying the primary data repository (1103) to obtain detailed product information. After this stage, the "controller" employee interface device executes another process (3017) where it sends the captured image, along with its associated metadata, such as the distances between detected items clusters and visual markers, as well as identified product names for each cluster, in a batch transfer process to the primary data repository (1103).

Shown in FIG. 20 are at least one shopper (903), at least one data input device (103) represented by a core data input device (200) and an edge data input device (300). Also shown is a profile building system (101) with at least one primary data repository (1103) and at least one secondary data repository (1104). Data input device (103) may be an electronic circuit and software that, in its most basic embodiment, called edge data input device (300), comprises a data input device processor (108), various data and media processing components such as media streamer (301) and edge data aggregator (302), and an input data module selected from the group consisting of at least one video input module (104), at least one audio input module (105), at least one electronic device identification module (106), and at least one spatial position module (107).

The term input data module may be considered synonymous with data input module and data input device (103). In another embodiment, called core data input device (200), a behavior learning system (102) and a different set of media processing element, called media feed separator (219) and core data aggregator (220), are added to the aforementioned basic configuration of the edge data input device. In this embodiment, at least some of the behavior learning analysis is performed within the data input device itself before sending the emotion and identity output data (221) to the network for further processing in the profile building system (101). All of these individual modules and systems have been described separately in detail. Although data input device is not always a "camera" in the dictionary sense of the word as explained below, an overly simplistic way to describe the two aforementioned embodiments would be "smart camera" for the core data input device, which handles most, if not all, of the behavior learning analysis on the device itself; and "dumb camera" for the "edge data input device", which doesn't handle any behavior learning analysis itself and instead relies on external elements to do the task; with each embodiment having its own set of media and data processing elements due to the difference in the types of media and data they each have to process, aggregate and transmit. The physical structure of data input device can be centralized where all the components and modules are enclosed within the same packaging, or it can be completely distributed where components and modules are located in different physical enclosures. Data input device, with its various embodiments and physical structures, has been shown in FIGS. 3, 11, 12, 13 and 18. The data input device can be a consumer grade digital camera or a mobile phone with microphone, and additional electronic components and application software to process electronic device identification data (1006) and spatial position data (1007). It can also be an IP Camera System on Chip (SoC), an Application Specific Integrated Circuit (ASIC) or a Field Programmable Gate Array (FPGA) with an integrated CMOS or CCD image sensor, an embedded system such as a Single Board Computer (SBC) or a System on Module (SoM) built with Microcontrollers (MCUs) and/or Digital Signal Processors (DSPs). In another embodiment, both the edge data input device and the core data input device may have a display that can be used as an Electronic Shelf Label (ESL), or for a promotional digital signage application. In other embodiments, the data input device can be embedded inside different systems, such as retail kiosks, surveillance cameras, and point of sale (POS) terminals, and can even be concealed inside store mannequins or other objects that may not look like a camera.

As shown in FIG. 20, he employee interface device (1201) communicates data input device instructions (1203) with the at least one data input device (103). The employee interface device (1201) communication includes but is not limited to instructions, setup or provisioning, feedback, alarms, status, location, and maintenance. The at least one data input device (103) transmits combined emotion and identity output (221) and/or streamed media data (303) and aggregated spatial and electronic device identification data (304) to the at least one primary data repository (1103). At least one secondary data repository (1104), storing secondary data, communicates with the at least one primary data repository (1103) and primary and secondary information may be combined as required. The profile building system (101) transmits employee interface device instruction data (902) from the primary data repository (1103) to the employee interface device (1201), where it is processed and displayed to the employee. The employee may be instructed to approach the shopper (903) with suggestions or special offers for products. The employee may also be provided with security instructions or security personnel may be alerted. The user profile helps the retailer generate a customer profile, which allows the retailer to provide the customer with an enhanced or even customized experience. In exchange, the retailer is able to collect data on physical visitors which may ordinarily only be available in an online shopping environment or through targeted market research, such as focus groups.

FIG. 21 depicts an embodiment of a profile building system (101). Shown are a behavior learning system (102), a behavioral response analysis system (130), at least one secondary data repository (1104), and an administration and visualization tool (1105). The behavior response analysis system (130) has at least one stream processing engine (1102), at least one analytics engine (1101), and at least one primary data repository (1103). Emotion and identity output data (221), streamed media data (303), and aggregated spatial and electronic device identification data (304) are shown directly being received by the stream processing engine (1102). The stream processing engine (1102) is also shown communicating with the data analytics engine (1101), the behavior learning system (102), and the primary data repository (1103). The behavior learning system (102) is shown transmitting emotion and identity output data (221) and gaze tracking data (214), where the gaze tracking data (214) may be in the form of target merchandise data (710). The primary data repository (1103) is shown transmitting planogram data (711) to the behavior learning system (102) and receiving input from the secondary data repository (1104). While this embodiment refers to planogram data in general, the primary data repository (1103) may store planogram data (711) from multiple fixed-space locations but will retrieve planogram data (711) specific to the fixed-space in which the data input device is located. The primary data repository (1103) is also shown communicating with the stream processing engine (1102) and the administration and visualization tool (1105).

The at least one primary data repository (1103) may be digital mass storage system, such as a centralized database, distributed database, local file system or distributed file system, which stores, organizes and delivers various types of data required to build user profile. Examples of data repository include, but not limited to, relational databases (e.g. Sybase, Informix, MySQL), NoSQL and object-oriented databases (e.g. MongoDB, BigTable), distributed database (e.g. Cassandra) and distributed file system (e.g. HDFS). The at least one secondary data repository (1104) is a repository for market research or subject data which was obtained from a source outside the distributed system for building a plurality of user profiles (100), but the data may be available for use. The secondary data repository (1104) may be any type of mass storage system connected to and communicating with the distributed system for building user profiles. The at least one primary data repository (1103) and the at least one secondary data repository (1104) may physically be located within the same electronic mass data storage system or they may be located on different electronic mass data storage systems. A plurality of user profiles are to be stored within the at least one primary data repository (1103). A user profile from the plurality of user profiles may comprise an assortment of data, to be determined by each individual retailer. However, the user profile may contain data selected from the emotion and identity output data (221) and/or the facial expression recognition data (213) and/or the gaze tracking data (214) and/or the demographic analysis data (215) and/or the natural language output data (216) and/or the phonetic emotional analysis data (217) and/or facial recognition data, and/or product purchase confirmation.

The behavior learning system (102) may put data directly into the at least one primary data repository (1103) or it may communicate with the behavior response analysis system (130) before directly writing data into the primary data repository (1103) or before sending data to the behavior response analysis system (130). The stream processing engine (1102) acts on a continual stream of data from at least one data input device, at least one behavior learning system, or from at least one data repository. It also communicates with at least one analytics engine to receive input on data handling.

As its primary purpose, the at least one analytics engine provides a business platform covering descriptive, predictive and prescriptive analytics solutions; it identifies qualitative or quantitative patterns in the users' structured or unstructured data through machine learning algorithms for facial recognition, facial expression recognition, age/race/gender determination, natural language processing, and phonetic emotion analysis; and it reports the analytics results.

An administration and visualization tool (1105) may provide reporting information to store managers or system administrators in textual and/or visual format. This data may be reported in an automatic fashion and/or also upon demand through queries with a specific set of criteria or parameters. System administrators can make manual adjustments to the system. In a retails setting, reporting data can be customized to the retailer or retailer location but will generally include demographic analysis data, and/or emotional analysis data, and/or intent data, and/or traffic data, and/or visit frequency data, and/or spending data, and/or heat map, and/or queue analysis data, and/or traffic analysis data, and/or people count data. Management tools may include but are not limited to an identity and access management tool, and/or an address resolution protocol table export tool, and/or a visitor characteristics tool, and/or a merchandise tool, and/or a planogram tool.

FIG. 22 depicts an embodiment of the profile building system (101), similar to FIG. 21. Part of a behavior learning system (102) block is depicted within the profile building system (101) and part of the behavior learning system (102) is located outside. There may be multiple behavior learning systems (102) updating a single primary data repository (1103) or the behavior learning system (102) may be physically located on a machine or machines apart from the profile building system (101). Also shown are a behavioral response analysis system (130), at least one secondary data repository (1104), and an administration and visualization tool (1105).

FIG. 23 depicts an embodiment of an audio preprocessor (207). Audio output from a data input processor and/or a behavior learning processor (109) is received by the audio preprocessor (207), for further processing. An audio processor comprises a voice activity detector (601), and/or an audio quality enhancer (602), and/or a speaker diarization module (603), and/or a speech recognition module (604). A common processing sequence includes but is not limited to processing by a voice activity detector (601), transmitting voice activity detector output (605) to an audio quality enhancer (602), transmitting enhanced audio quality data (606) to a speaker diarization module (603), transmitting speaker diarization output (607) to a speech recognition module (604), which transmits audio preprocessor output (212).

If a natural language processing module (204) is on the data input device (103), as depicted in FIG. 12, then all audio preprocessor steps are likely to be required and will comprise the audio preprocessor output (212).

If a phonetic emotional analysis module (205) is on the data input device (103) and natural language processing is performed on the profile building system (101) or within a separate behavior learning system (102), then the audio preprocessor (207) located on the data input device (103) may only require processing by a voice activity detector (601), transmitting voice activity detector output (605) to an audio quality enhancer (602), transmitting enhanced audio quality data (606) to a speaker diarization module (603), transmitting speaker diarization output (607), where the diarization output is the audio preprocessor output (212). A second audio preprocessor (not shown) located with the natural language processing module (204) may be required to receive audio preprocessor output (212) in the form of diarization output (607), and to perform speech recognition in the speech recognition module (604).

A voice activity detector captures and processes audio between periods of silence.

An audio quality enhancer provides additional signal processing operations such as beamforming, dereverberation, and ambient noise reduction to enhance the quality of the audio signal.

Diarization is the process of partitioning an input audio stream into homogeneous segments according to subject speaker identity. This method is used to isolate and categorize multiple audio streams coming from different subjects in a group conversation.

Figure 24:
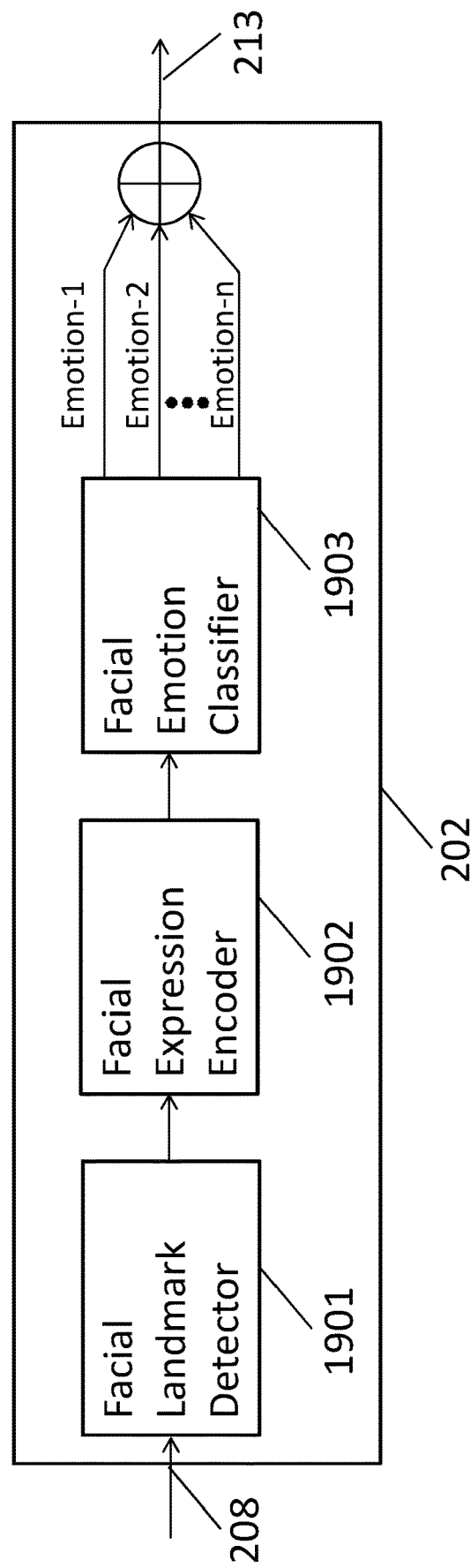
FIG. 24 is a block diagram of an embodiment of a facial expression recognition module.

FIG. 24 depicts an embodiment of a facial expression recognition module (202) showing a facial landmark detector (1901), a facial expression encoder (1902), and a facial emotion classifier (1903). Video output (208) is transmitted to and received by the facial landmark detector (1902) for processing. The output from the facial landmark detector (1901) is transmitted to and received by the facial expression encoder (1902), where it is processed further. The output from the facial expression encoder (1902) is transmitted to and received by the facial emotion classifier, where it is processed. The output from the facial expression classifier (1903) is the facial expression recognition output data (213), which includes: a single data stream with at least one emotion but commonly multiple emotions, feedback on the subject's experience, and a scaled determination of emotional intensity.

Facial expression recognition is a method for gauging a subject's expression, including but not limited to, detecting and classifying emotions, detecting subject experience feedback, and providing engagement metrics to determine emotional intensity. A common embodiment has seven emotional classes, including: joy, anger, surprise, fear, contempt, sadness, disgust. A subject's experience feedback may involve calculating an emotional metric and determining the result on a scale between positive and negative endpoints. Engagement metrics are often used to determine emotional intensity on a scale between no expression and fully engaged endpoints.

Figure 25:
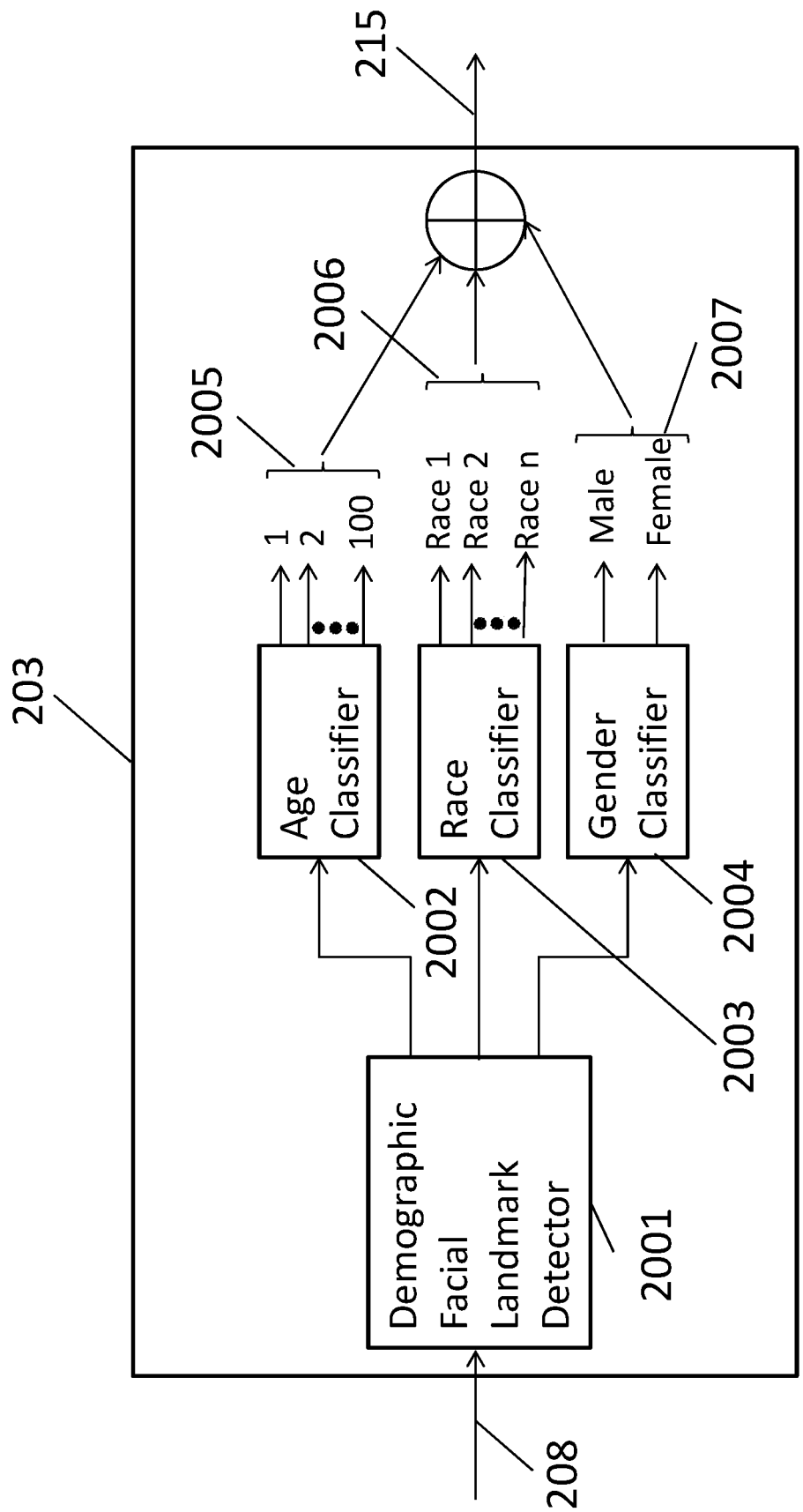
FIG. 25 is a block diagram of an embodiment of a demographic analysis module.

FIG. 25 depicts a demographic analysis module (203). Shown are a demographic facial landmark detector (2001), an age classifier (2002), a race classifier (2003), and a gender classifier (2004). Video output (208) is transmitted to and received by the demographic facial landmark detector (2001), where landmark data for a facial image is determined, and the output is transmitted to and received by an age classifier (2002), a race classifier (2003), and a gender classifier (2004). The age classifier determines a person's age, and provides age output (2005). Age can be either a specific number, or an estimated range. The race classifier (2003) determines a person's race and provides race output (2006). The gender classifier (2004) determines a person's gender and provides gender output (2007). Age output (2005), race output (2006), and gender output (2007) are generally transmitted as a single output stream, demographic analysis data (215).

Figure 26:
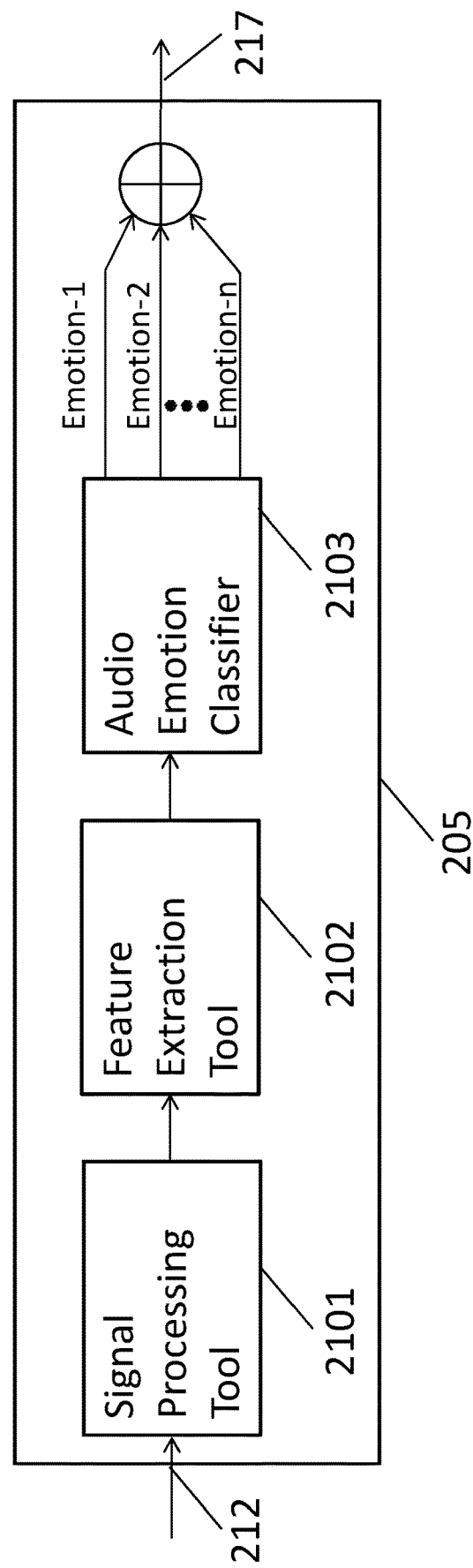
FIG. 26 is a block diagram of an embodiment of a phonetic emotional analysis module.

FIG. 26 depicts a phonetic emotional analysis module (205). Phonetic emotional analysis is a method of determining speech emotion and classifying that emotion. Audio preprocessor output data is received by the phonetic emotional analysis module (205) where a signal processing tool (2101) processes audio data and transmits signal process output data to a feature extraction tool (2102). The feature extraction tool (2102) further processes audio data and transmits phonetic feature and linguistic attribute data to an audio emotion classifier (2103). Phonetic features may include, volume, tone, tempo, pitch, intensity, prosody, simultaneous crosstalk between people, inflection, laughter, and sighs. Linguistic attributes include, words, pauses, silence, hesitation, inflections. The output from the audio emotion classifier (2102) identifies speech emotions and transmits phonetic emotional analysis data (217) which comprises a single data stream with at least one speech emotion but commonly multiple vocal emotions.

FIG. 27 depicts an embodiment of a speech recognition module (604), a component within an audio preprocessor (see FIG. 11). The speech recognition module (604) may have an acoustic model (2201), a feature extraction tool (2202), a pattern classification tool (2203), a confidence scoring tool (2204), a grammar module (2205), and a dictionary (2206). Speaker diarization output (607) is received by the feature extraction tool (2202) for processing. Vocal feature data is transmitted to a pattern classification tool (2203). Acoustic model data (2201), grammar data, and dictionary data are also sent to the pattern classification tool for processing with the vocal feature data. Pattern data is transmitted to the confidence scoring tool (2204) and speech recognition module output (2207), commonly in the form of text, for combination with other audio preprocessor output (not shown).

Alternate embodiments of the speech recognition module may include a machine learning architecture, where audio data (210) is received and transcribed audio is the output (2207). One embodiment includes a framework such as a recurrent neural network.

Figure 28:
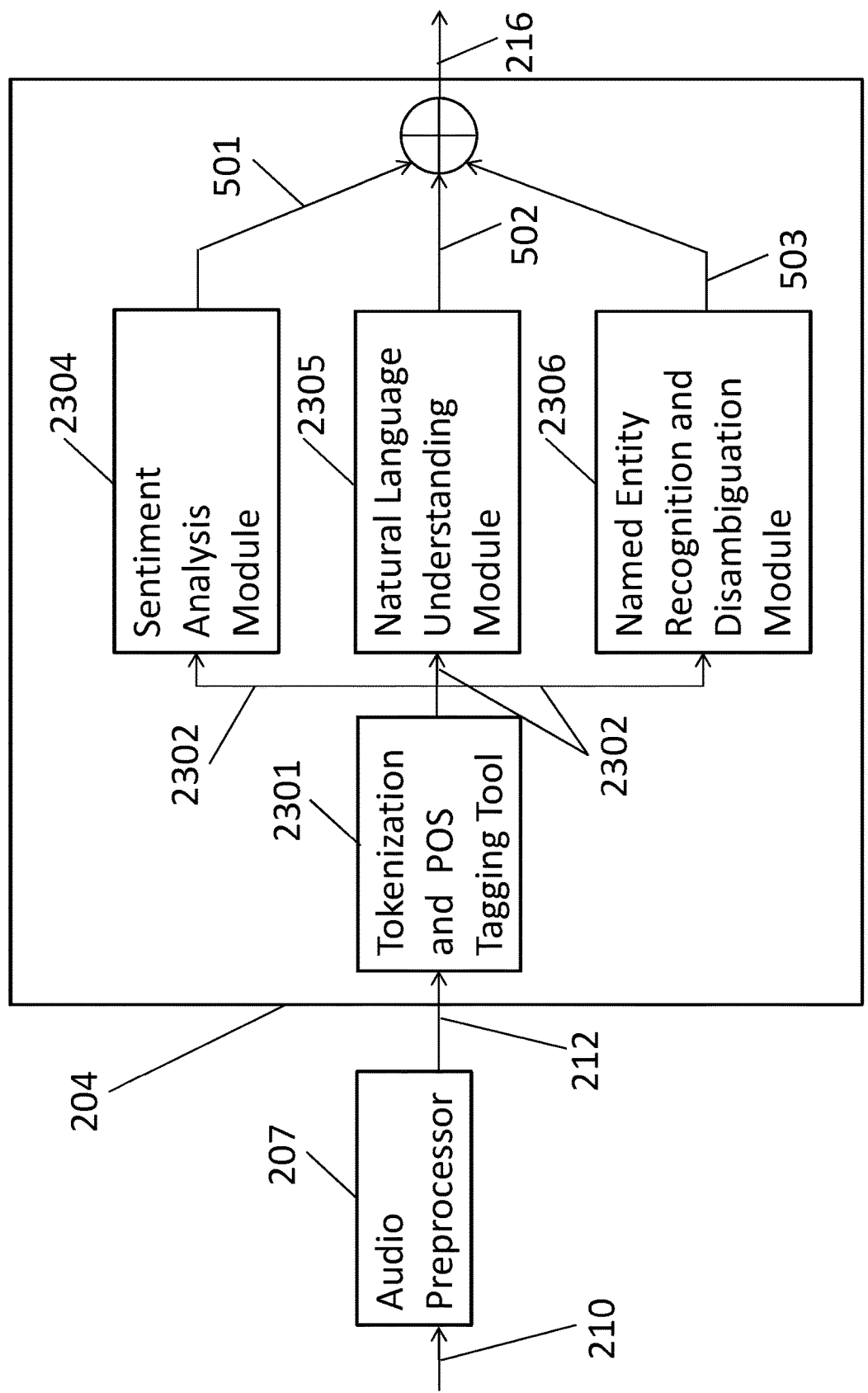
FIG. 28 is a block diagram of an embodiment of a natural language processing module.

FIG. 28 depicts a natural language processing module (also referred to as a system) (204). Natural language processing module (204) is software that performs the task of natural language processing, which is a technology that uses computer algorithms to understand, interpret and manipulate human language. Among the various sub-disciplines of natural language processing, the current disclosure makes use of the well known algorithms related to sentiment analysis, natural language understanding, and named entity recognition and disambiguation. Each of the aforementioned functions of natural language processing has been shown in FIG. 28 with individual modules or tools representing the component functions. Since the current disclosure is not dependent on the choice of a specific algorithm in any of the aforementioned modules or tools, and the subject matter is too broad to cover within the scope of this application, a brief description is provided here without getting into the details of each algorithm. Natural language processing is a technology that has been around since the 1950s. The various algorithms described briefly herein, should be known to a person skilled in the art. A survey of different natural language processing technologies can be found in the following two papers (as well as many other sources): A Systematic Survey of Natural Language Processing (NLP) Approaches in Different Systems and A Survey of the Usages of Deep Learning in Natural Language Processing.

In one embodiment of a natural language processing module as shown in FIG. 28, the module takes transcribed text (212) generated from speech as its input from an audio preprocessor module (207) and sends it to the tokenization and part-of-speech (POS) tagging tool (2301). The tokenization tool breaks the text into tokens (which can be words, punctuation marks, possessive markers etc.) and the POS tagging tool marks up the words to a particular part of speech based on both its definition and its context (i.e., its relationship with adjacent and related words in a phrase, sentence, or paragraph) using well known algorithms such as Hidden Markov Models, dynamic programming algorithms, Viterbi algorithm, Brill tagger, Constraint Grammar, and the Baum-Welch algorithm.

The sentiment analysis module (2304) assigns a qualitative attribute of positive, negative or neutral to each block of text it's tasked to analyze. Common algorithms for sentiment analysis can be grouped into three main categories: knowledge-based techniques, machine learning, and hybrid approaches. Knowledge-based techniques classify text by affect categories based on the presence of unambiguous affect words. Machine learning based algorithms, such as Latent Semantic Analysis, Support Vector Machines, Recurrent Neural Network, "Bag of Words", or "Pointwise Mutual Information", train a classifier using a large amount of training data from a sentiment-labeled corpus or a lexical database so that the model can predict the polarity of unlabeled text later. Hybrid approaches leverage both machine learning and elements from knowledge representation such as ontologies and semantic networks to detect semantics that are expressed in a subtle manner.

The natural language understanding module (2305) attempts to understand the meaning of words, sentences or blocks of unstructured text, and classifies them into predefined categories of intent. Common algorithms for natural language understanding can be grouped into two main categories: rule-based algorithms and deep learning algorithms. Rule based algorithms use a lexicon of the language, a parser, and a set of grammar rules to break unstructured text and reduce them to a structured ontology. The parser uses semantics to guide the comprehension using well known semantic interpretation algorithms such as naive semantics, stochastic semantic analysis or pragmatics, so that the meaning is always derived from the context. Deep learning based algorithms, such as Recurrent Neural Network and Tree-structured Recursive Neural Network, use a large amount of labeled training data to train the model to extract various metadata including entities, keywords, categories, sentiment, emotion, relations, and syntax. Once the model is built, the algorithm extracts the intent (activities that the user wants to do) and the entity (content of the action) from a user's utterance.

The named entity recognition and disambiguation module (2306) locates and classifies elements mentioned in unstructured text into pre-defined categories such as names of persons, organizations, locations, expressions of times, quantities, monetary values, percentages etc. and determines the identity of entities mentioned in text based on the context. Most algorithms use either hand-crafted, linguistic grammar-based techniques or supervised machine learning based methods where a large amount of labeled training data is used to train the model so that it can classify unlabeled texts later. Commonly used supervised learning algorithms for named entity recognition and disambiguation include Support Vector Machine, Hidden Markov Model, Maximum Entropy Markov Model, Recurrent Neural Network and Conditional Random Field.

Natural language processing module can be implemented on specifically programmed general-purpose computers and/or virtual machines that provide functionality of physical computers, with a preferred embodiment being one where the physical computers and/or virtual machines are equipped with Graphics Processing Unit. With the recent technological advances in AI-enabled semiconductor chips, it is also possible to implement the natural language processing module with System on Chip (SoC), Application Specific Integrated Circuit (ASIC), Field Programmable Gate Array (FPGA), embedded system such as Single Board Computer (SBC) or System on Module (SoM) built with Microcontrollers (MCUs) and/or Digital Signal Processors (DSPs), and combinations thereof.

Shown in FIG. 28 are an audio preprocessor (207), a tokenization and part of speech (POS) tagging tool (2301), a sentiment analysis tool (2304), a natural language understanding module (2305), and a named entity recognition and disambiguation module (2306). Audio output (210) from a data input device (not shown) is received by the audio preprocessor (207), for processing, and audio preprocessor output is transmitted to the natural language processing system (204). The audio preprocessor output (212) is received by the tokenization and POS tagging tool (2301). The tokenization and POS tagging tool (2301) performs data processing and transmits tokenization and POS data (2302) to the sentiment analysis tool (2304), the natural language understanding tool (2305), and the named entity recognition tool (2306). The sentiment analysis tool (2304), processes tokenization and POS data (2302) and transmits sentiment data (501). The natural language understanding tool (2306) processes tokenization and POS data (2302) and transmits intent data (502). The named entity recognition tool (2306) processes tokenization and POS data (2302) and transmits entity recognition data (503). Sentiment data (501), intent data (502), and entity recognition data (503), which is depicted as separate streams but is often combined into a single data stream, natural language output data (216) for transmission. Sentiment data may be classified as positive, negative, or neutral. Intent data will vary with the application, but in a retail setting intent results may include but not be limited to factors such as: a willingness to buy because of price or because of quality, or a reluctance to buy because of price or brand. Entity recognition may vary with the application but in a retail setting, identified entities may include available merchandise, unavailable merchandise, and other stores or companies.

For natural language processing, speech recognition, or natural language processing systems, systems can be trained for any language or on multiple languages.

Figure 29:
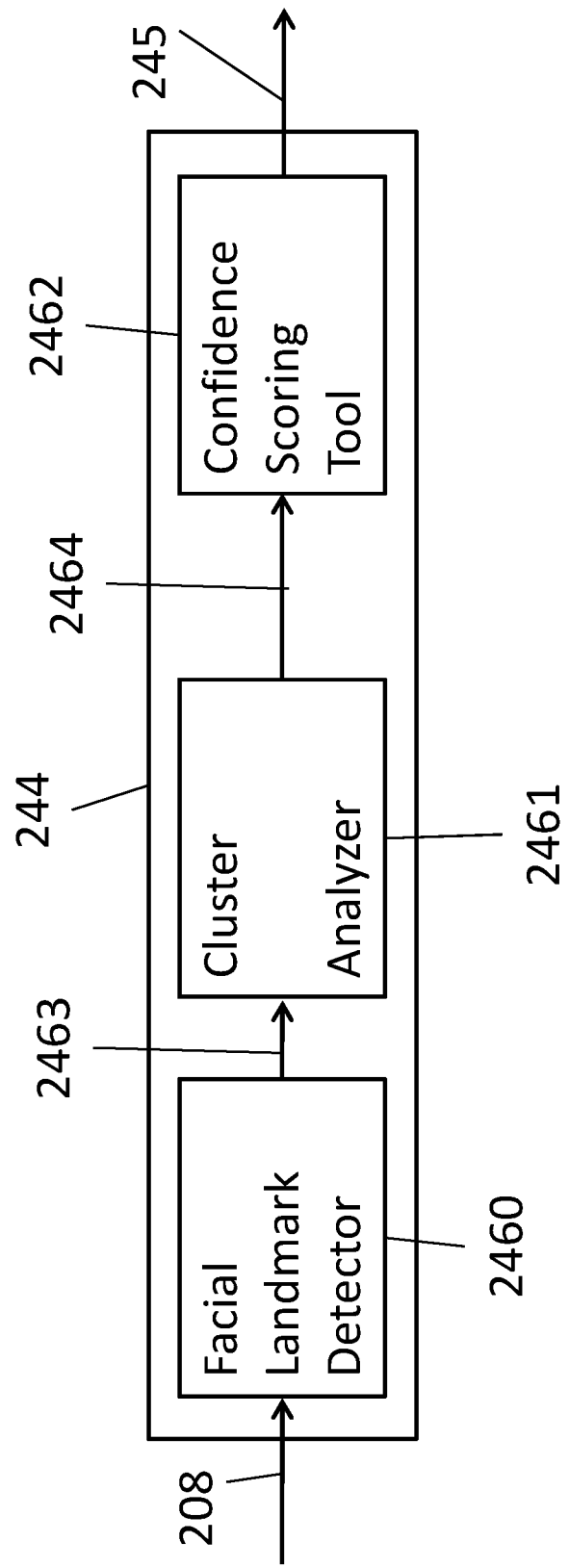
FIG. 29 is a block diagram of an embodiment of a facial recognition module.

FIG. 29 depicts a facial recognition module (244). Shown are a facial landmark detector (2460), a cluster analyzer (2461), and a confidence scoring tool (2462). Video data (208) is transmitted to the facial recognition module (244). The video data (208) is received by the facial landmark detector (2460) for processing. Facial landmark data (2463) is transmitted to the cluster analyzer (2461) and is received by the cluster analyzer (2461) for processing. Facial landmark data (2463) may be in the form of data objects that characterize various elements of a face identified in the video data (208). The cluster analyzer (2461) transmits cluster analysis data (2464) to the confidence scoring tool (2462). The cluster analysis data (2464) is a set of similar images that bear close resemblance to each other and to the input facial landmark data (2463). The confidence scoring tool (2462) receives the cluster analysis data (2464) for processing. The confidence scoring tool (2462) identifies whether a matched image is found. The facial recognition module (244) may include matched image data in the transmitted facial recognition module output data (245).

The distributed system for building user profiles (100) collects input data about a subject from multiple data input devices (103). As a subject moves about a fixed space, the data input devices will collect and update data. In a retail setting, video, audio, spatial recognition data, and electronic device identification data may be collected and a large amount of information may be gathered on a person's retail shopping habits. The actual data collected for customer profiles will vary from retailer to retailer, making an assortment of emotional data, identity data, product data, and purchasing data available for market research. Some potential data items include but are not limited to: a subject's identity, visit frequency, purchase amount, merchandise preference, foot-traffic patterns, emotional response to products, emotional response to brands, emotional response to pricing, demographic analysis, connection with loyalty programs and program profiles, and connection with off-site persona data.

Visual items that may be part of a database include but are not limited to facial recognition, facial expression recognition, gaze-tracking, and demographic analysis data. Audio items that may be part of the database include but are not limited to phonetic emotional analysis and natural language processing, yielding sentiment data (501), intent data (502), and entity recognition data (503). Electronic device identification provides unique electronic device identification data and the spatial position module (107) provides position data both for the user and for the input device. The assortment of data items collected provide a way to correlate visual, sound, and emotional queues with store products the customer views, selects and/or ultimately purchases. The system may also allow for redundant checks to ensure data correctness by providing comparisons and corrections as a person moves through the store.

Data input devices (103) are positioned around a retail location. The position of a data input device (103) may be determined during setup by taking a picture of visual markers in the vicinity, or sensing RFID tags attached to merchandise, or by relative position in a network using Bluetooth® signals captured from BLE beacons or through a positioning method that uses the data input device's own network connection. The data input device (103) can also be calibrated, allowing the adjustment of the video input module (104) height and viewing angle. The employee interface device (1201) is used to set-up the data input device modules and to establish or update a planogram that resides in the at least one primary data repository (1103). The planogram provides location information that aides in product identification for gaze tracking and other behavior learning systems. The employee interface device (1201) may also receive alarms from a data input device (103), as the employee interface device (1201) communicates with the data input device (103) and the profile building system (101). Alarms include but are not limited to tampering, low battery, no sound, no video, obstruction, displacement, and other matters which affect proper operation of the data input device (103).

The data input device (103) is not limited to a particular configuration, structure or type of input devices. It is not limited to a single camera or microphone, but may be a cluster, strip, or any configuration that allows for at least one video input module (104), at least one audio input module (105), at least one electronic device identification module (106), and at least one spatial position module (107).

The network of distributed data input devices (103), when triggered, send data to a behavior learning system (102), for processing, and then to a profile building system to build user profiles. As a subject walks within sensor range of a spatial position module (107), data gathering for that person's profile is triggered. Video, sound, subject spatial position data, and subject electronic device identification data are gathered. Audio and video input devices may be sufficiently sophisticated so that even in a group of people, a profile may be created and/or updated for each person in a group.

In some situations, not all the components of video, audio, electronic device identification, and spatial data may be available. Whatever data is received will be streamed to a behavior learning system. The system builds or updates a user profile with available data.

Video data (1004), audio data (1005), electronic device identification data (1006), and spatial position data (1007) is sent to behavior learning system. At least one data input device processor (108) may process, organize, coordinate, aggregate, separate, stream, direct, or control data flow.

The behavior learning system receives data input device output (1008). At least one behavior learning processor (109) may process, organize, coordinate, aggregate, separate, stream, direct, or control data flow. In an embodiment where the behavior learning system (102) is within a data input device (103), the behavior learning processor (109) and the data input processor (108) may be the same device. The behavior learning processor (109) may take a snapshot from the video data (208) feed and provides image output data (209) for data going to the at least one demographic analysis module (203). Within the behavior learning system, the video processor (110) receives video data (208), image data (209), and spatial position data, using one of the modules within the video processor (110) to processes the data. The audio processor (111) receives audio data (210) and uses one of the modules within the audio processor (111) to process the data.

At least one facial recognition module (244) performs face detection, face classification, and face recognition. The facial recognition module may provide facial recognition based on stored data in a one-to-many comparison, and/or a one-to-one comparison, and/or a one-to-few comparison. If there is a match, the output is sent in the form of facial recognition module output data (245).

At least one facial expression recognition module (202) analyzes expressions to determine a person's emotional reactions and the strength of the emotional reaction. The output is transmitted as facial expression recognition output data (213).

At least one gaze tracking module (201) determines a person's gaze direction, using planogram data (711) to identify products the users looks at. Often in the form of target merchandise data (710), gaze tracking data (214) is transmitted.

At least one demographic analysis module (203) determines the age (505), race (506), and gender (507) of a subject.

At least one audio preprocessor (207) receives audio data (210) and provides and speech recognition module output (2207) as audio preprocessor output (212). The audio preprocessor output (212) acts as input for at least one natural language processing module (204) and for at least one phonetic emotional analysis module (205).

The natural language processing module (204) provides sentiment data (501), intent data (502), and entity recognition data (503) commonly in relation to merchandise, when used in retail settings. However, natural language processing may be targeted for other market feedback, including but not limited to displays, layouts, staff, or other store features.

The emotional analysis module (205) provides output which identifies a subject's emotional reactions. Emotional reactions may vary as a person moves through a fixed space, or an item may trigger multiple emotional reactions, or a person may have varying intensities of a single emotion.

The entire system performs so that data input devices (103) are simultaneously collecting input data on multiple people within range of different data input devices within the fixed-space. The behavior learning system is simultaneously performing data analysis on multiple people, and multiple user profiles are simultaneously being built and/or updated. Face-recognition, facial expression recognition, gaze tracking, demographic analysis, speech recognition, and natural language processing, may be performed on group members within the field of view of a data input device (103) simultaneously and profiles can be created and/or updated on individual group members simultaneously. Not all modules need to collect data at the same time and there are times where certain data will be collected but other data will not. For example, if a subject is silent, then video data (1004), electronic device identification data (1006), and spatial position data (1007) will be collected and the profile updated.

Identification of a subject can be performed based on electronic device identification and/or facial recognition. If no video data (1004) is available a profile may be made using just electronic device identification. If the electronic device identification signal is not available or multiple signals are detected because a person is carrying multiple devices, a person's identity may be created and/or updated based solely on facial recognition. When both the electronic device and the face can be identified, it allows creation of an offsite persona. For the offsite persona, commonly collected data includes the MAC ID and IP address.

An electronic kiosk involves either direct interaction between the subject and an electronic device or between the subject and an intermediary person operating an electronic device, to complete a transaction, where the electronic device collects transactional information about the subject and the subject's interaction. The electronic device transmits electronic kiosk data, which is the transactional information. The electronic kiosk data is most commonly stored in the at least one primary data repository and may be used in building the user profile. Examples of electronic kiosks include but are not limited to point of sale terminals, airport boarding-pass dispensary machines, security checkpoints involving identification cards, security screening checkpoints, and such devices. Examples of transactions include but are not limited to service or product purchases, service or product confirmation document collection, electronic identification document scanning.

Purchasing data may also be significant. A common embodiment is to match the timestamp at the time items were purchased from a point of sale terminal with a timestamp of identity capture by the data input device (103) located near the point of sale terminal as the person is making a purchase. In this embodiment, items purchase can be associated with a person's identity. Since a data input device (103) receives video input (1040) and spatial position input (1070), another option is for the system to use the video input (1040) and spatial position input (1070) to determine what products the customer purchased and provide a timestamp. Another option is to collect purchase data through membership in a loyalty program that is commonly stored in either the primary data repository (1103) or in a secondary data repository (1104). A still further option is to track user purchases through RFID readers (403) that may be present on the data input device (103).

Subject identity is used to build the user profile. Subject identity is determined using a biometric identifier, and/or mobile electronic device identification data, and/or at least one establishment identifier. Biometric identifiers most commonly include facial recognition. However, other biometric identifiers may include but are not limited to voice recognition, gait recognition, or iris identification. Mobile electronic device identification data includes the MAC ID and/or the Bluetooth® mobile electronic device address data.

The profile may include mobile electronic device identification data for more than one mobile device. The at least one establishment identifier will depend on what the purpose of the fixed space is for and may depend on the establishment. In a retail setting, a loyalty card or "app" commonly provide the establishment identifier.

As a customer moves through a fixed space, data is gathered and periodically updated. The profile building system (101) may provide instructions to the employee interface device (1201). Such instructions may include directing an employee to assist a customer, or directing an employee to make special offers to the customer.

Embodiment 1 is a distributed system for building a plurality of user profiles comprising a distributed system for building a plurality of user profiles having a user profile from the plurality of user profiles having user profile data; at least one profile building system comprising at least one behavioral response analysis system and the plurality of user profiles; at least one behavior learning system comprising at least one behavior learning processor, at least one video data processor, and at least one audio data processor; at least one data input device having a data input device processor and/or at least one video input module, and/or at least one audio input module, and/or at least one electronic device identification module, and/or at least one spatial position module; and a data communication network comprising the at least one profile building system, the at least one behavior learning system, and the at least one data input device.

Embodiment 2 is the distributed system for building a user profile of embodiment 1, where the at least one video data processor has at least one gaze tracking module, and/or at least one facial expression recognition module, and/or at least one facial recognition module, and/or at least one demographic analysis module.

Embodiment 3 is the distributed system for building a user profile of embodiment 2, wherein the at least one audio data processor comprises at least one phonetic emotional analysis module, and/or at least one audio preprocessor module, and/or at least one natural language processing module.

Embodiment 4 is the distributed system for building a user profile of embodiment 3, where at least one behavioral response analysis system comprises at least one stream processing engine, at least one analytics engine, and at least one primary data repository; wherein the plurality of user profiles are stored in the at least one primary data repository.

Embodiment 5 is the distributed system for building a user profile of embodiment 4, where the at least one profile building system further comprises an Administration and Visualization Tool (1105) and at least one secondary data repository.

Embodiment 6 is the distributed system for building a user profile of embodiment 3, where the at least one behavior learning system is a component of the at least one data input device, and/or an independent system, and/or the at least one profile building system.

Embodiment 7 is the distributed system for building a user profile of embodiment 1, wherein the at least one electronic device identification module is a Wi-Fi packet analyzer module, and/or a mobile device Bluetooth® identification module. Wi-Fi packet analyzer (401) is a software algorithm that performs Wi-Fi packet scanning to discover and store uniquely identifiable information of all the neighboring mobile electronic devices within its detection range that have Wi-Fi capability, and re-identifies them when they come in proximity again in the future. Mobile electronic devices can be mobile phones, tablets, personal digital assistants, e-readers, or any other portable device that has Wi-Fi connectivity. This algorithm runs on any hardware platform that implements the Wi-Fi protocol stack. The Wi-Fi packet analyzer, shown in FIGS. 14A and 15, operates in Wi-Fi Monitor mode or Promiscuous mode, which enables it to monitor all the packets in a wireless network. Unless Wi-Fi is turned off, mobile devices with Wi-Fi capability send periodic probe requests to discover nearby wireless access points. The probe requests contain their MAC addresses, as well as other identifying information such as supported data rates, various 802.11 capabilities, and encryption types (if required). When a mobile device is configured to cache login credentials, the probe requests also contain Service Set Identifiers (SSIDs) of previously signed-in networks. The Wi-Fi packet analyzer stores all the aforementioned identifying information and uses it to re-identify the devices if they ever come in its proximity again in the future. The Wi-Fi packet analyzer is part of the data input device (103) but it may not always be physically enclosed in the same packaging. In some embodiments, it can be located at a different place and packaged within a different physical enclosure. Wi-Fi packet analyzer can be implemented on specifically programmed general-purpose computers and/or virtual machines that provide functionality of physical computers, as well as with System on Chip (SoC), Application Specific Integrated Circuit (ASIC), Field Programmable Gate Array (FPGA), embedded systems such as Single Board Computer (SBC) or System on Module (SoM) built with Microcontrollers (MCUs) and/or Digital Signal Processors (DSPs), and combinations thereof.

Embodiment 8 is the distributed system for building a user profile of embodiment 1, where the at least one spatial position module comprises a range finder sensor, and a spatial data gathering device selected from a visual marker reader, and/or an RFID reader, and/or a Bluetooth® Low Energy receiver, and/or a Wi-Fi positioning module.

Embodiment 9 is the distributed system for building a user profile of embodiment 1, where the data communication network is connected to at least one employee interface device.

Embodiment 10 is the at least one video data processor of embodiment 2, where the at least one video data processor comprises a gaze tracking module and the gaze tracking module comprises a computer vision system, a transfer function module, and an attribution module.

Embodiment 11 is a distributed system for building a plurality of user profiles comprising: a distributed system for building a plurality of user profiles having, a user profile from the plurality of user profiles having user profile data; at least one profile building system building the user profile comprising at least one behavioral response analysis system providing behavioral response analysis data, and the plurality of user profiles; at least one behavior learning system comprising at least one behavior learning processor, at least one video data processor providing video processor data, and at least one audio data processor providing audio processor data; at least one data input device comprising a data input device processor and data input modules (wherein data input modules is also herein referred to as data input device 103) providing data from at least one video input module providing video data, and/or at least one audio input module providing audio data, and/or at least one electronic device identification module providing electronic device identification data, and/or at least one spatial position module providing spatial position data; and a data communication network providing data communication comprising the profile building system, the behavior learning system, and the at least one data input device.

Embodiment 12 is the distributed system for building a user profile of embodiment 11, where the at least one video data processor providing video processor data from at least one gaze tracking module providing gaze tracking data, and/or at least one facial expression recognition module providing facial expression recognition data, and/or at least one facial recognition module providing facial recognition data, and/or at least one demographic analysis module providing demographic analysis data.

Embodiment 13 is the distributed system for building a user profile of embodiment 12, where the at least one audio data processor providing audio processor data comprises audio processor data from at least one phonetic emotional analysis module providing phonetic emotional analysis data, and/or at least one audio preprocessor module providing audio preprocessor data, and/or at least one natural language processing module providing natural language processing data.

Embodiment 14 is the distributed system for building a user profile of embodiment 13, where at least one behavioral response analysis system providing behavioral response analysis data comprising at least one stream processing engine, at least one analytics engine, and at least one primary data repository; wherein the plurality of user profiles are stored in the at least one primary data repository.

Embodiment 15 is the at least one profile building system of embodiment 14, where the at least one profile building system building the user profile comprising user profile data receives from at least one gaze tracking module providing gaze tracking data, and/or at least one facial expression recognition module providing facial expression recognition data, and/or at least one facial recognition module providing facial recognition data, and/or at least one demographic analysis module providing demographic analysis data, and/or at least one phonetic emotional analysis module providing phonetic emotional analysis data, and/or at least one audio preprocessor module providing audio preprocessor data, and/or at least one natural language processing module providing natural language processing data, and/or at least one spatial position module providing spatial position data, and/or at least one electronic device identification module providing electronic device identification data, and/or at least one behavioral response analysis system providing behavioral response analysis data.

Embodiment 16 is the distributed system for building a user profile of embodiment 15, where the at least one profile building system further comprises an administration module and at least one secondary data repository providing secondary data; and where the user profile from the plurality of user profiles further comprises secondary data.

Embodiment 17 is the distributed system for building a user profile of embodiment 11, where the at least one behavior learning system further is a component from at least one data input device, and/or an independent system, and/or the at least one profile building system.

Embodiment 18 is the distributed system for building a user profile of embodiment 11, where the at least one electronic device identification module providing electronic device identification data is a Wi-Fi packet analyzer module providing Wi-Fi packet analysis data, and/or a mobile device Bluetooth® identification module providing mobile device Bluetooth® identification data.

Embodiment 19 is the distributed system for building a user profile of embodiment 11, where the at least one spatial position module providing spatial position data; where the spatial position data comprises absolute position data, relative position data, height data, and horizontal distance data; and where the spatial position data is selected from a visual marker reader providing visual marker data, and/or a range finder sensor providing range data, and/or an RFID reader providing RFID data, and/or a Bluetooth® Low Energy receiver providing Bluetooth® Low energy data, and/or a Wi-Fi positioning module providing Wi-Fi positioning data.

Embodiment 20 is the at least one video data processor of embodiment 12, where the at least one video data processor providing video processor data comprises a gaze tracking module providing gaze tracking data; where the gaze tracking module providing gaze tracking data comprises a computer vision system providing video gaze output data, a transfer function module providing field-of-view data, and an attribution module providing target merchandise data; and where gaze tracking data comprises target merchandise data.

Embodiment 21 is the distributed system for building a user profile of embodiment 16, where demographic analysis data comprises race data, age data, and gender data.

Embodiment 22 is the distributed system for building a user profile of embodiment 16, where the administration module comprises a dashboard and administrative tools.

Embodiment 23 is the distributed system for building a user profile of embodiment 11, where the data communication network providing data communication further comprises at least one employee interface device receiving employee instructions, data input device alarms, and data input device provisioning instructions.

Embodiment 24 is a method for building a user profile, the method steps comprising: providing at least one data input device of a plurality of data input devices in at least one fixed space collecting and transmitting video data, audio data, mobile electronic device identification data, and spatial position data of a person from a plurality of persons as the person moves throughout the at least one fixed space; at least one behavior learning system receiving video data, audio data, mobile electronic device identification data, and spatial position data, having at least one video data processor processing video data and at least one audio data processor processing audio data; the at least one behavior learning system transmitting mobile electronic device identification data, spatial position data, video processor data and audio processor data; at least one profile building system receiving mobile electronic device identification data, spatial position data, video processor data, and audio processor data, and building the user profile of the plurality of user profiles; where the plurality of user profiles are stored in at least one primary data repository.

Embodiment 25 is the method of embodiment 24, wherein the at least one video data processor comprises: at least one gaze tracking module performing gaze tracking analysis and transmitting gaze tracking data, at least one facial recognition module performing facial recognition analysis and transmitting facial recognition data, at least one facial expression recognition module performing facial expression recognition analysis and transmitting facial expression recognition data, at least one demographic analysis module performing demographic analysis and transmitting demographic analysis data, and wherein video processor data comprises gaze tracking data, facial recognition data, facial expression recognition data, and demographic analysis data.

Embodiment 26 is the method of embodiment 25 wherein the at least one audio data processor comprises: at least one audio preprocessor module performs audio preprocessor analysis, and transmits audio preprocessor data; at least one phonetic emotional analysis module receiving audio preprocessor data, performing phonetic emotional analysis and transmitting phonetic emotional analysis data; at least one natural language processing module receiving audio preprocessor data, performing natural language understanding, performing sentiment analysis, and performing named entity recognition, and transmitting natural language processing data comprising natural language understanding data, sentiment analysis data and named entity recognition data; and wherein the audio processor data comprises phonetic emotional analysis data and natural language processing data.

Embodiment 27 is the method of embodiment 26, wherein the profile building system further comprises: associating the user profile from the plurality of user profiles with secondary data selected from at least one secondary data repository; the at least one behavioral response analysis system performing analysis of user profile data and secondary data; and updating the user profile.

Embodiment 28 is the method of embodiment 27, wherein the profile building system transmits instructions to at least one employee interface device, where the employee interface device receives instructions, and communicates said instructions to an employee through an employee application computer program.

Embodiment 29 is the method of embodiment 24 wherein the profile building system further comprises: the at least one behavioral response analysis system receiving video data, electronic device identification data, and spatial position data to create traffic data selected from the group consisting of a heat map, queue analysis data, traffic analysis data, people count data, and combinations thereof, and where the primary data repository stores retail data.

Embodiment 30 is the method of embodiment 25, where the gaze tracking module receives video data and spatial position data, where a computer vision system determines eye position and head orientation from the video data, transmitting eye position and head orientation data to a transfer function module; where the transfer function module receives eye position, head orientation data, and spatial position data; where input device field-of-view data, horizontal distance data, and height data are taken from the spatial data; where the transfer function module calculates user field of view data, and transmits the user field of view data to an attribution module, where the attribution module requests and receives planogram data from at least one primary data repository and receives the user field of view data, performing merchandise analysis, and transmitting gaze tracking data; and where gaze tracking data comprises target merchandize data.

Embodiment 31 is the method of embodiment 27, wherein the person interacts with an electronic kiosk providing electronic kiosk data, wherein at least one data input device collects and transmits video data, audio data, mobile electronic device identification data, and spatial position data of the person interacting with the electronic kiosk; wherein electronic kiosk data is transmitted to the primary data repository and/or the secondary data repository; and wherein the user profile further comprises electronic kiosk data.

Embodiment 32 is the method embodiment 31, where the electronic kiosk has a point of sale terminal, and wherein electronic kiosk data comprises product purchase data.

Embodiment 33 is the method of embodiment 32 wherein the product purchase data has a product identifier, sale amount, and a sale timestamp; wherein the profile building system provides a presence timestamp, location data, and identity data; wherein the sale timestamp and the presence timestamp are compared, user identity is confirmed, and stored sales data are selected from the product identifier, identity data, sale amount, sale timestamp, presence timestamp, location data, identity data, and combinations thereof.

Embodiment 34 is the method of embodiment 27 wherein the user profile from the plurality of user profiles is built using user identity, where user identity is at least one biometric identifier, and/or mobile electronic device identification data, and/or an establishment identifier.

Figure 31:
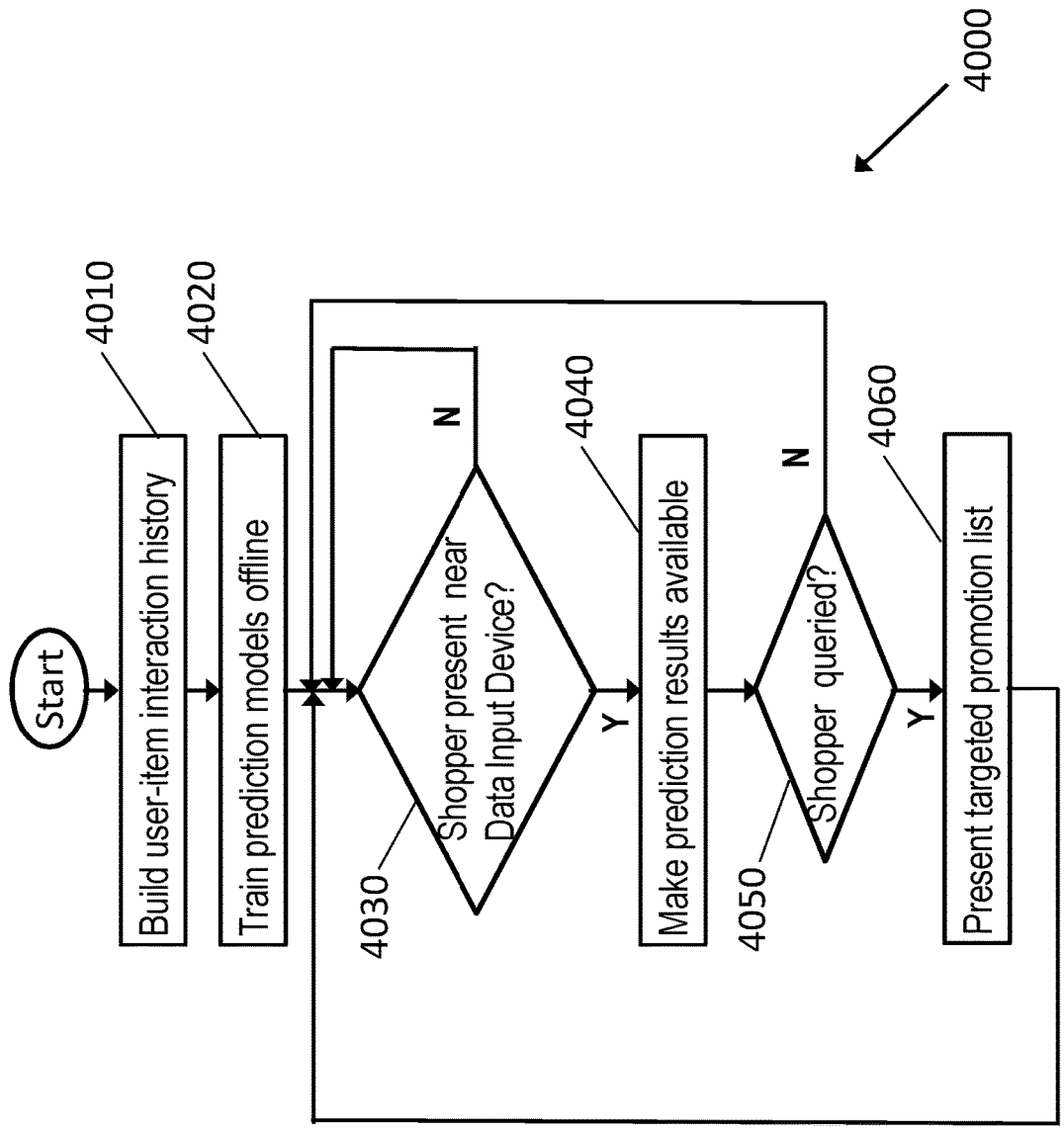
FIG. 31 is flowchart of an embodiment of a targeted promotion system (4000)

Embodiment 36 includes a targeted promotion system (4000), as shown in FIG. 31, which may be a software processing framework found in some embodiments of the Analytics Module (1101) as part of its predictive analytics function. The software makes real-time promotions for select products based on retail customers' individual characteristics (e.g. past product purchase, frequency of visit, amount spent per visit, past product liking/disliking as observed through positive/negative facial expression, longer/shorter gaze time or positive/negative verbal utterances interpreted through natural language processing module), as well as their group characteristics (e.g., similar age/race/ gender, similar product purchase history, similar product liking history, similar spend per visit, similar frequency of visit etc.). The purpose of the system is to present items that the customer has a high probability of buying when they are already browsing other related products on store shelves.

The targeted promotion system (4000) starts its operation through a process (4010) that builds a user-item interaction history, in the form of a high dimensional sparse matrix, or a similar data structure, that stores various types of pertinent data related to purchase or emotion of shoppers shown towards different products as each shopper makes a purchase or browses products on store shelves. These data types may include purchase data collected from specific embodiments of the data input device (103) contained inside, or co-located with, the point of sale terminals that can provide such details as names and quantities of items purchased, their prices etc. and correlate that information with repeat shoppers whose identities are ascertained through the electronic device identification module (106) and/or the facial recognition module (244); emotion and identity data collected from specific embodiments of the data input device (103) affixed to store shelves and interpreted through the video data processor (110) and audio data processor (111) to get such information as age, race and gender of shoppers, their facial expression and verbal utterances indicative of liking or disliking towards products, and the direction and duration of their gaze towards specific items on the shelves; context data related to the time and space information of products browsed or purchased, such as day of the week, time of the day, shopping path followed by the shopper in the store or shopper's walking speed collected and aggregated from all the data input devices; and descriptive metadata related to the products browsed or purchased, such as brand name, product category, special tags etc. All of the above data is collected over a period of time for all the shoppers who visit the store and the data is then stored in the primary data repository (1103). The data is further compared with other available information for the shoppers stored in the secondary data repository (1104), and an augmented dataset is constructed that combines the information from both repositories and stores the final results in the primary data repository (1103)

The next process (4020) after this stage trains a machine learning or deep learning model with the data contained in the user-item interaction history that was built by the previous process (4010) and stored in the primary data repository (1103). Once trained, the model can identify patterns inherent in the data and draw inferences about the relationship between different products based on which items are purchased (or liked/disliked) together, and/or relationship between different shoppers based on similar liking/disliking or purchase history, and/or causal relationship between all the pertinent data (purchase, emotion and identity, context and descriptive metadata) and actual purchase, and/or relationship between different products based on descriptive metadata classified through the natural language processing module (204), and/or a simple list of most popular products regardless of shopper or product similarity groups. Common algorithms such as Cosine Similarity, Pearson Correlation Coefficient, K-nearest neighbors, K-means clustering, Recurrent Neural Network or Convolutional Neural Network can be used for this type of analysis. Based on the analysis, several prediction models are generated that can be delivered in real time when needed. The prediction models are further refined and enhanced through specific business rules set by the retailers through the Admin and Visualization Tool (1105) that can suppress or boost the ranking of certain prediction results. The business rules can also specify which prediction model is to be used for different types of shoppers, or at different times of the year and so on. After the prediction models are built, they are deployed and ready to be served from the Analytics Module (1101) in real time.

The next process (4030) detects the presence of a shopper, or multiple shoppers, in the vicinity of data input device (103). It must be noted that the shopper detection process (4030) and the prediction models training process (4020) are not one continuous process in time. They occur at different times but both are shown in the same flowchart because they are components of the same software that executes in different ways at different times. The prediction models training process (4020) collects data and builds the models offline, whereas the shopper detection process (4030) executes afterwards when the training process (4020) has already been completed. In one embodiment, the shopper detection process (4030) can be done with the help of proximity sensors (such as infrared or ultrasound sensors) embedded inside data input device that can detect human presence in their proximity. In another embodiment, the shopper detection process (4030) can be done with the help of electronic device identification module (106) that can discover the presence of nearby shoppers by identifying their mobile electronic devices with Wi-Fi and/or Bluetooth capability.

Once the presence of shoppers is detected, the next process (4040) makes the prediction results available to the shoppers by sending a request to the stream processing engine (1102) through the core data aggregator (220) or the edge data aggregator (302) with the goal to collect all pertinent information about the detected shopper or shoppers. The stream processing engine (1102) inquires the identity of the shoppers through the facial recognition module (244) and/or the electronic device identification module (106). If the identity is unknown, the stream processing engine (1102) requests the analytics engine (1101) to predict a list of items based only on the common properties of the items that are similar to the item the shopper is currently viewing, or to predict a list of most popular items that the shopper has a high probability of buying. If the identity of the shopper is known because of prior store visits or availability of information from store loyalty app or loyalty card, the stream processing engine (1102) requests the analytics engine to predict a list of items based on one of the prebuilt prediction models that match the business rules specific to the shopper, or specific to the time of service. Once the prediction results are ready, the stream processing engine (1102) sends the data to the Admin and Visualization Tool (1105), so that the latter can present a webpage to the shopper containing the prediction results that promote select items, and/or send the content directly to the shopper's mobile device through a cloud based Push notification delivery service if and when it is possible. In one embodiment, the prediction results presentation process (4040) can display the promoted products list on specific web addresses (URL) that can be viewed by scanning a two-dimensional (2D) barcode, such as a QR code, shown on the display of the data input device (103) where the 2D barcode embeds the URL. In another embodiment, the prediction results presentation process (4040) can present the promoted products list to those shoppers who carry mobile devices with a store branded mobile app capable of receiving Push alerts sent by the Analytics Module (1101) through a cloud based notification service. In another embodiment, the prediction results presentation process (4040) can present the promoted products list to those shoppers who carry mobile devices with an app capable of scanning Physical Web compliant Bluetooth Low Energy (BLE) beacons supporting the Eddystone protocol, where the beacons, affixed to or embedded inside the data input device, can trigger the display of promoted products on the shoppers' mobile devices when their proximity to the data input device is detected. Physical Web is a technology pioneered by Google Inc. that enables smartphone users to interact with physical objects and locations through the use of Bluetooth beacons. Based on the presence of beacons, placed on or inside physical objects, a user can receive a notification on their mobile device when it is within the detection range of the beacon. The notification contains a link to a related web resources that can be opened in a browser.

Once the prediction results are ready to be served upon request, the next process (4050) detects if and when a shopper initiates a query about promoted products, and a related process (4060) delivers the targeted promotion list in response to the query. In one embodiment, shoppers can initiate the query by scanning a two-dimensional (2D) barcode on the display of the data input device from their personal mobile devices, such as smartphones or tablets. The 2D barcode embeds the URL where the promoted products list has been made available by the prediction results presentation process (4040). In another embodiment, the data input device (103) has Near Field Communication (NFC) tag or sticker affixed, which when tapped by a shopper with an NFC enabled mobile device, detects the URL tied to the NFC tag/sticker, which then leads to the display of the promoted products list directly to their mobile device browsers. The URL encoded in a 2D barcode or NFC tag can be a fixed code that doesn't change with time, but the landing page for that fixed code will change dynamically based on the profile of the shopper for which the promotions are made in real time. URL Redirect will send the traffic to specific web pages where the promoted products list is displayed. In both of the aforementioned embodiments, shoppers don't need to have a store branded mobile app to view the promoted items as the list is displayed directly on the browsers on their mobile devices. In another embodiment, shoppers may not initiate a query through any explicit action or gesture, but their previously granted permission and/or applicable store policies allow the detection of their presence to be interpreted as an act of query for which spontaneous unprompted delivery of the promoted products list is permissible. In such embodiments, where presence is interpreted as query, the promoted products list can be presented to the shoppers carrying mobile devices with a store branded mobile app that can receive Push alerts sent by the Analytics Module (1101) through a cloud based notification service. In another such embodiment, where presence is interpreted as query, the promoted products list can be presented to the shoppers who carry mobile devices with an app capable of scanning Physical Web compliant Bluetooth Low Energy (BLE) beacons supporting the Eddystone protocol, where the beacons, affixed to or embedded inside the data input device, can trigger the display of promoted products on the shoppers' mobile devices when their proximity to the data input device is detected.

Once the delivery of the targeted promotion list is completed, the software then attempts to detect any other shopper who may be in the proximity of the data input device, and the process repeats itself in a perpetual manner until it is being stopped through explicit instructions sent by the behavioral response analysis system (130) and/or the administration and visualization Tool (1105). The targeted promotion system (4000) can be implemented on specifically programmed general-purpose computers and/or virtual machines that provide functionality of physical computers.

The key difference between the targeted promotion system (4000) disclosed herein and other proximity based marketing methods is that the targeted system (4000) only promotes products that are relevant for a specific shopper based on their individual attributes and/or group characteristics and/or purchase history, whereas common proximity based marketing methods do not make such distinction and promote products for each shopper in the same way.

Figure 32:
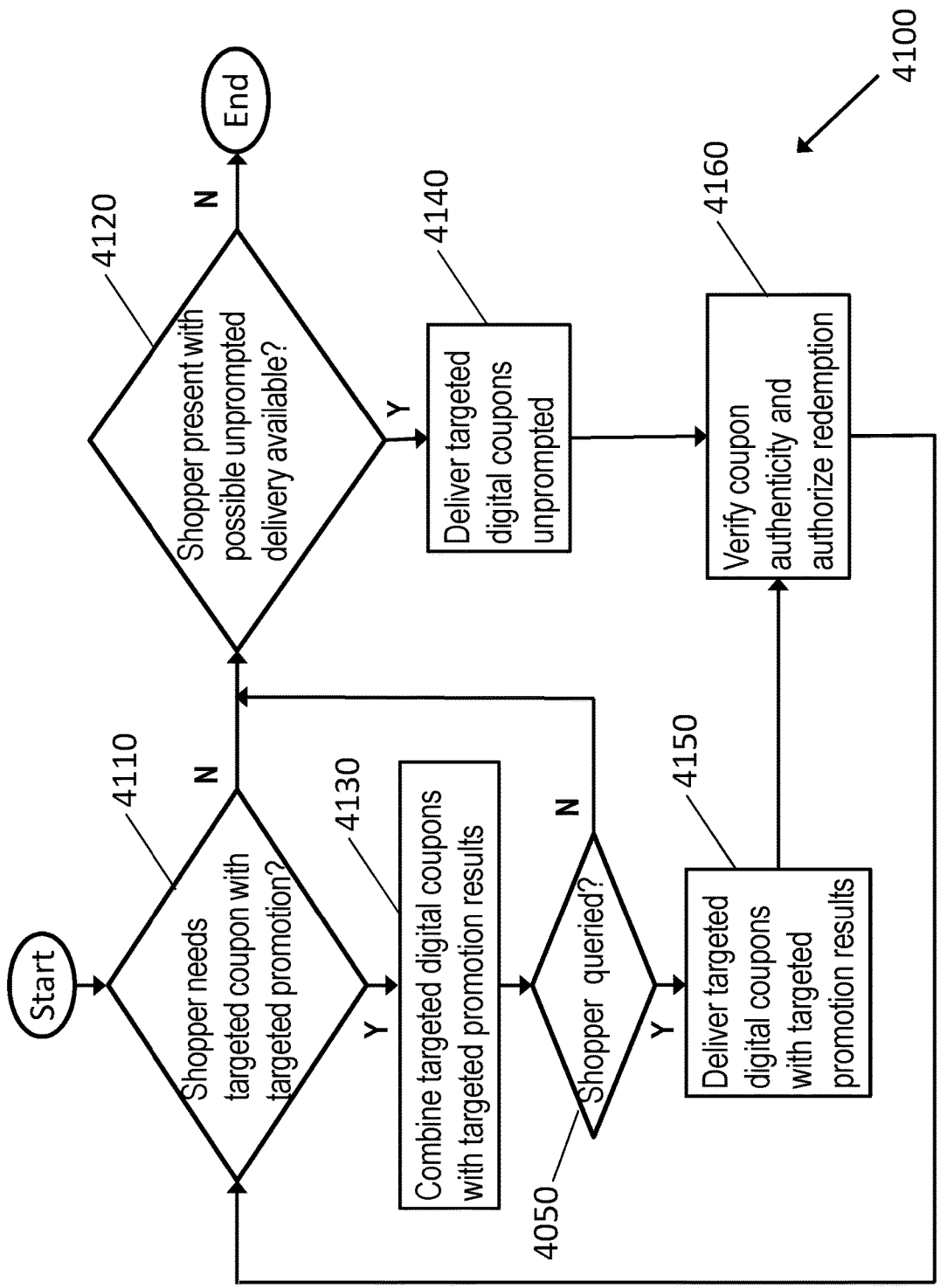
FIG. 32 is flowchart of an embodiment of a targeted digital coupon management system (4100)

Embodiment 37 includes a targeted digital coupon management system (4100), as shown in FIG. 32 which may be a software processing framework found in some embodiments of the Analytics Module (1101) as part of its predictive analytics function. The software creates, delivers and facilitates redemption of various types of digital coupons according to the business rules set by the retailers though the Admin and Visualization Tool (1105), and also ensures the authenticity of the said coupons. The targeted digital coupon management system (4100) starts its operation through a process (4110) that determines if the previously granted permission from shoppers and/or applicable store policies stored in the primary data repository (1103) allow presenting digital coupons along with the targeted promotion list, or they should be treated independent of each other and are not to be presented concurrently. If concurrent delivery is not a preferred or allowed method, then another process (4120) determines if unprompted delivery methods are available for those shoppers who have mobile devices with either a store branded mobile app capable of receiving Push alerts, or a mobile app capable of scanning Physical Web compliant BLE beacons. If the presence of no such known customers is detected though the electronic device identification module (106) and/or the facial recognition module (244), the process ends. If on the other hand, known shoppers with unprompted delivery method is available, the next process (4140) delivers the targeted digital coupons to the shoppers mobile devices in an autonomous manner. The digital coupon delivery process (4140) queries and receives the digital coupons from the analytics module (1101), which selects a list of products from the targeted promotion list for the specific shopper provided by the targeted promotion system (4000) and combines the list with specific business rules set for the coupons though the Admin and Visualization Tool (1105). The rules may include, but not limited to, percentage discount, fixed amount discount, buy one item and get one item free, buy one item and get the 2nd item with a percentage off etc. Even when delivered is unsolicited, the coupons are still targeted for each customer in a different way based on their individual attributes and/or group characteristics and/or purchase history, similar to the targeted promotion system (4000). However, since the delivery and presentation methods are not dependent upon the targeted promotion list, the coupons can be delivered any time without detecting the shopper's presence near a data input device. In one embodiment, the business rules can be static that do not change with time. In another embodiment, the business rules can be dynamic where the amount of discount and the type of coupon may change based on the instructions provided by the Admin and Visualization Tool at the time of delivery. For example, a retailer may set a business rule for target daily revenue. When the target revenue is reached, the coupon discount amount may reduce automatically. In another scenario, a high-value customer with a past history of greater spending may receive a higher discount compared to a low-value customer. In one embodiment, the coupons are generated through Blockchain technology to make them immutable, and thus enabling traceability, non-counterfeiting and unique usage by their intended users. A Blockchain based coupon generation and delivery platform, such as Mezzofy, can be integrated with the Admin and Visualization Tool (1105) to enable such delivery. In another embodiment, a set of business rules stored on the analytics module (1101) may create the coupons and later verify their authenticity during the time of redemption.

If targeted digital coupon presentation process (4110) determines that concurrent delivery of digital coupons with targeted items is the preferred method, then the next process (4130) combines the digital coupons with the targeted items for the shopper. This is done by querying and receiving the digital coupons from the analytics module (1101) in exactly the same manner as unprompted digital coupon delivery method (4140), and then combining the results with the prediction results presentation process (4040). If and when a shopper initiates a query, the query detection process (4050) prompts a combined delivery process (4150) to present the targeted digital coupons and the targeted promotion list together using one of the available methods (4060) used for delivering the targeted promotion list.

In the next stage, when a shopper attempts to use a coupon, a coupon authentication and authorization process (4160) verifies its authenticity and either grants access or denies the permission for the redemption of the said coupon. In one embodiment, this can be done through a Blockchain based access control system. In another embodiment, this can be done though a rule-based platform that compares the coupon code with a stored value on the primary data repository (1103).

Once the a coupon authentication and authorization process (4160) is completed, the software then attempts to detect any other shopper who may need to be served with digital coupons, and the process repeats itself in a perpetual manner until it is being stopped through explicit instructions sent by the behavioral response analysis system (130) and/or the administration and visualization Tool (1105).

It must be noted that the coupon authentication and authorization process (4160) do not happen at the same time with other processes shown in FIG. 32. They occur at different times but both are shown in the same flowchart because they are components of the same software that executes in different ways at different times. The coupons can only be redeemed after they have been successfully delivered through process 4140 or 4150. The targeted digital coupon management system (4100) can be implemented on specifically programmed general-purpose computers and/or virtual machines that provide functionality of physical computers.

Embodiment 38 includes any one of embodiments 1-37 combined with any one or more embodiments 2-37.

The detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific systems and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. Having described the presently preferred embodiments of the disclosure, it is to be understood that the disclosure may otherwise be embodied within the scope of the appended claims.

What is claimed is:

1. A distributed system for building a plurality of user profiles, comprising:
    at least one data input device for collecting visitor data about a visitor in a retail environment, displaying product information, and enabling the visitor to query product information; the data input device comprising a data input device processor and an input data module, the data input device processor being used for processing data input from the one or more input data modules, and the input data module consisting of a video input module, an audio input module, an electronic device identification module, and a spatial position module;
    a behavior learning system for determining a behavioral response the visitor has in the retail environment in response to viewing a merchandise item, including determining intensity of the behavioral response by identifying a change in emotion or intensity of emotion upon viewing the merchandise item, the behavior learning system comprising a video data processor, an audio data processor, and a behavior learning processor,
    wherein the audio data processor comprises a phonetic emotional analysis module configured to determine an emotional state of the visitor based on captured phonetic expressions of the visitor, and at least one natural language processing module configured to process captured natural language spoken by the visitor,
    wherein the video data processor comprises a gaze-tracking module configured to track a gaze of the visitor, facial recognition module configured to identify the visitor, facial expression recognition module configured to recognize a facial expression, and a demographic analysis module configured to analyze captured demographic data about the identified visitor, wherein the gaze-tracking module, facial expression recognition module, phonetic emotional analysis module, and natural language processing module are collectively used to determine the behavioral response the visitor has to the merchandize item, said merchandise item determined by the gaze-tracking module, wherein the demographic analysis data comprises race data, age data, and gender data captured by the demographic analysis module;
    a profile building system, for producing a comparative user profile from a plurality of user profiles, and a direct user profile from a single user profile, is built using visitor demographic data, identity information and the behavioral response, the profile building system comprising at least one behavioral response analysis system, at least one behavior learning system, at least one secondary data repository, and at least one administration and visualization module;
    a data communication network for communication between at least one profile building system, at least one behavior learning system, at least one employee interface device, and at least one data input device;

a targeted promotion system for presenting a curated list of products to the visitor in the retail environment, comprising at least one data input device for building a user-item interaction history and detecting visitor initiated item queries, at least one behavior learning system for determining the demographic data, identity information and behavioral response, including determining intensity by identifying change in emotion or intensity of emotion, of the visitor when an item is viewed or purchased, at least one primary data repository for determining the purchase data, context data and descriptive metadata associated with the visitor and the items viewed or purchased, at least one behavioral response analysis system for training a prediction model, based at least in part on behavioral response data provided by the behavior learning system, to serve the curated list of products, at least one administration module for preparing the curated list of products when a visitor initiated item query is detected, and at least one data communication network for delivering the curated list of products to the visitor.

2. The distributed system of claim 1, further comprising a targeted digital coupon system for producing, delivering and enabling redemption of a digital coupon to the visitor in a retail environment, comprising at least one targeted promotion system for presenting a curated list of products, at least one data input device for identifying the presence of the visitor carrying a mobile device capable of receiving an unsolicited digital coupon spontaneously without human initiated query, at least one administration module for determining business rules for creation and redemption of the coupon, and at least one data communication network for delivering the targeted digital coupon to the visitor wherein the targeted digital coupon system verifies the authenticity of the coupon at the time of redemption.

3. The distributed system of claim 1, wherein the gaze-tracking module provides gaze tracking data, and comprises a computer vision system, a transfer function module, and an attribution module; wherein the demographic analysis module provides demographic analysis data, and wherein the demographic analysis data comprises race data, age data, and gender data;

wherein the facial recognition module performs facial recognition analysis and transmits facial recognition data; and wherein the facial expression recognition module performs facial expression recognition analysis and transmits facial expression recognition data.

4. The distributed system of claim 1, wherein the spatial position module comprises a range finder sensor, and at least one of a visual marker reader, an RFID reader, a Bluetooth scanner, and a Wi-Fi positioning module.

5. The distributed system of claim 1, wherein the at least one electronic device identification module is selected from the group consisting of a Wi-Fi packet analyzer module, a mobile device Bluetooth identification module, and combinations thereof.

6. The distributed system of claim 1, further comprising an administration and visualization module, wherein the administration and visualization module comprises a dashboard and administrative tools performing operation management, user profile management and data visualization tasks.

7. The distributed system of claim 1, further comprising a gaze tracking module for receiving video data and spatial position data about the visitor; a computer vision system for determining eye position and head orientation for the visitor from the video data;

a transfer function module for receiving horizontal distance, eye position and head orientation of the visitor, along with the height and field-of-view of the data input device, in order to calculate field-of view data;

an attribution module for receiving a set of user field-of-view data and planogram data for performing merchandise analysis and providing target merchandise data, wherein the attribution module uses the gaze-tracking data, planogram data, and the user field-of-view data to perform the merchandise analysis.

8. The distributed system of claim 1, further comprising an employee interface device, wherein the employee interface device receives instructions, and communicates said instructions to an employee through an employee application computer program; wherein the employee interface device further configures proximal data input devices; receives, processes and displays various real-time alerts sent by the profile building system; receives, processes and displays operational alarms sent by the data input devices; temporarily redirects or replicates the data input device's image or video stream from its intended destination to the employee interface device, so that the data input device can be positioned properly at optimum height, tilt angle or pan position; controls the operation of proximal data input devices; scans, interprets and transmits encoded information contained in visual markers to proximal data input devices;

configures peer-to-peer networks between the data input devices by adding or deleting them to or from mesh networks;

creates and updates planogram by capturing retail product display images, detecting the areas showing the visual markers and groups of similar retail products within the captured images, determining the distances between groups of similar retail products, and their distances from each visual marker, and sending the image and the metadata indicating the position of the visual markers and groups of similar retail products to at least one primary data repository;

comprises at least one controller employee interface device used for receiving retail product display images with the metadata indicating the position of visual markers and groups of similar retail products from at least one streamer employee interface device, combining each received image from each streamer employee interface device to construct a composite image of a planogram, and sending the planogram to at least one primary data repository;

comprises at least one streamer employee interface device for sending the plurality of retail product display images with the metadata indicating the position of the visual markers and groups of similar retail products to the controller employee interface device.

9. The distributed system of claim 1, further comprising at least one audio data processor comprising at least one audio preprocessor module providing audio preprocessor data, at least one phonetic emotional analysis module providing phonetic emotional analysis data, and at least one natural language processing module providing natural language processing data consisting of at least one of natural language understanding data, sentiment analysis data, and named entity recognition data.

10. The distributed system for building a user profile of claim 1, wherein the at least one behavioral response analysis system providing behavioral response analysis data comprises at least one stream processing engine, at least one analytics engine, and at least one primary data repository; wherein the plurality of user profiles are stored in the at least one primary data repository.

11. The distributed system for building a user profile of claim 1, wherein a user identity information comprises at least one at least one facial recognition data, at least one electronic device identification data, and combinations thereof.

12. A method for building a user profile, comprising:
collecting data input device data in a retail environment using a data input device, the data input device data comprising video data, audio data, mobile electronic device identification data, and spatial position data of a visitor as the visitor moves throughout the retail environment, the visitor being selected from a plurality of visitors;
displaying product information, and enabling the visitor to query the product information from the data input device;
transmitting the data input device data to a behavior learning system, the behavior learning system receiving the data input device data, the behavior learning system comprising at least one behavior learning processor, at least one video data processor and at least one audio data processor,
wherein the audio data processor comprises a phonetic emotional analysis module configured to determine an emotional state of the visitor based on captured phonetic expressions of the visitor, and at least one natural language processing module configured to process captured natural language spoken by the visitor,
wherein the video data processor comprises a gaze-tracking module configured to track a gaze of the visitor, facial recognition module configured to identify the visitor, facial expression recognition module configured to recognize a facial expression, and a demographic analysis module configured to analyze captured demographic data about the identified visitor, wherein the gaze-tracking module, facial expression recognition module, phonetic emotional analysis module, and natural language processing module are collectively used to determine the visitor's behavioral response, including determining intensity of the visitor's behavioral response by identifying change in emotion or intensity of emotion, to a gazed upon merchandise item, said gazed-upon merchandise item determined by the gaze-tracking module, wherein the demographic analysis data comprises race data, age data, and gender data captured by the demographic analysis module;
delivering a curated list of products to the visitor in the retail environment from a prediction model upon receiving the query from the visitor, wherein the prediction model is built from user-item interaction history that incorporates demographic data, identity information, previous behavioral responses of the visitor, and previous behavioral responses of a plurality of other visitors, along with the purchase data, context data and descriptive metadata associated with an item viewed or purchased by the visitors;
producing a targeted digital coupon intended for usage by the visitor in the retail environment after applying a set of business rules to the targeted promotions list, or after applying the set of business rules to an independently generated list of products, and enabling a redemption of the coupon thereafter through verification of authenticity, wherein the targeted digital coupon is delivered upon receiving query from the visitor, or upon detecting the presence of the visitor's mobile devices capable of receiving an unsolicited digital coupon spontaneously without human initiated queries;
preparing, using the behavior learning system, visitor data, the visitor data comprising, mobile electronic device identification data, spatial position data, video processor data and audio processor data using the data input device data;
determining a behavioral response for the visitor in the retail environment to a merchandise item, including intensity level of the response, using at least the visitor data;
compiling the visitor data and the behavioral response into a user profile for the visitor, the user profile including information and measurements about the visitor in the retail environment.

13. The method of claim 12, wherein the producing and transmitting of the at least one video data processor data comprises:
performing gaze-tracking analysis and transmitting gaze tracking data with at least one gaze tracking module;
performing facial recognition analysis and transmitting facial recognition data with at least one facial recognition module;
performing facial expression recognition analysis and transmitting facial expression recognition data with at least one facial expression recognition module;
performing demographic analysis and transmitting demographic analysis data with at least one demographic analysis module; and
incorporating gaze-tracking data, facial recognition data, facial expression recognition data, and demographic analysis data as part of the user profile.

14. The method of claim 12, wherein the producing and transmitting of the at least one audio data processor data comprises,
performing audio preprocessor analysis with at least one audio data processor that comprises at least one audio preprocessor module producing audio preprocessor data;
transmitting audio preprocessor data to the phonetic emotional analysis module and the natural language processing module;
receiving audio preprocessor data, performing phonetic emotional analysis, and producing phonetic emotional analysis data with at least one phonetic emotional analysis module; receiving audio-preprocessor data for producing natural language processing data with at least one natural language processing module;
performing one or more natural language processes to create natural language processing data, wherein the one or more natural language processing data comprises at least one of natural language understanding data, sentiment analysis data, and named entity recognition data; and incorporating the phonetic emotional analysis data and the natural language processing data as part of the user profile.

15. The method of claim 12, further comprising
associating the user profile from the plurality of user profiles with secondary data selected from at least one secondary data repository;
performing analysis of user profile data and secondary data using the at least one behavioral response analysis system; and
updating the user-profile.

16. The method of claim 12, further comprising
creating traffic data for the retail environment using video data produced by the data input device, electronic device identification data produced by the electronic device identification module, and spatial position data produced by the spatial position module, the traffic data being selected from the group consisting of heat map data, queue analysis data, traffic analysis data, people count data, and combinations thereof.

17. The method of claim 12, further comprising
receiving video data and spatial position data about the visitor with a gaze-tracking module; determining eye position and head orientation for the visitor from the video data using a computer vision system;
receiving horizontal distance, eye position and head orientation of the visitor, along with the height and field-of-view of the data input device, with a transfer function module, and calculating field-of view data using a transfer function; receiving the field of view data with an attribution module;
performing merchandise analysis and providing target merchandise data using an attribution module, the merchandise analysis being performed using the gaze-tracking data, planogram data, and the user field-of-view data;
calculating a point of intersection of a gaze vector with a plane surface in a three dimensional space where the gaze is directed, and associating that point with a known reference object by performing a 3D coordinate transformation of the gaze vector from a coordinate system centered around the eyes to a second coordinate system located on a plane containing the objects of interest by combining axes rotations, scale change and origin shifts;
utilizing a reference map to associate the point of intersection of the gaze vector on the second plane with a known object, wherein the reference map is planogram data that specifies the dimensions and positions of groups of similar products on a retail product display.

18. The method of claim 12, further comprising transmitting instructions to at least one employee interface device, and with the employee interface device, receiving the instructions, and communicating said instructions to an employee through an employee application computer program;
configuring proximal data input devices;
receiving, processing and displaying various real-time alerts sent by the profile building system; receiving, processing and displaying operational alarms sent by the data input devices;
temporarily redirecting or replicating the data input device's image or video stream from its intended destination to the employee interface device, so that the data input device can be positioned properly at optimum height, tilt angle or pan position;
controlling the operation of proximal data input devices;
scanning, interpreting and transmitting encoded information contained in visual markers to proximal data input devices;
configuring peer-to-peer networks between the data input devices by adding or deleting them to or from mesh networks;
creating and updating planogram by capturing retail product display images, detecting the areas showing visual markers and groups of similar retail products within the captured images, determining the distance between groups of similar retail products and their distances from each visual marker, and sending the image and its aforementioned associated metadata indicating the position of visual markers and groups of similar retail products to at least one primary data repository;
constructing a planogram by capturing a plurality of retail product display images from a plurality of employee interface devices;
sending at least one retail product display image from at least one streamer employee interface device to a controller employee interface device;
using image stitching to create a combined image on the controller employee interface device; detecting a plurality of groups of similar retail products and a plurality of visual markers in the combined image;
calculating distances between the plurality of groups of similar retail products and the plurality of visual markers;
identifying a plurality of product names in the plurality of groups of similar retail products from a set of plurality of visual marker data or through object recognition;
sending the combined image and a plurality of groups of similar retail products and visual marker metadata to at least one primary data repository.

19. A method for building a user profile, comprising:
collecting data input device data in a retail environment using a data input device, the data input device data comprising video data, audio data, mobile electronic device identification data, and spatial position data of a visitor as the visitor moves throughout the retail environment, the visitor being selected from a plurality of visitors;
transmitting the data input device data to a behavior learning system, the behavior learning system receiving the data input device data, the behavior learning system comprising at least one behavior learning processor, at least one video data processor and at least one audio data processor,
wherein the audio data processor comprises a phonetic emotional analysis module configured to determine an emotional state of the visitor based on captured phonetic expressions of the visitor, and at least one natural language processing module configured to process captured natural language spoken by the visitor,
wherein the video data processor comprises a gaze-tracking module configured to track a gaze of the visitor, facial recognition module configured to identify the visitor, facial expression recognition module configured to recognize a facial expression, and a demographic analysis module configured to analyze captured demographic data about the identified visitor, wherein the gaze-tracking module, facial expression recognition module, phonetic emotional analysis module, and natural language processing module are collectively used to determine the visitor's behavioral response, including determining intensity by identifying change in emotion or intensity of emotion, to a gazed upon merchandise item, said gazed-upon merchandise item determined by the gaze-tracking module, wherein the demographic analysis data comprises race data, age data, and gender data captured by the demographic analysis module;
preparing, using the behavior learning system, visitor data, the visitor data comprising, mobile electronic device identification data, spatial position data, video processor data and audio processor data using the data input device data;

determining a behavioral response of the visitor in the retail environment to a merchandise item, including intensity level of the response, using at least the visitor data; and compiling the visitor data and the behavioral response into a user profile for the visitor, the user profile including information and measurements about the visitor in the retail environment;

delivering a curated list of products to the visitor in the retail environment from a prediction model upon receiving the query from the visitor, wherein the prediction model is built from user-item interaction history that incorporates demographic data, identity information, and behavioral response of a plurality of visitors, along with the purchase data, context data and descriptive metadata associated with an item viewed or purchased by the visitors producing a targeted digital coupon intended for usage by the visitor in the retail environment after applying a set of business rules to the targeted promotions list, or after applying the set of business rules to an independently generated list of products, and enabling a redemption of the coupon thereafter through verification of their authenticity, wherein the targeted digital coupon is delivered upon receiving query from the visitor, or upon detecting the presence of the visitor's mobile devices capable of receiving an unsolicited digital coupon spontaneously without human initiated queries;

producing and transmitting of the at least one video data processor data comprising gaze-tracking data, facial recognition data, facial expression recognition data, and demographic analysis data; performing gaze-tracking, analysis and transmitting gaze-tracking data with at least one gaze- tracking module;

performing facial recognition analysis and transmitting facial recognition data with at least one facial recognition module;

performing facial expression recognition analysis and transmitting facial expression recognition data with at least one facial expression recognition module;

performing demographic analysis and transmitting demographic analysis data with at least one demographic analysis module;

incorporating gaze-tracking data, facial recognition data, facial expression recognition data, and demographic analysis data as part of the user profile;

producing and transmitting of the at least one audio data processor data comprising phonetic emotional analysis data and natural language processing data;

performing audio preprocessor analysis with at least one audio data processor that comprises at least one audio preprocessor module producing audio preprocessor data;

transmitting audio preprocessor data to the phonetic emotional analysis module and the natural language processing module;

receiving audio preprocessor data, performing phonetic emotional analysis, and producing phonetic emotional analysis data with at least one phonetic emotional analysis module; receiving audio-preprocessor data for producing natural language processing data with at least one natural language processing module:

performing one or more natural language processes to create natural language processing data, wherein the one or more natural language processing data comprise at least one of natural language understanding data, sentiment analysis data, and named entity recognition data; incorporating the phonetic emotional analysis data and the natural language processing data as part of the user profile;

associating the user profile from the plurality of user profiles with secondary data selected from at least one secondary data repository;

performing analysis of user profile data and secondary data using the at least one behavioral response analysis system, and updating the user-profile;

creating traffic data for the retail environment using video data produced by the data input device, electronic device identification data produced by the electronic device identification module, and spatial position data produced by the spatial position module, the traffic data being selected from the group consisting of heat map data, queue analysis data, traffic analysis data, people count data, and combinations thereof;

receiving video data and spatial position data about the visitor with a gaze-tracking module; determining eye position and head orientation for the visitor from the video data using a computer vision system;

receiving horizontal distance, eye position and head orientation of the visitor, along with the height and field-of-view of the data input device, with a transfer function module, and calculating field-of view data using a transfer function receiving the user field-of-view data with an attribution-module;

performing merchandise analysis and providing target merchandise data using an attribution module, the merchandise analysis being performed using the gaze-tracking data, planogram data, and the user field-of-view data;

calculating a point of intersection of a gaze vector with a plane surface in a three dimensional space where the gaze is directed and associating that point with a known reference object by performing a 3D coordinate transformation of the gaze vector from a coordinate system centered around the eyes to a second coordinate system located on a plane containing the objects of interest by combining axes rotations, scale change and origin shifts;

utilizing a reference map to associate the point of intersection of the gaze vector on the second plane with a known object, wherein the reference map is planogram data that specifies the dimensions and positions of groups of similar products on a retail product display;

transmitting instructions to at least one employee interface device, and with the employee interface device;

receiving the instructions, and communicating said instructions to an employee through an employee application computer program;

configuring proximal data input devices;

receiving, processing and displaying various real-time alerts sent by the profile building system; receiving, processing and displaying operational alarms sent by the data input devices; temporarily redirecting or replicating the data input device's image or video stream from its intended destination to the employee interface device, so that the data input device can be positioned properly at optimum height, tilt angle or pan position;

controlling the operation of proximal data input devices;

scanning, interpreting and transmitting encoded information contained in visual markers to proximal data input devices;

configuring peer-to-peer networks between the data input devices by adding or deleting them to or from mesh networks;

creating and updating planogram by capturing retail product display images, detecting at least one area showing visual markers and groups of similar retail products within the captured images, determining the distance between groups of similar retail products and their distances from each visual marker, and sending the image and its aforementioned associated metadata indicating the position of visual markers and groups of similar retail products to at least one primary data repository;

constructing a planogram by capturing a plurality of retail product display images from a plurality of employee interface devices;

sending at least one retail product display image from at least one streamer employee interface device to a controller employee interface device;

using image stitching to create a combined image on the controller employee interface device; detecting a plurality of groups of similar retail products and a plurality of visual markers in the combined image;

calculating distances between the plurality of groups of similar retail products and the plurality of visual markers;

identifying a plurality of product names in the plurality of groups of similar retail products from a set of plurality of visual marker data or through object recognition;

sending the combined image and a plurality of groups of similar retail products and visual marker metadata to at least one primary data repository.

* * * * *